(12) United States Patent
Hare

(10) Patent No.: US 11,215,465 B2
(45) Date of Patent: Jan. 4, 2022

(54) METHODS FOR SIMULTANEOUS LOCALIZATION AND MAPPING (SLAM) AND RELATED APPARATUS AND SYSTEMS

(71) Applicant: Reification Inc., Oakland, CA (US)

(72) Inventor: Gabriel Archacki Hare, Daly City, CA (US)

(73) Assignee: Reification Inc., Oakland, CA (US)

( * ) Notice: Subject to any disclaimer, the term of this patent is extended or adjusted under 35 U.S.C. 154(b) by 136 days.

(21) Appl. No.: 16/653,472

(22) Filed: Oct. 15, 2019

(65) Prior Publication Data

US 2020/0284587 A1 Sep. 10, 2020

Related U.S. Application Data

(60) Division of application No. 16/267,175, filed on Feb. 4, 2019, now Pat. No. 10,444,021, which is a continuation of application No. PCT/US2017/045644, filed on Aug. 4, 2017.

(60) Provisional application No. 62/371,187, filed on Aug. 4, 2016.

(51) Int. Cl.
*G01C 21/32* (2006.01)
*G06T 7/70* (2017.01)
*G06F 16/29* (2019.01)

(52) U.S. Cl.
CPC ............ *G01C 21/32* (2013.01); *G06F 16/29* (2019.01); *G06T 7/70* (2017.01); *G06T 2207/30244* (2013.01)

(58) Field of Classification Search
CPC . G01C 21/32; G06T 7/70; G06T 2207/30244; G06F 16/29
See application file for complete search history.

(56) References Cited

U.S. PATENT DOCUMENTS

| 4,786,966 A | 11/1988 | Hanson et al. |
| 5,130,794 A | 7/1992 | Ritchey |
| 6,064,749 A | 5/2000 | Hirota et al. |
| 6,278,461 B1 | 8/2001 | Ellenby et al. |

(Continued)

FOREIGN PATENT DOCUMENTS

| CA | 2957555 A1 | 2/2016 |
| CN | 103842995 A | 6/2014 |

(Continued)

OTHER PUBLICATIONS

"Cognitive Robotics at ENSTA: Indoor Naviagation". Loop Closure Detection, https://www.youtube.com/watch?v=iwthNrBhnMg Feb. 1, 2010.

(Continued)

*Primary Examiner* — Yuen Wong
(74) *Attorney, Agent, or Firm* — Goodwin Procter LLP

(57) ABSTRACT

Some embodiments of location estimation methods may (1) facilitate the task of efficiently finding the location of a mobile platform in scenarios in which the uncertainties associated with the coordinates of the map features are anisotropic and/or non-proportional, and/or (2) facilitate decoupling of location estimation from feature estimation. Some embodiments of feature estimation methods may (1) facilitate the combining of environmental descriptions provided by two or more mobile platforms, and/or (2) facilitate decoupling of a data aggregation from feature re-estimation.

14 Claims, 20 Drawing Sheets

(56) References Cited

U.S. PATENT DOCUMENTS

| | | |
|---|---|---|
| 6,392,688 B1 | 5/2002 | Barman et al. |
| 6,671,400 B1 | 12/2003 | Ekpar et al. |
| 6,724,341 B1 | 4/2004 | Pereira et al. |
| 7,124,425 B1 | 10/2006 | Anderson, Jr. et al. |
| 7,127,352 B2 | 10/2006 | Barinek et al. |
| 7,177,737 B2 | 2/2007 | Karlsson et al. |
| 7,307,595 B2 | 12/2007 | Schantz et al. |
| 7,336,814 B2 | 2/2008 | Boca et al. |
| 7,765,499 B2 | 7/2010 | De Graeve et al. |
| 7,768,534 B2 | 8/2010 | Pentenrieder et al. |
| 7,774,158 B2 | 8/2010 | Domingues Goncalves et al. |
| 8,018,383 B1 | 9/2011 | Schantz et al. |
| 8,384,789 B2 | 2/2013 | Chao et al. |
| 8,400,505 B2 | 3/2013 | Oyama et al. |
| 8,587,583 B2 | 11/2013 | Newcombe et al. |
| 8,666,173 B2 | 3/2014 | Huggett |
| 8,711,206 B2 | 4/2014 | Newcombe et al. |
| 8,761,434 B2 | 6/2014 | Marks et al. |
| 8,797,387 B2 | 8/2014 | Huggett et al. |
| 8,839,121 B2 | 9/2014 | Bertolami et al. |
| 8,866,912 B2 | 10/2014 | Mullis |
| 8,953,022 B2 | 2/2015 | McArdle et al. |
| 8,970,690 B2 | 3/2015 | Meier et al. |
| 8,971,612 B2 | 3/2015 | Shotton et al. |
| 9,041,739 B2 | 5/2015 | Latta et al. |
| 9,047,698 B2 | 6/2015 | Maciocci et al. |
| 9,177,384 B2 | 11/2015 | Weisenburger |
| 9,197,885 B2 | 11/2015 | Sun et al. |
| 9,210,404 B2 | 12/2015 | Hall |
| 9,251,590 B2 | 2/2016 | Sharp et al. |
| 9,280,832 B2 | 3/2016 | Cleveland et al. |
| 9,286,810 B2 | 3/2016 | Eade et al. |
| 9,317,133 B2 | 4/2016 | Korah et al. |
| 9,324,151 B2 | 4/2016 | Snavely et al. |
| 9,384,594 B2 | 7/2016 | Maciocci et al. |
| 9,430,038 B2 | 8/2016 | Ebstyne et al. |
| 9,432,636 B2 | 8/2016 | Gourlay et al. |
| 9,436,987 B2 | 9/2016 | Ding et al. |
| 9,483,879 B2 | 11/2016 | Gourlay et al. |
| 9,544,871 B2 | 1/2017 | Le Grand et al. |
| 9,589,348 B1 | 3/2017 | Linde et al. |
| 9,679,144 B2 | 6/2017 | Molnar et al. |
| 9,754,419 B2 | 9/2017 | Petrovskaya et al. |
| 9,766,075 B2 | 9/2017 | Foxlin |
| 9,811,734 B2 | 11/2017 | Williams et al. |
| 9,824,450 B2 | 11/2017 | Martini |
| 9,916,002 B2 | 3/2018 | Petrovskaya et al. |
| 9,940,716 B2 | 4/2018 | Chevassus et al. |
| 9,940,897 B2 | 4/2018 | Guan et al. |
| 9,984,467 B2 | 5/2018 | Chandrasekar et al. |
| 9,997,845 B2 | 6/2018 | Schantz et al. |
| 10,008,038 B2 | 6/2018 | Miller |
| 10,027,952 B2 | 7/2018 | Karvounis |
| 10,033,941 B2 | 7/2018 | Williams et al. |
| 10,444,021 B2 | 10/2019 | Hare |
| 2007/0248261 A1 | 10/2007 | Zhou et al. |
| 2007/0293985 A1 | 12/2007 | Myeong et al. |
| 2009/0259432 A1 | 10/2009 | Liberty et al. |
| 2010/0208033 A1 | 8/2010 | Edge et al. |
| 2010/0257252 A1 | 10/2010 | Dougherty et al. |
| 2012/0293613 A1 | 11/2012 | Powers et al. |
| 2012/0306850 A1 | 12/2012 | Balan et al. |
| 2013/0194304 A1 | 8/2013 | Latta et al. |
| 2013/0222369 A1 | 8/2013 | Huston et al. |
| 2014/0005933 A1 | 1/2014 | Fong et al. |
| 2014/0267234 A1 | 9/2014 | Hook et al. |
| 2014/0293016 A1* | 10/2014 | Benhimane ............ G06T 17/00 348/50 |
| 2014/0323148 A1 | 10/2014 | Schmalstieg et al. |
| 2014/0340427 A1 | 11/2014 | Baker |
| 2014/0368534 A1 | 12/2014 | Salter et al. |
| 2015/0156028 A1 | 6/2015 | Ballard et al. |
| 2015/0172626 A1 | 6/2015 | Martini |
| 2015/0301592 A1 | 10/2015 | Miller |
| 2015/0332464 A1 | 11/2015 | O'Keefe et al. |
| 2016/0044298 A1 | 2/2016 | Holz et al. |
| 2016/0253844 A1 | 9/2016 | Petrovskaya et al. |
| 2016/0328882 A1 | 11/2016 | Lee et al. |
| 2016/0335497 A1 | 11/2016 | Williams et al. |
| 2016/0379366 A1 | 12/2016 | Shah et al. |
| 2018/0040111 A1 | 2/2018 | Benet Ballester et al. |
| 2019/0178654 A1 | 6/2019 | Hare |

FOREIGN PATENT DOCUMENTS

| | | |
|---|---|---|
| CN | 105258702 A | 1/2016 |
| CN | 105911518 A | 8/2016 |
| DE | 102009037835 A1 | 2/2011 |
| KR | 20090082325 A | 7/2009 |
| KR | 20130080688 A | 7/2013 |
| WO | WO-2011/045276 A1 | 4/2011 |
| WO | WO-2013/071190 A1 | 5/2013 |
| WO | WO-2014/020364 A1 | 2/2014 |
| WO | WO-2014203743 A1 | 12/2014 |
| WO | WO-2015/048906 A1 | 4/2015 |
| WO | WO-2015/095507 A1 | 6/2015 |
| WO | WO-2015/105597 A2 | 7/2015 |
| WO | WO-2015/161307 A1 | 10/2015 |
| WO | WO-2016/077506 A1 | 5/2016 |

OTHER PUBLICATIONS

"Relocalizaton of an EKF SLAM Algorithm After Kidnapping Using Our Loop Closure Detection Algorithm", https://www.voutube.com/watch?v=iwthNrBhnMg Feb. 1, 2010.

Choset et al., "Topological Simultaneous Localization and Mapping (SLAM): Toward Exact Localization Without Explicit Localization", IEEE Transaction and Robotics and Automation, vol. 17, No. 2, Apr. 2001, pp. 125-137.

Dissanayake et al., "A solution to the simultaneous localization and map building (SLAM) problem". IEEE Transactions on Robotics and Automation, Jun. 2001, pp. 229-241.

Hemayed, "A Survey of Camera Self-Calibration", Proceedings. IEEE Conference on Advanced Video and Signal Based Surveillance, 2003.

International Search Report and Written Opinion for International Application No. PCT/US2017/045644 dated Oct. 26, 2017.

Klein et al., "Parallel Tracking and Mapping for Small AR Workspaces", Department of Engineering Science, University of Oxford, ISMAR '07 Proceedings of the 2007 6th IEEE and ACM International Symposium on Mixed and Augmented Reality, pp. 1-10.

Rekleitis, "Single Robot Exploration: Simultaneous Localization and Uncertainty Reduction on Maps (SLURM)". School of Computer Science, McGill University. IEEE. 2012 Ninth Conference on Computer and Robot Vision, pp. 214-220.

Swaminathan et al., "Non-Metric Calibration of Wide-Angle Lenses and Polycameras". Department of Computer Science, Columbia University, Published in: Proceedings. 1999 IEEE Computer Society Conference on Computer Vision and Pattern Recognition. Date of Conference Jun. 23-25, 1999.

Umeyama, "An Eigendecomposition Approach to Weighted Graph Matching Problems". IEEE Transactions on Pattern Analysis and Machine Intelligence. Vol. 10 No. 5, Sep. 1988 (pp. 695-703).

U.S. Appl. No. 16/267,175, Methods for Simultaneous Localization and Mapping (SLAM) and Related Apparatus and Systems, filed Feb. 4, 2019.

* cited by examiner

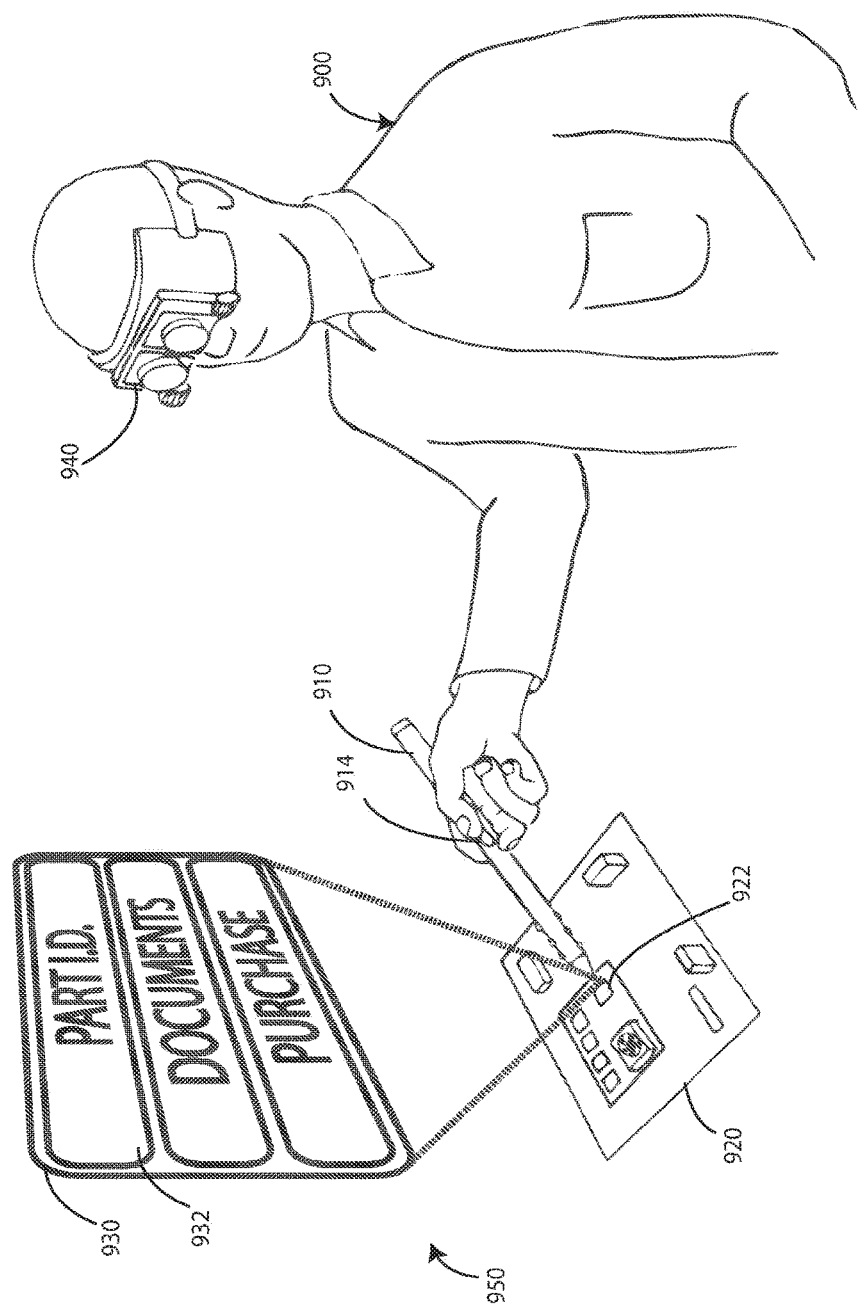

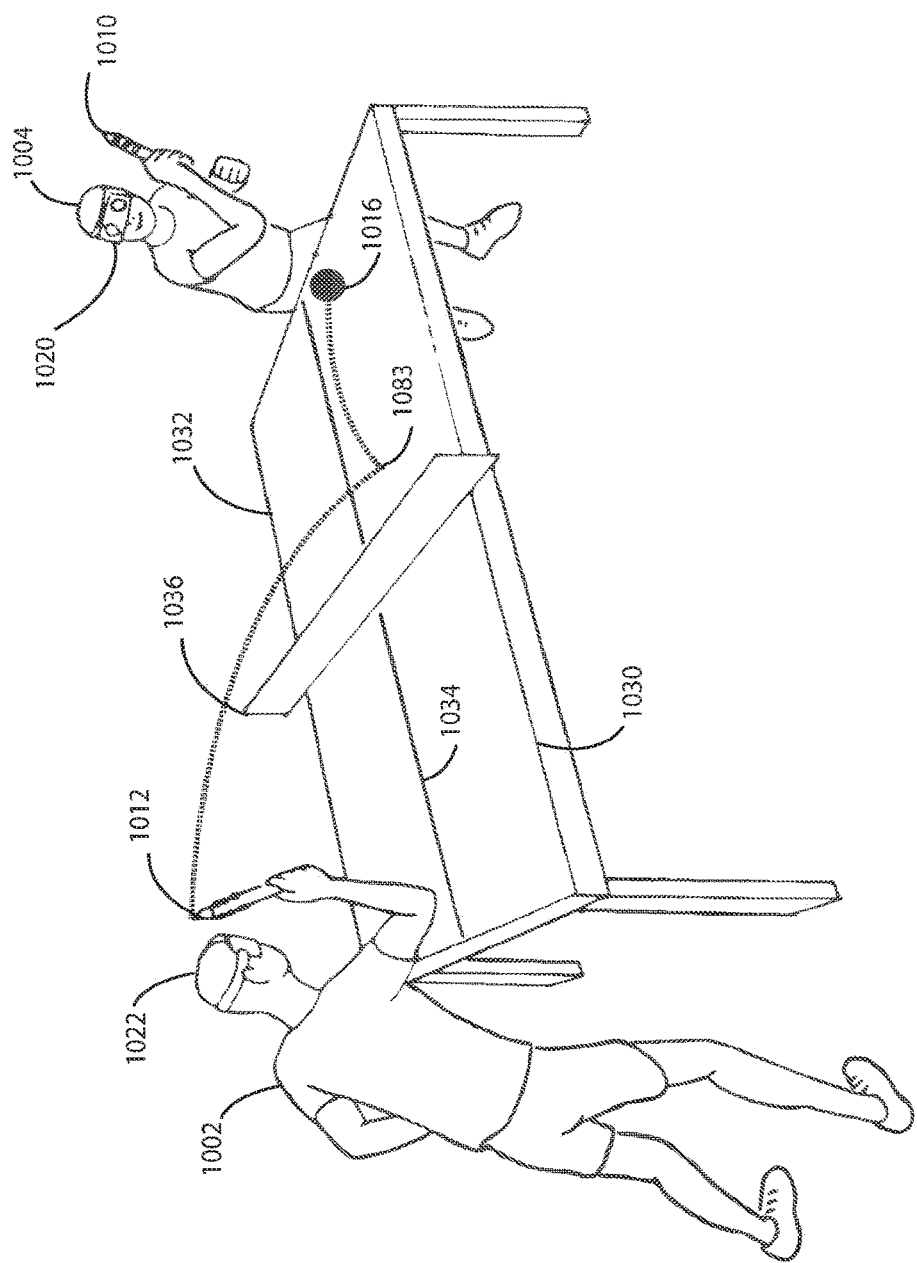

METHODS FOR SIMULTANEOUS LOCALIZATION AND MAPPING (SLAM) AND RELATED APPARATUS AND SYSTEMS

CROSS-REFERENCE TO RELATED APPLICATION(S)

This application claims priority and benefit under 35 U.S.C. § 120 as a divisional of U.S. patent application Ser. No. 16/267,175, titled "Methods for Simultaneous Localization and Mapping (SLAM) and Related Apparatus and Systems" and filed on Feb. 4, 2019, which is a continuation of International (PCT) Patent Application No. PCT/US2017/045644, titled "Methods for Simultaneous Localization and Mapping (SLAM) and Related Apparatus and Systems" and filed on Aug. 4, 2017, which claims priority to and benefit of U.S. Provisional Patent Application Ser. No. 62/371,187, titled "System and Method of Solving SLAM problem for Resource Constrained and Networked Systems" and filed on Aug. 4, 2016, each of which is hereby incorporated by reference herein in its entirety.

FIELD OF INVENTION

The present disclosure relates generally to Simultaneous Localization and Mapping (SLAM). In particular, some embodiments relate to methods for accurately and efficiently estimating the location of a mobile device within an environment and for mapping the environment.

BACKGROUND

Imaging devices can collect, process and store data from an external environment to generate a digital representation of the external environment. For example, a camera can capture images of the physical world and in some instances store this data in a database for later processing. Processing the digital representation of the external environment may include altering or modifying the image data with additional data.

In some embodiments, a digital representation of a real-world environment may be used to generate a digital map of this environment. For example, mounting an imaging device to a mobile platform in motion within an environment can facilitate the use of a digital map to localize the mobile platform (e.g., to determine the location of the mobile platform within the environment). For example, a mobile robot can use an imaging device to generate a map of the robot's surroundings and determine the robot's location within its environment.

In some instances, simultaneous localization and mapping (SLAM) techniques may be applied to the image data to allow the robot to build a map of an unknown environment while simultaneously keeping track of its current location in the environment. In general, SLAM techniques address the problem of using one or more mobile platforms to construct a map of an unknown environment while using the map to estimate the location(s) of the platforms(s) within that environment and/or to navigate within the environment. Some SLAM techniques may use data from different types of sensors (in addition to or in lieu of data image data from cameras) to localize the mobile platform(s) and map the features of the environment. For example, other data from cameras and/or data from odometers, gyroscopes and depth sensors may be used.

Augmented reality (AR) systems may overlay additional elements onto a digital representation of a real-world environment. In some instances, AR systems may generate and place virtual objects in the digital representation of the real-world environment, such that digital representations of real-world physical objects and the virtual objects are displayed together.

SUMMARY OF THE INVENTION

Some embodiments of location estimation methods described herein may facilitate the task of efficiently finding the statistically optimal location of a mobile platform in scenarios in which the uncertainties associated with the coordinates of the map features are anisotropic and/or non-proportional. Some embodiments of the location estimation and feature estimation techniques described herein may facilitate decoupling of location estimation from feature estimation.

Some embodiments of the methods described herein are applicable to systems of multiple mobile platforms, and facilitate the combining of environmental descriptions provided by two or more (e.g., all) of the mobile platforms. For example, using the data representation and feature estimation techniques described herein, the combined environmental descriptions may be updated in a time period that depends primarily on the volume measured—not on the number of platforms in the system. Some embodiments of the feature estimation techniques described herein may facilitate decoupling of a data aggregation step from a feature estimation step.

According to an aspect of the present disclosure, a method of estimating a location of a mobile device in a two-dimensional (2D) or three-dimensional (3D) space is provided, the method comprising: obtaining a first map comprising coordinates of a plurality of first features within a first coordinate space and respective first regions of uncertainty of the coordinates of each of the first features, wherein the first regions of uncertainty include at least two regions with non-proportional dimensions; obtaining a second map comprising coordinates of a plurality of second features within a second coordinate space and respective second regions of uncertainty for the coordinates of each of the second features; determining a plurality of feature pairs, wherein each feature pair includes a first feature of the first map and a second feature of the second map; performing one or more iterations of an iterative process, including: (a) determining third regions of uncertainty of the coordinates of the respective first features, (b) determining a potential transformation between the first coordinate space and the second coordinate space, (c) determining probabilities of the feature pairs based, at least in part, on the third regions of uncertainty, wherein the probability of each feature pair is a probability that the coordinates of the first feature of the feature pair represent a measurement of the second feature of the feature pair obtained from a potential location of the mobile device corresponding to the potential transformation, (d) determining a value representative of a statistical optimality of the potential transformation by evaluating an objective function, wherein the objective function aggregates the probabilities of the feature pairs, (e) determining whether the value of the objective function is approaching a local extreme value of the objective function, and (f) terminating the iterative process if the value of the objective function has reached the local extreme value, otherwise performing another iteration of the iterative process, wherein for at least one of the iterations, the third regions of uncertainty are determined based, at least in part, on the first regions of uncertainty, and the probabilities of the feature pairs are determined based, at least in part, on the first regions of uncertainty with the non-proportional dimensions; and estimating the location of the mobile device based on the potential transformation from a final iteration of the iterative process.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, at least two of the first regions of uncertainty have anisotropic dimensions along at least two orthogonal axes of the first coordinate space. In some embodiments, the second regions of uncertainty include at least two regions with non-proportional dimensions. In some embodiments, the probabilities of the feature pairs are further determined based, at least in part, on the second regions of uncertainty, and for the at least one iteration, the probabilities of the feature pairs are determined based, at least in part, on second regions of uncertainty with the non-proportional dimensions. In some embodiments, at least two of the second regions of uncertainty have anisotropic dimensions along at least two orthogonal axes of the second coordinate space. In some embodiments, the first and second regions of uncertainty are three-dimensional. In some embodiments, the local extreme value of the objective function is a local minimum value of the objective function.

In some embodiments, for a first iteration of the iterative process, the potential transformation is determined based, at least in part, on a motion model of motion of the mobile device. In some embodiments, for a first iteration of the iterative process: the potential transformation is determined based, at least in part, on the third regions of uncertainty of the coordinates of the first features, and the third regions of uncertainty are mutually proportional. In some embodiments, dimensions of each of the proportional regions of uncertainty are isotropic. In some embodiments, the first and second coordinate spaces are 3D spaces; for a first iteration of the iterative process, the potential transformation comprises a first transformation between the first coordinate space and the second coordinate space, and the first transformation corresponds to a 3D subspace of a six-dimensional (6D) space; for a second iteration logically subsequent to the first iteration, the potential transformation comprises a second transformation between the first coordinate space and the second coordinate space; and determining the second transformation comprises rotating the subspace corresponding to the first transformation in a specified direction by a specified angle. In some embodiments, the method further comprises determining the specified direction and angle of rotation by applying Newton's method to the objective function associated with the first iteration.

In some embodiments, for a first iteration of the iterative process, the third regions of uncertainty are mutually proportional. In some embodiments, for the first iteration of the iterative process, each of the third regions of uncertainty is isotropic. In some embodiments, for a first iteration of the iterative process: each of the third regions of uncertainty has a radius of uncertainty, and for each of the first features, the radius of the corresponding third region of uncertainty is determined based on one or more dimensions of the corresponding first region of uncertainty. In some embodiments, for a second iteration of the iterative process logically subsequent to the first iteration: for each of the first features, at least one dimension of the corresponding third region of uncertainty is determined based, at least in part, on a dimension of the corresponding first region of uncertainty and a dimension of the corresponding proportional region of uncertainty. In some embodiments, for a third iteration of the iterative process logically subsequent to the first and second iterations, the third regions of uncertainty are the first regions of uncertainty.

In some embodiments, determining the probabilities of the feature pairs comprises determining respective weights of the feature pairs. In some embodiments, for each feature pair, the weight of the feature pair represents a confidence that the features of the feature pair are correctly paired and stationary.

In some embodiments, determining the weights of the feature pairs comprises determining a respective pull of each feature pair. In some embodiments, for each feature pair, the pull is determined based on a residual of the feature pair and an uncertainty covariance of (1) the third region of uncertainty of the first feature of the feature pair and (2) the second region of uncertainty of the second feature of the feature pair. In some embodiments, for each feature pair, the pull is equal to a product of the residual of the feature pair and an inverse square root of the uncertainty covariance of the feature pair.

In some embodiments, determining the weights of the feature pairs comprises determining a respective residual of each feature pair. In some embodiments, for each feature pair, the residual is determined based on a displacement between the coordinates of the first and second features of the feature pair in a common coordinate space. In some embodiments, for each feature pair: determining the residual comprises transforming the coordinates of the first feature in the first coordinate space to coordinates of the first feature in the second coordinate space based on the potential transformation; and the displacement between the first and second features in the common coordinate space comprises a displacement between the coordinates of the first feature in the second coordinate space and the coordinates of the second feature in the second coordinate space. In some embodiments, the first and second coordinate spaces are 3D spaces, and for each feature pair, determining the residual of the feature pair comprises: mapping the coordinates of the first feature in the first 3D coordinate space and the coordinates of the second feature in the second 3D coordinate space to a point in a 6D coordinate space; mapping the potential transformation to a 3D subspace in the 6D coordinate space; and determining a displacement between the point in the 6D coordinate space representing the feature pair and a point on the 3D subspace along a vector orthogonal to the 3D subspace, wherein the residual of the feature pair comprises the displacement.

In some embodiments, determining the weights of the feature pairs comprises determining a mean and a covariance of a distribution of the pulls of the feature pairs. In some embodiments, the covariance of the distribution of pulls comprises a stabilized covariance of the distribution of pulls. In some embodiments, the respective weight of each feature pair is determined based on a probability of the pull of the feature pair according to the distribution of the pulls of the feature pairs.

In some embodiments, determining the probabilities of the feature pairs further comprises determining squared sigma distances of the respective feature pairs. In some embodiments, for each feature pair, the squared sigma distance (SSD) is a distance in a common coordinate space between (1) the third region of uncertainty associated with the coordinates first feature of the feature pair, and (2) the second region of uncertainty associated with the coordinates of the second feature of the feature pair. In some embodiments, for each feature pair, determining the SSD comprises: transforming the coordinates of the first feature in the first coordinate space to coordinates of the first feature in the second coordinate space based on the potential transformation, wherein the common coordinate space is the second coordinate space; determining a residual of the feature pair; determining a sum of an inverse of an uncertainty covariance of the first feature and an inverse of an uncertainty covariance of the second feature; and determining a product of the residual, the sum, and the residual, wherein the SSD comprises the product. In some embodiments, the first and second coordinate spaces are 3D spaces, and for each feature pair, determining the SSD comprises: mapping the third region of uncertainty of the coordinates of the first feature in the first 3D coordinate space and the second region of uncertainty of the coordinates of the second feature in the second 3D coordinate space to a region in a 6D coordinate space; mapping the potential transformation to a 3D subspace in the 6D coordinate space; and determining a sigma distance between the region in the 6D coordinate space representing the feature pair and a point on the 3D subspace along a vector orthogonal to the 3D subspace, wherein the SSD comprises a square of the sigma distance in the 6D space.

In some embodiments, the probability of each feature pair is determined based on the weight and the squared sigma distance (SSD) of the feature pair. In some embodiments, evaluating the objective function comprises: for each feature pair, determining a product of the weight and the SSD of the feature pair; and determining a sum of the products of the weights and the SSDs.

In some embodiments, the method further comprises: after terminating the iterative process, determining whether a first feature pair included in the plurality of feature pairs is outlying or inlying. In some embodiments, determining whether the first feature pair is outlying or inlying comprises: comparing the weight of the first feature pair to a threshold weight; if the weight of the first feature pair is less than the threshold weight, classifying the first feature pair as outlying; and otherwise, classifying the first feature pair as inlying. In some embodiments, the first feature pair is outlying, and the method further comprises determining whether the outlying first feature pair represents an incorrect pairing of features or a non-stationary feature.

In some embodiments, the threshold weight is a first threshold weight, and determining whether the outlying first feature pair represents an incorrect pairing of features or a non-stationary feature comprises: comparing the weight of the outlying first feature pair to a second threshold weight less than the first threshold weight; if the weight of the outlying first feature pair is less than the second threshold weight, determining that the outlying first feature pair represents an incorrect pairing of features; and otherwise, determining that the outlying first feature pair represents a non-stationary feature.

In some embodiments, determining whether the outlying first feature pair represents an incorrect pairing of features or a non-stationary feature comprises: transforming the coordinates of the first feature in the first coordinate space to coordinates of the first feature in the second coordinate space based on the potential transformation from the final iteration; determining a distance between the coordinates of the first feature in the second coordinate space and the coordinates of the second feature in the second coordinate space; comparing the distance between the coordinates to a threshold distance; if the distance between the coordinates is less than the threshold distance, determining that the outlying first feature pair represents a non-stationary feature; and otherwise, determining that the outlying first feature pair represents an incorrect pairing of features.

According to another aspect of the present disclosure, a method of estimating a location of a mobile device in a two-dimensional (2D) or three-dimensional (3D) space is provided, the method comprising: obtaining a first map comprising coordinates of a plurality of first features within a first coordinate space and first data characterizing uncertainties associated with the coordinates of the first features; obtaining a second map comprising coordinates of a plurality of second features within a second coordinate space and first data characterizing uncertainties associated with the coordinates of the second features; determining a plurality of feature pairs, wherein each feature pair includes a first feature of the first map and a second feature of the second map; performing one or more iterations of an iterative process, including: (a) determining third data characterizing uncertainties associated with the coordinates of the first features, (b) determining a potential transformation between the first coordinate space and the second coordinate space, (c) determining probabilities of the feature pairs based, at least in part, on the third regions of uncertainty, wherein the probability of each feature pair is a probability that the coordinates of the first feature of the feature pair represent a measurement of the second feature of the feature pair obtained from a potential location of the mobile device corresponding to the potential transformation, the probability of each feature pair is determined based, at least in part, on a weight associated with the feature pair, the weight associated with each feature pair is determined based, at least in part, on relationship between a pull of the feature pair and a distribution of pulls of the plurality of feature pairs, and the pull of each feature pair comprises a product of a residual of the feature pair and an inverse square root of an uncertainty covariance of the feature pair, (d) determining a value representative of a statistical optimality of the potential transformation by evaluating an objective function, wherein the objective function aggregates the probabilities of the feature pairs, (e) determining whether the value of the objective function is approaching a local extreme value of the objective function, and (f) terminating the iterative process if a value of a stabilized covariance of the pull distribution is less than a threshold value on each axis of the pull distribution, otherwise performing another iteration of the iterative process; and estimating the location of the mobile device based on the potential transformation from a final iteration of the iterative process.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The foregoing and other embodiments can each optionally include one or more of the above-described features, alone or in combination.

According to another aspect of the present disclosure, a mapping method is provided, comprising: obtaining first feature data comprising first estimated coordinates of a feature in a coordinate space of a map of an environment; obtaining virtual object data indicating (1) an anchor relationship between a virtual object and the feature, and (2) a displacement of the virtual object relative to the feature; determining first coordinates of the virtual object based on the first estimated coordinates of the feature and the displacement of the virtual object relative to the feature; after re-estimation of the coordinates of the feature, obtaining second feature data comprising second estimated coordinates of the feature, wherein there is a displacement between the first and second estimated coordinates of the feature; and determining second coordinates of the virtual object based on the second estimated coordinates of the feature and the displacement of the virtual object relative to the feature.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the method further comprises: prior to re-estimation of the coordinates of the feature, displaying, on a display device associated with a first user, the virtual object at the determined first coordinates thereof; and after re-estimation of the coordinates of the feature, displaying, on the display device associated with the first user, the virtual object at the determined second coordinates thereof, wherein a displacement between the first and second coordinates of the virtual object comprises the displacement between the first and second estimated coordinates of the feature.

In some embodiments, the map is a first map, and the method further comprises: obtaining third feature data comprising third estimated coordinates of the feature in the coordinate space of a second map of the environment; obtaining the virtual object data indicating (1) the anchor relationship between the virtual object and the feature, and (2) the displacement of the virtual object relative to the feature; and determining third coordinates of the virtual object based on the third estimated coordinates of the feature and the displacement of the virtual object relative to the feature, wherein the third coordinates of the virtual object differ from the first coordinates of the virtual object and from the second coordinates of the virtual object. In some embodiments, the method further comprises: displaying, on a display device associated with a first user, the virtual object at the determined third coordinates thereof, while a display device associated with a second user displays the virtual object at the determined first coordinates thereof. In some embodiments, a displacement between the first and third coordinates of the virtual object is equal to a displacement between the first and third estimated coordinates of the feature. In some embodiments, the first and second maps exhibit eventual coherency.

According to another aspect of the present disclosure, a mapping method is provided, comprising: obtaining first feature data comprising first estimated coordinates of a plurality of features in a coordinate space of a first map of an environment; obtaining first uncertainty data representing (1) for each of the features, a first distribution of individual uncertainty of the first estimated coordinates of the feature, and (2) for each pair of the features, a first distribution of correlated uncertainty of the first estimated coordinates of the pair of features; obtaining first lowered position data representing a product of the first uncertainty data and the first feature data; performing an aggregation step, including: obtaining second uncertainty data representing (1) for each of the features, a second distribution of individual uncertainty of second estimated coordinates of the feature, and (2) for each pair of the features, a second distribution of correlated uncertainty of the second estimated coordinates of the pair of features, aggregating the first uncertainty data and the second uncertainty data to generate third uncertainty data representing (1) for each of the features, a third distribution of individual uncertainty of third estimated coordinates of the feature, and (2) for each pair of the features, a third distribution of correlated uncertainty of the third estimated coordinates of the pair of features, obtaining second lowered position data representing a product of the second uncertainty data and second feature data comprising the second estimated coordinates of the features, and aggregating the first lowered position data and the second lowered position data to generate third lowered position data representing a product of the third uncertainty data and third feature data comprising the third estimated coordinates of the features; and performing a feature estimation step, comprising: for each of the features, determining a mean of the third distribution of individual uncertainty of the respective feature based on (1) the third distribution of individual uncertainty of the respective feature, (2) the third distributions of correlated uncertainty of each pair of features that includes the respective feature, and (3) the third lowered position data, wherein for each of the features, the third estimated coordinates of the feature comprise the mean of the third distribution of individual uncertainty of the feature.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the method further comprises repeatedly performing the aggregation step and the feature estimation step, wherein the feature estimation step is performed asynchronously with respect to the aggregation step. In some embodiments, the aggregation step is performed in response to obtaining new measurements of the features. In some embodiments, the feature estimation step is performed in response to detecting a loop closure event.

In some embodiments, aggregating the first and second lowered position data to generate the third lowered position data comprises adding the first and second lowered position data to generate the third lowered position data. In some embodiments, aggregating the first and second uncertainty data to generate the third uncertainty data comprises adding the first and second uncertainty data to generate the third uncertainty data. In some embodiments, the first, second, and third uncertainty data comprise inverses of the individual uncertainties of the respective first, second, and third estimated coordinates of the features. In some embodiments, the first, second, and third uncertainty data further comprise inverses of the correlated uncertainties of the respective pairs of first, second, and third estimated coordinates of the features.

Particular implementations of the subject matter described in this specification may realize one or more of the advantages described in the Detailed Description. Other aspects and advantages of the invention will become apparent from the following drawings, detailed description, and claims, all of which illustrate the principles of the invention, by way of example only.

The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIG. 9c is a conceptual illustration of an exemplary embodiment of an augmented reality system for displaying device information to a user.

FIG. 10 is a conceptual illustration of an exemplary embodiment of an augmented reality system for multiple users interacting with a shared virtual object.

DETAILED DESCRIPTION

1. Terms

Figure 1A:
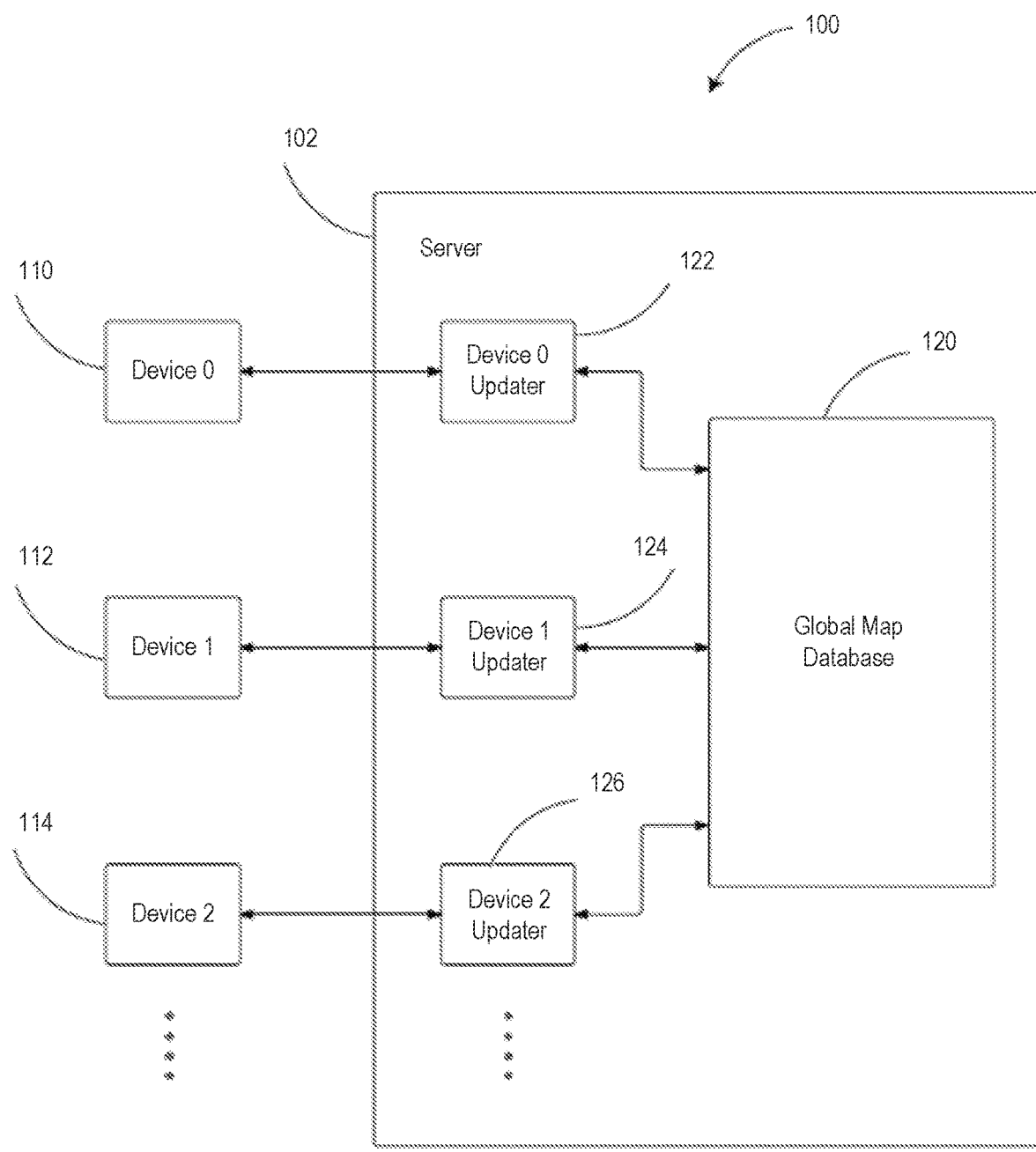
FIG. 1a is a block diagram of an exemplary embodiment of a multiple-device tracking system using a global map database.

As used herein, a "mobile platform" may include any mobile device (e.g., rig, robot, drone, unmanned vehicle, unmanned aerial vehicle, etc.) equipped with one or more imaging devices (e.g., one or more cameras).

As used herein, a "camera" may include any system (e.g., sensor system) capable of providing a collection of one or more "images" of a volume (e.g., a volume adjacent to or surrounding the camera). The collection of images may include measurements of attributes of the volume. In some embodiments, the collection of images may be suitable for partitioning the imaged volume into non-intersecting constituent volumes, such that the collection of images provides a set of measurements of attributes of each constituent volume.

One example of a camera is a "color camera," which may include a pinhole aperture and an imaging surface with pixels capable of measuring the intensity of light incident on their surfaces. In some embodiments, different subsets of the pixels of a color camera may be capable of measuring the intensities of different wavelengths of light (e.g., red, green, and blue light). In some embodiments, the volume around the imaging surface of a color camera is partitioned by angle, such that each pixel defines a conical volume with its apex at the pinhole and the pixel measures the intensity of the light (or particular wavelengths of the light) directed towards the pinhole via the associated conical volume.

Another example of a camera is a "depth camera," which may include a pinhole aperture and a sensor capable of providing an image in which each pixel describes a distance from the pinhole to the closest surface within the associated conical volume. Another example of a camera is a "proximity sensor", which radially partitions a volume around the sensor and provides an indication of the occupancy of that volume.

When positions of features within an environment are determined based on images of the environment, there may be uncertainty as to the precise coordinates of the features. For example, in a three-dimensional (3D) environment, there may be uncertainty regarding the position of a feature along one or more axes of the 3D coordinate space, and these uncertainties may generally increase as the distance between the camera and the feature increases. The uncertainties associated with the coordinates of a feature may be represented as three orthogonal vectors, such that the magnitude of each uncertainty vector represents the amount of uncertainty regarding the position of the coordinate in the direction indicated by the vector.

Collectively, the uncertainty vectors associated with a feature may represent dimensions of a region of uncertainty regarding the position of the feature. For example, the uncertainty vectors associated with a feature may represent the principal axes of an ellipsoid region of uncertainty regarding the feature's position. Other regions of uncertainty or possible. As used herein, a "region of uncertainty" may include any portion (e.g., line segment, two-dimensional planar area, or three-dimensional region) of a 3D environment adjacent to the nominal coordinates of a feature in which the position of the feature is uncertain.

The vectors of uncertainty associated with the position of a feature are generally not "isotropic." For example, if the region of uncertainty R1 associated with a feature F1 is an ellipsoid E1 with axes of length Lx1, Ly1, and Lz1 along the x, y, and z axes of the map's coordinate space, the lengths Lx1, and Ly1, and Lz1 are generally not all equal. Thus, the ellipsoid region of uncertainty associated with the position of a feature is generally not spherical.

The regions of uncertainty associated with different features in a map are generally not "proportional." For example, if the region of uncertainty R1 associated with a feature F1 is an ellipsoid E1 with axes of length Lx1, Ly1, and Lz1 along the x, y, and z axes of the map's coordinate space, and the region of uncertainty R2 associated with a feature F2 is an ellipsoid E2 with axes of length Lx2, Ly2, and Lz3 along the x, y, and z axes, the ratios of Lx1 to Ly1, Lx1 to Lz1, and/or Ly1 to Lz1 are generally not all proportional to the corresponding ratios of Lx2 to Ly2, Lx2 to Lz2, and Ly2 to Lz2.

As used herein, a "transformation" in a 3D space comprises a 3D translation from a first position in the space to a second position in the space, and a 3D rotation of the translated object.

As used herein, an iteratively determined value of an objective function corresponding to an iteratively estimated value of a parameter of interest "approaches" a local or global extreme value (e.g., a local or global minimum) of the objective function during an iterative estimation process if the iteratively determined value eventually converges to the local extreme value as the number of iterations of the process increases.

As used herein, an iteratively determined value of an objective function corresponding to an iteratively estimated value of a parameter of interest "reaches" a local or global extreme value (e.g., a local or global minimum) of the objective function during an iterative estimation process if one or more convergence criteria associated with the iterative estimation process indicate that the iteratively determined value of the objective function is sufficiently near the local or global extreme value.

2.1. Overview of Simultaneous Localization and Mapping (SLAM)

Given a mobile platform that uses one or more cameras to provide a stream of "frames" (wherein each frame includes a set of images recorded (e.g., substantially simultaneously recorded) by the platform's camera(s)), the movement of the platform can be estimated from the recorded images using SLAM techniques. More generally, SLAM techniques can address the task of determining the location and movement of one or more platforms within the same coordinate system based on images provided by the platforms and data derived therefrom. In some cases, estimations of the location of each platform are made as fast as their frames are recorded, and as such are generally made sequentially.

The task of determining the location and movement of a platform can be facilitated by solving three problems, either separately or in combination. First (the "feature extraction" problem), given a frame, visual and structural information about the environment surrounding the platform can be derived. Second (the "location estimation" problem), the visual and structural information derived from one or more frames can be compared to an existing description of the environment to estimate the "location" (e.g., the position and rotation) of the platform in relation to other (e.g., stationary) structures in the environment. Third (the "feature mapping" or "feature estimation" problem), the platform's estimated location can be used to update the visual and structural information describing the environment.

In some cases, two independent descriptions of an environment may use different coordinate systems (e.g., two "frame coordinate systems" relative to the locations of two platforms that generated the independent descriptions, or one frame coordinate system relative to the location of a platform that generated the description and one "world coordinate system" relative to a known location), yet may provide similar structural and visual descriptions of the environment. In such cases, reconciling the coordinates of the independent descriptions of the environment may facilitate the generation of a combined, more accurate description of the environment. These coordinate "reconciliation" problems may become increasingly difficult as the uncertainty of the initial estimate of a platform's location increases.

In general, the easiest reconciliation problem is that of a moving platform. The visual and structural information derived from a frame are generally in a moving coordinate system relative to the platform, but so long as the motion of the platform is small between successive frames, an accurate initial estimate of the platform's location is generally available.

A reconciliation problem of generally intermediate difficulty can occur when a platform moves such that the environment volumes visible in a set of frames form a loop. As the loop completes the platform enters a previously observed environment. However, as the platform moves around the loop, each successive estimate of the platform's location may contribute some small error and associated uncertainty to the descriptions of the environment. Consequently, as the loop completes there may be significant uncertainty in the estimated position of the rig relative to the previously described environment. In some cases, the accumulated error may be so significant that it may be difficult to determine whether the loop has been completed.

A reconciliation problem of generally greatest difficulty may occur when a platform is re-activated in a previously measured environment and attempts to re-establish its location. In this case there may be no initial estimate of the platform's location.

The problem of reconciling coordinates for multiple platforms may vary in difficulty depending on the information that is shared by the platforms. If each platform establishes its location relative to a shared previous description of the environment, then each platform may be faced with the task of solving the reconciliation problem of greatest difficulty. Alternatively, the platforms may be able to measure the locations of the other platforms, in which case the easiest reconciliation problem is presented.

2.2. Recognized Limitations of Conventional SLAM Techniques

In some embodiments of the invention, configuration of hardware and software resources and the techniques described herein provide a framework of optimizing algorithms applied to the SLAM problem can overcome certain shortcomings of existing approaches, which typically involve a computationally expensive optimization. For example, the Extended Kalman Filter simultaneously updates estimates of the location of a SLAM system and mapping of an environment wherein the SLAM system is located. Solving the SLAM problem in this way generally demands a high amount of computational resources because of the size of data history sets that are maintained and an entire map is re-estimated with each update. These computational demands of conventional methods place a limitation on the energy requirements, and thus portability, of the end device designed to perform the SLAM problem.

In the context of the SLAM problem, the delay in delivering a result may determine the noise in the result, since the device may have moved during the delay, and integrations of measured velocity and acceleration may yield increasing uncertainty in the position. These computational complexity of conventional methods may also result in a significant delay, which may contribute to the inaccuracy of the estimation, making them unsuitable for augmented reality ("AR") and autonomous navigation, both of which require real- or near-real-time computation.

Other conventional frameworks may be limited in applicability to certain SLAM problems due to constraints intrinsic to the algorithm used by those frameworks. For example, the Ortho-SLAM algorithm may be applicable to navigation in building interiors where the precise orthogonality of nearly orthogonal surfaces may be assumed. Additionally, many of these methods attempt an optimization without regard to the pertinence of the data included in the optimization and/or inefficiently attempt to remove non-pertinent data (e.g., RANSAC algorithm). For example, conventional methods may not account for uncertainty data and/or the possibility of non-relevant data that may limit the reliability of the results of the optimization. The limited accuracy in these solutions to the SLAM problem places a limitation to the quality of the user experience in navigating an augmented reality (AR) environment.

In summary, characteristics of conventional methods of solving a SLAM problem present a limitation to the accuracy of the solution to the SLAM problem and may place a size-limiting demand on the device computational resources.

3. Some Embodiments of Methods for Location Estimation

Some embodiments of the methods described herein address one or more problems within a SLAM framework separately. In some embodiments, the separated problems may be solved in parallel with updates occurring at different frequencies. Since the update frequency that yields good performance may differ for each problem, this approach may facilitate a better allocation of computing resources.

An environmental description may include features. A feature may have the following two properties: first, it can be identified from different points of view; second, from every point of view it will be determined to have the same location. For example, the top of a rectangular table may be described by 4 point features (the corners), 4 line segments (the edges) and one plane feature (the table surface).

It is often the case that aspects of an image are visually significant, but are not suitable for use as features. A specular reflection may be visually significant, but generally not visible over a sufficiently wide range of viewing angles to be useful as a feature. The visual edges of a cylinder may appear significant, but as the viewer moves around the cylinder the edges move, making them unsuitable for use as a feature. When a horizontal foreground edge crosses a vertical background edge a visual corner is generally formed, and it may appear similar from different points of view, but the position of the corner may depend on the viewing angle, making it unsuitable for use as a feature.

In some cases, the assessment of suitability of a feature is a matter of degree. Many features are not visible from every possible viewing angle. Points that appear well-defined at one distance may turn out to be rounded on closer examination. Any suitable techniques for deriving features from an environmental description may be used.

Some embodiments of the methods presented herein pertain only to features that can be described by linear equations: points, straight lines, and flat planes. Each feature may be described by an estimated position and a covariance describing the uncertainty (in units of distance squared) of that position. In the case of a line the position can be any point on the line, and the uncertainty of the axis along the line is infinite. In the case of a plane the position can be any point on the plane, and the uncertainty of each axis along the plane is infinite.

In some embodiments, the estimation of the location involves a determination of pairings between features derived from the "frame" (e.g., the collection of images recorded by the rig) described using "frame coordinates" that move with the rig, and features derived from the "world" (e.g., the existing description of the environment) described using stationary "world coordinates". It may be the case that a frame feature admits multiple plausible pairings with world features, or that a world feature admits multiple plausible pairings with frame features. Some of the pairings may be incorrect.

The data available to derive pairings may include the relative distances between features. If an accurate estimate of the rig location is available the uncertainties may be used to derive pairings using statistical distances. If a color camera is available, images surrounding features may be used to derive pairings. Any suitable techniques for determining pairings between features may be used.

Some embodiments of methods described herein solve the problem of estimating the rig location, which may be described in terms of the position and rotation. Given a position and rotation of the rig in world coordinates, the change from frame coordinates to world coordinates is described by a linear transformation consisting of a reorientation (e.g., rotation) and a displacement (e.g., translation). To account for the possibility of spurious features, incorrect pairings of feature pairs may be assigned a "weight." The weight assigned to a feature pair is generally a number between 0 and 1, which may represent the quality of the pairing. Additionally, given a possible transformation, for each feature pair the probability that the particular transformation yielded the frame measurement from the world feature can be assessed given the uncertainties associated with both the world and frame features.

An optimal location estimate may be the position and rotation that globally maximizes the product of probabilities of transforming world features to frame features, when each of those probabilities is exponentiated by its weight. This problem may be equivalently stated by mapping each feature pair of N-dimensional positions (e.g., 3-dimensional positions) to a single position in 2N dimensions (e.g., 6 dimensions), and each pair of uncertainties to a squared distance function in 2N dimensions. In this statement the problem to be solved is finding the N dimensional optimal subspace with respect to an objective function, when the orientation of the subspace is restricted to correspond to rotations. In this statement the objective function is equal to the squared distances multiplied by weights, summed over all feature pairs. Furthermore, only the orientations of subspaces need to be considered, since for any given orientation the optimal position is the unique minimum of a quadratic objective function.

If the distance functions were all scalar multiples of a standard distance function this problem would have an analytic solution in terms of linear equations. First, the optimal subspace orientation would be found when no orientation restriction is applied by means of an Eigen-decomposition. Second, the subspace corresponding to a rotation that is closest with respect to the standard distance function would be found by means of a singular-value-decomposition. The solution to this problem is referred to herein as the "scalar subspace" while the solution to the general problem is referred to herein as the "optimal subspace."

For many types of cameras, as the distance from the cameras increases the angular uncertainty increases linearly while the radial uncertainty increases quadratically, resulting in uncertainties that are strongly dissimilar for different feature pairs. Given an initial estimate of the subspace orientation a path of steepest descent with respect to the objective function could be followed to reach a locally optimal subspace orientation. However, for most types of cameras, the "catchment volume" (the volume of subspace orientations connected to the optimal subspace by a path of steepest descent) is a small fraction of the volume of all possible subspace orientations.

This problem of small catchment volume can be resolved by interpolating the measurement uncertainties between their actual values and chosen scalar multiples of a standard uncertainty. Unless there is a bifurcation, the globally optimal subspace orientation may be smoothly interpolated from the known scalar subspace to the optimal subspace. In particular, since the objective function is concave near the optimal orientation, as the blending is interpolated the optimal orientation can be estimated using quadratic minimization. Even in a case where there is no initial estimate of the location, the scalar subspace may be used as a viable starting point for the optimization.

Suppose that some of the features in the frame are associated with stationary objects and other features are associated with a moving object. The features associated with the moving object may be consistent with a different transformation than the stationary features. In this case there may be two significant minima of the objective function: one minimum associated with transformation of the stationary features due to the rig's movement, and another minimum associated with the transformations of the rig and moving object. In this situation a bifurcation of the global minima may occur as the uncertainties are interpolated.

As described above, some feature pairs may be invalid. In some cases either the frame or the world feature has a position that depends on the viewing angle. In some cases both world and frame features are valid, but the pairing is incorrect. In some cases the features and matching are valid, but the feature is on a moving object. Finally, in some cases measurement error may yield a disparity that is significantly larger than the estimated uncertainty. All such feature pairs are collectively referred to as "outliers," and the inclusion of even a single outlier feature pair can yield a strong bias in the estimated location.

The "residual" of a feature pair with respect to an estimated location may be determined as the difference between the existing world position of the feature and the frame measurement of the feature transformed to world coordinates by the estimated location. The "pull" of a feature pair with respect to an estimated location may be determined by multiplying the residual and the inverse square root of the uncertainty covariance. When no outliers are present and the location is accurately estimated, the pulls of the feature pairs are sampled from an ideal normal pull distribution with a mean of zero and unit covariance.

When outliers are included in the data for which an accurate estimated location is known, the outliers generally have large pulls, corresponding to small probabilities of occurrence due to measurement error. In this case, assigning a weight to each feature pair equal to the probability of occurrence of its pull facilitates identification and removal of all outliers.

When the location is not optimal, the mean of the pull distribution may be non-zero, and when the location is not correctly estimated the covariance of the distribution may be greater than the unit covariance. As the optimization proceeds, weights can be assigned to feature pairs relative to the estimated pull distribution, rather than the ideal pull distribution. This enables both the weights and the location to be progressively optimized.

Figure 12:
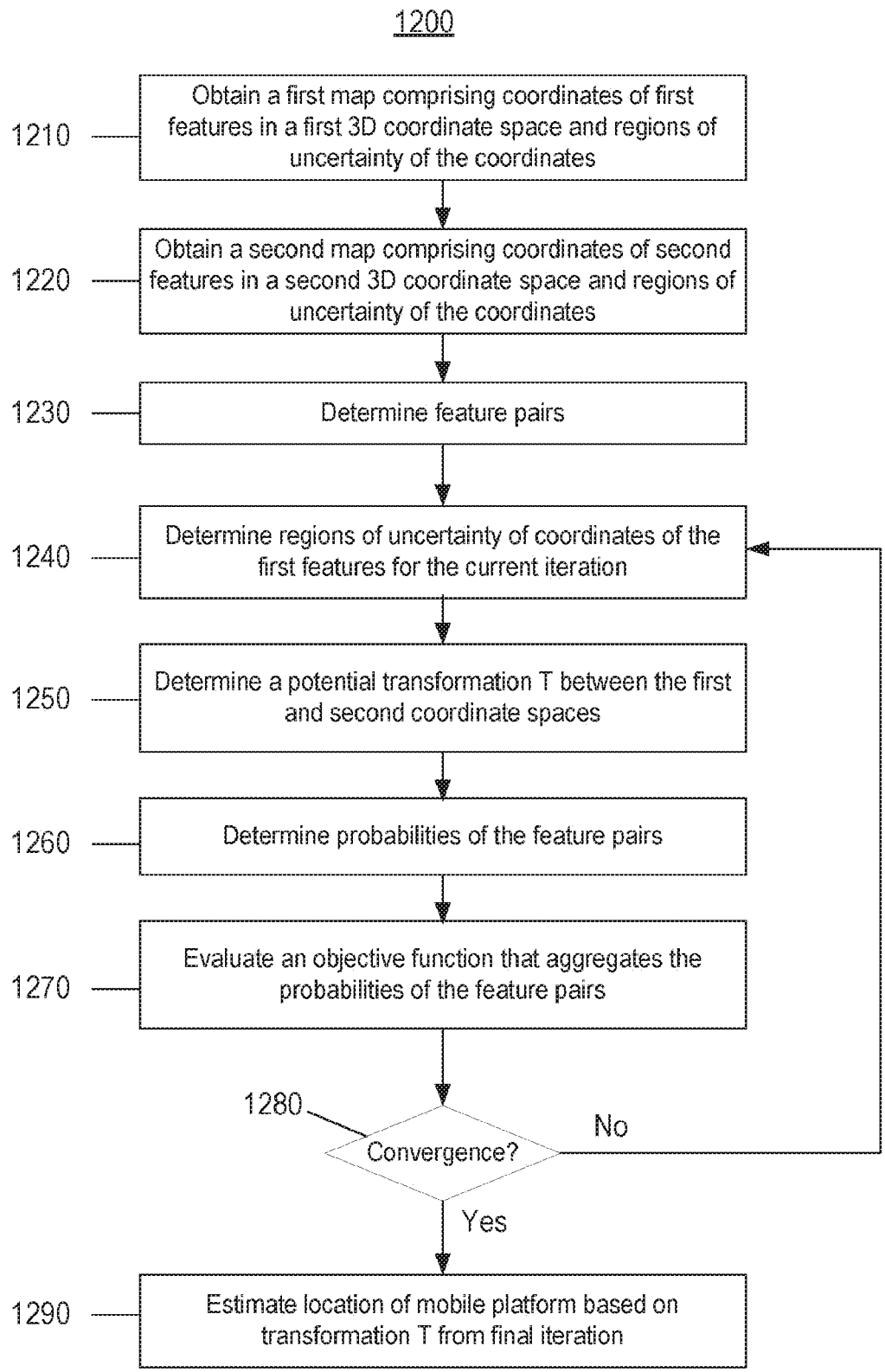
FIG. 12 is a flowchart of a method for estimating the location of a mobile platform, according to some embodiments.

Referring to FIG. 12, a method 1200 for estimating the location of a mobile platform may include steps 1210-1290. Some embodiments of the method 1200 may facilitate the task of efficiently finding the statistically optimal location of the mobile platform for scenarios in which the uncertainties associated with the coordinates of the map features are anisotropic and/or non-proportional. Some embodiments of the method 1200 may be used to estimate the location of a mobile platform in a two-dimensional environment or in a three-dimensional environment.

In step 1210, a first map is obtained. The first map includes coordinates of first features within a first coordinate space (e.g., a frame coordinate space) and first regions of uncertainty of the coordinates of the first features. The first regions of uncertainty may include at least two regions with non-proportional dimensions. In addition or in the alternative, the first regions of uncertainty may include at least two regions with anisotropic dimensions along at least two orthogonal axes of the first coordinate space. In some embodiments, the first map is obtained by extracting features from images provided by a mobile platform's camera(s).

In step 1220, a second map is obtained. The second map includes coordinates of second features within a second coordinate space (e.g., a world coordinate space) and second regions of uncertainty for the coordinates of the second features. The second regions of uncertainty may include at least two regions with non-proportional dimensions. In addition or in the alternative, at least two of the second regions of uncertainty may have anisotropic dimensions along at least two orthogonal axes of the second coordinate space. In some embodiments, the second map is a world map.

In step 1230, feature pairs are determined. Each feature pair includes a first feature of the first map and a second feature of the second map. Any suitable feature pairing technique may be used. As described above, each of the first features may be paired with zero, one, or more than one of the second features, and each of the second features may be paired with zero, one, or more than one of the first features.

In steps 1240-1280, one or more iterations of an iterative process is performed. In step 1240, third regions of uncertainty of the coordinates of the first features are determined. For example, in the first iteration of the iterative process, the first regions of uncertainty associated with the coordinates of the first features may be set aside in favor of mutually proportional and/or isotropic regions of uncertainty. Using mutually proportional and/or isotropic regions of uncertainty in the first iteration may facilitate the estimation of a location that is reasonably close to the statistically optimal location of the platform. The dimensions of these mutually proportional and/or isotropic regions of uncertainty may be determined, for example, based on the dimensions of the corresponding first regions of uncertainty. In some embodiments, the isotropic region of uncertainty for a given feature is a spherical region having a radius equal to (1) the mean of the angular components of the first region of uncertainty, (2) the radial uncertainty of the first region of uncertainty, (3) the mean of all components of the first region of uncertainty, or (4) any other suitable value.

In iterations subsequent to the first iteration, the third regions of uncertainty may be determined by blending (1) the first regions of uncertainty and (2) the mutually proportional and/or isotropic regions of uncertainty. For example, the dimensions of the third regions of uncertainty may be obtained by interpolating between the dimensions of the proportional/isotropic regions and the dimensions of the first regions. Eventually, the first regions of uncertainty may be used in subsequent iterations (e.g., the third regions of uncertainty may, in these iterations, simply be the first regions of uncertainty).

One of ordinary skill in the art will appreciate that the techniques described in the preceding paragraphs with respect to the regions of uncertainty associated with the first features (e.g., using proportional/isotropic regions of uncertainty in a first iteration; blending the proportional/isotropic regions with the second regions of uncertainty in subsequent iterations; etc.) may also be applied to the regions of uncertainty associated with the second features.

In step 1250, a potential transformation T between the first coordinate space and the second coordinate space is determined. In the first iteration of the iterative process, the potential transformation may be determined by estimating the location of the mobile platform and selecting the transformation that corresponds to the platform's estimated location. The location of the mobile platform may be estimated based on a motion model of the mobile platform. For example, the platform's location may be estimated by integrating the motion model from a previous state, and/or by using other measurements of the platform's location. Such measurements may be obtained, for example, using navigational techniques and/or systems known to one of ordinary skill in the art (e.g., inertial measurement units (IMUs), inertial navigation units (INUs), satellite-based positioning systems (e.g., the Global Positioning System (GPS)), triangulation, etc.).

Alternatively, in the first iteration of the iterative process, the potential transformation may be determined using a location estimation technique other than the location estimation method 1200. For example, a "scalar optimal" estimate of the platform's location may be calculated. The scalar optimal estimate may be obtained by setting the third regions of uncertainty to be mutually proportional and/or isotropic, and solving for the location of the mobile platform that corresponds to the proportional and/or isotropic region of uncertainty. In other words, the potential transformation may be derived from an estimate of the platform's location that is consistent with the assumption that the regions of uncertainty associated with the features are proportional and/or isotropic. One example of a suitable scalar optimal location estimation algorithm is the Kabsch algorithm.

In subsequent iterations of the iterative process, the potential transformation may be determined by mapping the first transformation to a subspace (e.g., a 2D or 3D subspace) of a joint coordinate space (e.g., a 4D or 6D space), rotating the subspace in a specified direction by a specified angle, and mapping the rotated subspace to the potential transformation. In some embodiments, the direction and angle of rotation may be obtained by applying Newton's method to the objective function associated with the previous iteration of the iterative process. In particular, the zero, first derivative (gradient) and second derivative (Hessian) of the objective function may be calculated with respect to changes in the orientation of the transformation subspace in any of the directions in which the subspace continues to describe a rotation. The computed derivatives may be used to define a local quadratic approximation (e.g., a Taylor approximation) on the tangent space of changes of subspace orientation (Newton's method). A vector from the zero of the objective function to the minimum of the quadratic approximation in the tangent space of changes of orientation may be determined, and the subspace may be rotated in the direction of the vector and by the magnitude of the vector.

In step 1260, probabilities of the feature pairs (or values corresponding to the probabilities of the feature pairs) may be determined. The probabilities of the feature pairs may depend on the third regions of uncertainty. The probability of each feature pair may be the probability that the coordinates of the first feature of the feature pair represent a measurement of the second feature of the feature pair obtained from the location of the mobile device corresponding to the potential transformation, or the probability that a mobile platform located at a location L corresponding to the potential transformation T would observe the second feature at the location of the first feature (after using the transformation T to transform the first feature into the second coordinate space), or the probability that applying the transformation T to the first feature yields the second feature. In some embodiments, the probability of each feature pair is determined based on a weight of the feature pair and a squared sigma distance (SSD) of the feature pair.

In some embodiments, the probability of a feature pair is SSD*W, where SSD is the squared sigma distance of the feature pair and W is the weight of the feature pair. Some examples of techniques for determining the weights of the feature pairs are described below. In some embodiments, the SSD of a feature pair is a distance in a common coordinate space between (1) the third region of uncertainty associated with the coordinates first feature of the feature pair, and (2)

the second region of uncertainty associated with the coordinates of the second feature of the feature pair.

In some embodiments in which the measurement uncertainties are described using normal distributions, the SSD of a feature pair is linearly related to the Bhattacharyya distance by an invariant coefficient, and an added constant. Specifically, if R is the difference of positions (the residual) and U is the sum of the uncertainties, then SSD=R*Inv[U]*R. (Here, Inv[ . . . ] denotes a matrix inverse and * denotes a contraction, so SSD is a scalar.)

In some embodiments, the SSD of a feature pair is equivalently determined by mapping the features (and the associated uncertainties) to a joint coordinate space (e.g., a 4D space for 2D features or 6D space for 3D features) and calculating the square of the sigma distance from the region in 6D space from the feature pair to the subspace (e.g., 2D or 3D subspace) representing the transformation T from step 1250.

In step 1270, an objective function that aggregates the probabilities of the feature pairs may be evaluated. In some embodiments, the objective function G is the product of the probabilities of all feature pairs Pi, and the optimal estimated location corresponds to G's maximum. In some embodiments, the objective function G is the sum of Wi*SSDi for all feature pairs Pi, where Wi is the weight assigned to the pair Pi and SSDi is the squared sigma distance of the pair Pi, and the optimal estimated location corresponds to G's minimum.

In step 1280, a determination may be made as to whether the fitting process has converged (e.g., whether the value of the objective function has reached the global optimum value). In some embodiments, the fitting process is determined to have converged if all of the following criteria are met:
  The third regions of uncertainty determined in step 1240 are the first regions of uncertainty obtained in step 1210 (e.g., not proportional or isotropic approximations of the first regions of uncertainty, and not blended regions);
  The pull distribution of the feature pairs is sufficiently close to the unit distribution (e.g., the covariance of the pull distribution is less than a threshold value on all axes; and
  The magnitude of the gradient vector is less than a small threshold value.

If so, the iterative process may end, and the potential transformation evaluated during the final iteration may be the statistically optimal transformation between the first and second coordinate spaces (e.g., the transformation may maximize the product of probabilities of transforming the features of the first map to the features of the second map). Otherwise, a new iteration of the iterative process may be initiated.

In step 1290, the location of the mobile platform is estimated based on the potential transformation from the final iteration of the iterative process. For example, if the potential transformation is a transformation from the first coordinate space to the second coordinate space, the location of the mobile platform may be estimated by applying the inverse of the transformation to the origin of the second coordinate space.

Figure 13:
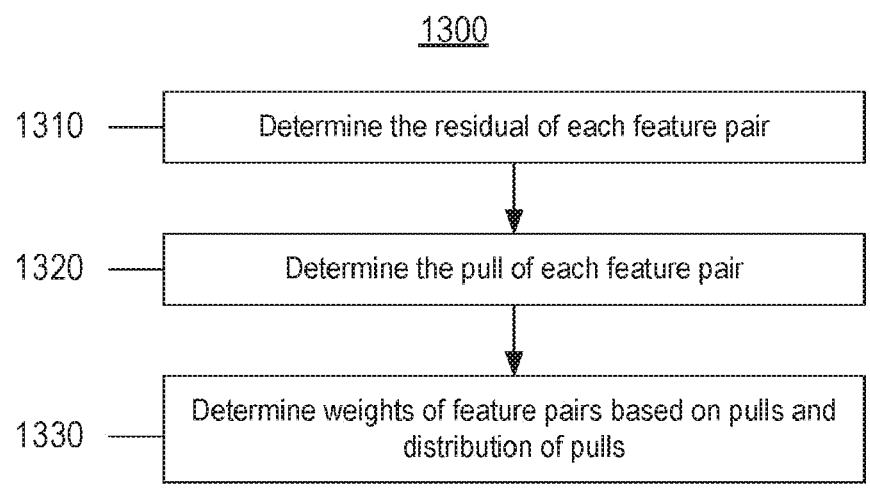
FIG. 13 is a flowchart of a method for determining weights of feature pairs, according to some embodiments.

Referring to FIG. 13, a method 1300 for determining weights of feature pairs may include steps 1310-1330. In some embodiments, the weight of each feature pair represents a confidence that the features of the feature pair are correctly paired and stationary.

In step 1310, the residual of each feature pair is determined. In general, the residual of a feature pair may be the displacement between the observed value of the feature pair (the coordinates of the first feature) and the predicted value of the feature pair (the coordinates of the second feature). In some embodiments, the residual of a feature pair is determined as the displacement between the coordinates of the first and second features of the feature pair in a common coordinate space (e.g., the displacement between the coordinates of the features after transforming the first feature from the first coordinate space to the second coordinate space or after transforming the second feature from the second coordinate space to the first coordinate space). The transformation determined in step 1250 of the method 1200 may be used to transform the features. In some embodiments, the residual of a feature pair is determined as the displacement between (1) a point in a joint coordinate space (e.g., a 4D or 6D space) representing the feature pair, and (2) a point on a subspace (e.g., a 2D or 3D subspace) representing the transformation from step 1250 of the method 1200, along a vector orthogonal to the subspace.

In step 1320, the pull of each feature pair is determined. The pull (a unitless quantity) of a feature pair may be determined as the product of the residual of the feature pair and the inverse square root of the uncertainty of the feature pair. The value of the uncertainty of the feature pair depends on the regions of uncertainty associated with each feature pair.

In step 1330, parameters of the distribution of pulls of the feature pairs is determined. For example, the mean and covariance of the distribution of pulls may be determined. In some embodiments a computation of the pull covariance includes the weights (hence suppressing outliers). Since this covariance is used to determine the weights a feedback cycle could result in which the covariance is progressively reduced regardless of the quality of the data. In some embodiments the estimated covariance may be stabilized by multiplication by a suitably chosen constant value (e.g., 2). In some embodiments, reducing the covariance to less than a minimum value may be undesireable. In some embodiments a minimum covariance may be facilitated by adding that constant value to the covariance, which a commensurate adjustment to the choice of stabilizing coefficient that will facilitate convergence to (and hence stability at) a target covariance. (In the case of pull distributions asymptotic convergence to the unit distribution may be facilitated by adding the unit distribution and rescaling by 3/2.)

Figure 14:
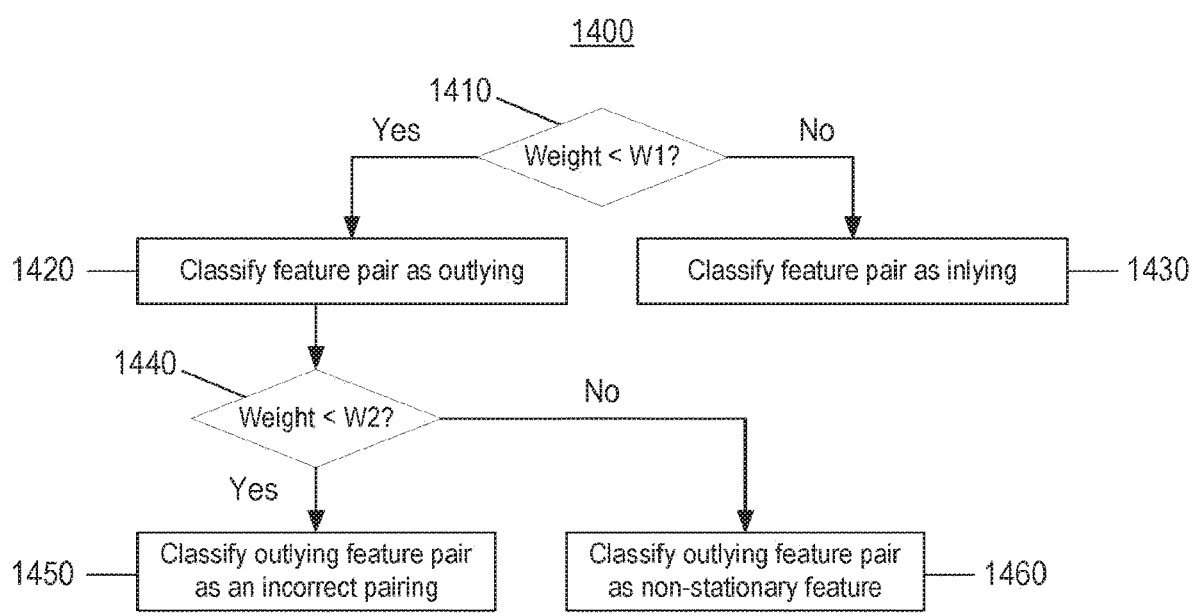
FIG. 14 is a flowchart of a method for detecting and processing outlying feature pairs, according to some embodiments.

Referring to FIG. 14, a method 1400 for detecting and processing outlying feature pairs may include steps 1410-1460. Detection and processing of outlying features may be performed, for example, after the iterative estimation process converges.

In step 1410, the weight of a feature pair may be compared to a threshold weight W1. If the weight of the feature pair is less than the threshold weight, the feature pair may be classified as outlying in step 1420. Otherwise, the feature pair may be classified as inlying in step 1430. In some embodiments, when feature re-estimation is performed (see Section 4, below), inlying feature pairs are used in the re-estimation process, but outlying feature pairs are not.

In step 1440, the weight of the outlying feature pair is compared to a threshold weight W2, which is less than the threshold weight W1. If the weight of the outlying feature pair is less than the threshold weight W2, the outlying feature pair may be classified as an incorrect pairing in step 1450. In some embodiments, feature pairs classified as incorrect pairings are removed from the set of feature pairings, and the first feature is added to the second map as a new second feature (after transforming the first feature to the second coordinate space).

If the weight of the outlying feature pair is not less than the threshold weight W2, the outlying feature pair may be classified as a non-stationary feature in step 1460. Non-stationary features may be on moving objects, for example. In some embodiments, the locations of non-stationary features may be tracked as follows:

Remove all inlying feature pairs;
Use a location tracking technique to determine a transformation T2 of the moving object (e.g., from the second coordinate space to the first coordinate space);
For the remaining (non-stationary) feature pairs, determine the weights corresponding to the transformation T2; and
Differentiate inlying feature pairs from outlying feature pairs based on the new weights, and treat the inlying feature pairs as being features on the moving object.

In the case of multiple moving objects, the foregoing process can be repeated, with the inlying matches of each known moving object being removed in succession.

In some embodiments, the location estimation method 1200 is a particular application of a geometric linear regression with non-uniform (e.g., non-proportional and/or anisotropic) uncertainties. Some embodiments of this geometric linear regression may also be applied to one or more of the following problems:

In cases where the feature points of interest are (some or all) vertices of a mesh (e.g., to facilitate mesh updates and merges);
Reconciliation of databases (e.g., to allow for rescaling in the case of imperfect calibration of camera positions relative to the rig);
Monoscopic SLAM (e.g., when the distance between cameras is uncertain a scale factor can be included in the transformation fit);
Calibration of multiple cameras in a rig (e.g., in conjunction with world feature estimation to align cameras);
Calibration of a camera installation (e.g., a collection of cameras imaging a stage or warehouse);
Estimations of controllers (e.g., hand held game controllers), for example, in conjunction with visual signaling (e.g., a stylus as described herein);
Relative positioning of other SLAM systems (e.g., headsets, drones, vehicles);
Planar surface position estimation (e.g., a fitting a floor or wall), such that the fitting would find a 2D subspace in 3D;
Building movement measurements from external observations of buildings (e.g., skyscrapers); and
Elastic material deformations, with the full space of transformations considered.

4. Some Embodiments of Methods for Feature Estimation

In another embodiment, the techniques described herein facilitate the building of a description of the environment in which the rig is placed or operating. Given an estimated location of the rig, all of the features measured by the rig in a frame may update an existing geometric features (e.g., points, lines and/or planes) in the world, or may introduce a new feature.

Some embodiments of the methods described herein are applicable to systems of multiple rigs, and facilitate the combining of environmental descriptions provided by all rigs. In particular, using the data representation and feature estimation techniques described herein, the combined environmental descriptions may be updated in a time period that depends primarily on the volume measured—not on the number of rigs in the system.

Given multiple measurements of a single point taken by different devices operating in the same environment, where each measurement is described by a probability function, the measurements may be combined by multiplying the probability distributions. Unless there is a possibility that the point does not exist, the resulting probability is then rescaled to have a unit integral.

In each frame, the position of each feature relative to the rig is measured independently from each of the other features. However, any uniform displacement or reorientation of all feature measurements would simply yield a compensating change in the position and rotation of the rig while not necessarily improving the accuracy of the position estimates. In effect, frame measurements are not informative with respect to uniform displacements and reorientations of points, which may be expressed as an infinite uncertainty in these dimensions with respect to the combined state of all points in the frame. Consequently, while the measured positions of features have independent uncertainties in frame coordinates, the uncertainties in world coordinates are correlated.

Feature measurements may be individually described using normal probability functions in frame coordinates. In world coordinates they may be collectively described using a normal probability function that is non-vanishing with respect to displacement, and is also non-vanishing in the directions determined by infinitesimal uniform reorientations of points.

The process of multiplying and then rescaling normal distributions may be equivalently described by the addition of the "inverse uncertainty" (the inverse of the covariance tensor describing the normal distribution), and the addition of the product of the "lowered position" (the product of the inverse uncertainty with the mean of the normal distribution). Using this description, the description of the positions of features in the environment requires only the addition of the inverse uncertainty and the lowered mean of the collection of all measurements in each frame. Given any aggregated set of measurements, the collection of individual position estimates multiplied by the inverse uncertainty must yield the lowered positions, so position estimates may be recovered as solutions of this equation. Likewise, individual uncertainties associated with features may be recovered as blocks along the diagonal of the inverse of the aggregated inverse frame uncertainties. This solving may address only a subset of points, while using a previous solution to account for the influence of all other points.

Because the feature measurements are additive, a server hosting an environment description database may easily support multiple clients without increasing the extent to which the database is locked for updating. First, each client may aggregate their own measurements before providing the hosting server with an aggregated update. Because the measurements are additive, an update of the database from hosting server only needs to inform the client whether their update has been included. Second, updates from clients may be added to each other independently before being added to the database. This intermediate addition naturally yields a hierarchy of hosting servers. Finally, measurements may be added gradually without violating the symmetric positive definite property of the inverse uncertainty. The requirement on gradual addition is that when each measured dimension is added its correlations to all other dimensions that have already been added must be included as well.

Because the database includes correlations arising from simultaneous measurements of features, when the completion of a loop requires an adjustment of feature positions around the loop, the optimal adjustments are necessarily included when estimates are updated by solving the system of equations for all points around the loop.

For many applications it is necessary to relate additional information to the environment description. Because the rig location is determined in relation to the estimated feature positions in world coordinates, a revision of these estimates will result in a commensurate revision of the estimation of the rig location. Consequently, additional information whose location is defined using world coordinates may initially appear to be correctly located relative to the environment, but may appear to be incorrectly located after a revision of the estimated feature positions.

To resolve this, the location of additional information is not defined using world coordinates. Instead, locations are defined relative to adjacent features, so that revised estimations of feature positions will yield commensurate revisions in the location of associated additional information. In particular, if one user receives a revised estimate of feature positions while an adjacent user does not, those users will remain in agreement regarding the location of additional information in their environment.

Various embodiments of the invention provide techniques for improving the uncertainties and estimated feature positions under numerous conditions while addressing the constraints noted above.

One embodiment for aggregating uncertainties starts with a set of measurements of features described by positions p[f] with uncertainties u[f] measured in frame coordinates, from which a direct-sum of the positions is calculated as PF, such that the set of first three components is p[0], the second set of three components is p[1], and so on. Similarly, calculate a direct-sum of the uncertainties as UF such that the first 3×3 block along the diagonal is u[0], the second 3×3 block is u[1], and so on. In cases where no correlations exist between the measurements the components of U that are not the diagonal blocks are zero. Further, define the "inverse uncertainty as VF=inv[UF] where inv denotes a matrix inverse function, and define the "lowered position" as QF=VF*PF (where "*" denotes the matrix product function).

Given an existing transformation matrix T from frame coordinates to world coordinates estimated using p[f] and u[f], define X as the projection to zero of the axes describing the uniform translation or infinitesimal uniform rotation (non-linear displacement) of the features. Using the projection matrix X, the inverse uncertainty and lowered position can be transformed into world coordinates, e.g., Q=X[T[QF]] and V=X[T[VF]], where VF is a block-diagonal matrix, the application of T yields a block diagonal matrix and the application of X introduces correlations among the measurements so the final result is a block-diagonal matrix. T is initially described as a linear transformation of coordinates in three dimensions, and this extends to apply to QF by applying T to each triplet of coordinates. In contrast X is only defined for the direct sum space. For example, if tx={1, 0, 0} describes translation in the x direction for three dimensions, then TX={1, 0, 0, 1, 0, 0 . . . } describes uniform translation of all features in the x direction.

For a given frame, a choice of absolute data may be made by defining Y=I-X (where I is the identity transform), A=Y[T[VF]] and B=Y[T[QF]]. Reconciliation of maps is then effected by a rotation of coordinates and a redefinition of A and B.

Then, given two sets of measurement aggregates {V0, Q0} and {V1, Q1} expressed in world coordinates, and a known correspondence of features, the data may be structured such that features ordered according to a known correspondence, zeros may be inserted to accommodate features that do not correspond, and resulting in the equal dimensions for the expressions of both sets of measurements. Furthermore, the combination of measurements of features can be represented as a product of the correlated probability distributions ad the sums of these terms {V2=V0+V1, Q2=Q0+Q1}.

Given absolute measured position B, and associated uncertainty A, positions P2 and uncertainties U2 of the combined measurements in world coordinates are recovered by computing:

$$U2=Inv[A+V2]$$

$$P2=U2*(B+Q2)$$

As rig locations are estimated in successive frames, the measurements can be aggregated by a (client) rig without requiring the estimation (or recalculation) of U and P. For example, a partial map may be used to re-estimate feature positions and uncertainties by decomposing the linear solve into "internal" and "external" blocks, and retaining pre-computed terms (of dimensionality equal to the internal terms) summarizing the contribution of the external terms to the linear solve. In effect, the linear solve combines the update measurements in the "internal" with summary based on previous measurements of the "external" contributions. In some embodiments the determination of the pre-computed terms follows methods applied to parallelized matrix decomposition and inversion.

When multiple rigs are present and using the same coordinate system their measurements can be combined additively by a host. This requires a determination of feature correspondences (or lack thereof) for any new features, and updates from and to a host may be defined in terms of differential changes. Hierarchical host aggregation can be used to handle multiple clients so that no single host is overburdened, and updates may be added partially, so long as the corresponding correlations are also added.

In some embodiments, feature removal may be effected by removing selected rows and columns from U and P, where specific features to be removed can be flagged and removal of multiple features can be done simultaneously.

Due to the inclusion of correlations, the size of the database may appear to grow quadratically in relation to the number of features being tracked. However, in the scenario described above, correlations only exist between features that are measured together (e.g., that are visible together) in any single frame from a specific rig. Consequently, the extent of the correlations is limited and the matrix Q is sparse, with the non-zero entries appearing in bands or clusters.

In some embodiments, reconciliation of different world coordinate systems may be accomplished using the location estimation methods described herein.

For example, given a known correspondence between features and in the absence of an initial transformation, the "scalar optimal" initialization can be used. Since the scale of a map is determined relative to the separation between cameras in a rig, it may be necessary to generalize the fitting to allow for uniform rescaling. Once the reconciliation transformation has be derived, the databases may be added as described above. The reconciliation process may be relevant in a number of scenarios, including, for example, when a rig joins a network where there is a hosted database, when re-loading a database from a file in order to resume an augmentation after a rig has been temporarily shut down, and when tracking has been lost (e.g. cameras covered, algorithms failed to converge) and is subsequently resumed.

In another embodiment, methods for feature position, uncertainty re-estimation and loop closure may be used after aggregating measurements of features for a number of frames to improve location (position and orientation) estimation. This may occur, for example, when the rig approaches a feature whose last estimate was based on observations from a distance such that a re-estimation may significantly improve accuracy and/or when a proximate feature was previously viewed from one angle and has now been viewed from a range of angles. The re-estimation may be accomplished using the computational approach for U and P described above.

A "loop-closure" event occurs when one or more rigs traverse paths that together form a closed loop, where the loop did not previously exist within the graph of measured spaces (e.g., a rig spinning in a circle in a room that has not been measured).

Given the correspondences among features in in a locale with a closed loop, drift accumulated while traversing the loop may result in corresponding features that are significantly displaced relative to any individual uncertainty. Thus, aligning the corresponding features requires adjustments to all features in the map. Given aggregated measurements {Q0, P0} without the loop closure, aggregated measurements {Q1, P1} with correspondences that define the loop closure, and absolute reference measurements {A, B}, the optimal adjustments are P2, with adjusted uncertainties U2 as defined above.

Note that is may not be necessary to solve the entire map to re-estimate the features. This is because the estimations associated with features outside of the location of loop can be used to construct terms introduced into the linear system of equations and the map pertaining to the location of interest, or to a loop, can be solved in isolation without yielding a re-estimation and subsequently used to re-estimate other features.

In another embodiment, techniques for achieving eventual coherency among databases such that when two or more rigs (R0 and R1) are used for augmented reality (e.g., present in physical space viewing the same virtual objects), the virtual objects appear to be in the same position in the physical world.

Multiple databases maintained by the different rigs may not be equal for a number of reasons. For example, independent measurements may not have been synchronized, synchronization with different states of a host database, when feature correspondences indicating a loop closure have been identified but the loop closure has not yet been computed or when a rig revises its estimated feature positions, as it is critical that there be no apparent motion of the rig in relation to virtual objects. (In a VR use case—when the view of the world is completely obscured—this is critical for user comfort.)

Moreover, When the databases are not equal the estimated feature positions and uncertainties (P, U, and from which p[f], u[f] are extracted) might also not be equal, and thus each rig's determination of its own location may differ from the other rigs determination of its location. As a result, when virtual objects described by equal world coordinates are viewed by rigs using feature position (and uncertainty) estimates that are not equal to the positions of the virtual objects in relation to real objects, the virtual objects will appear different for each rig, with the difference being determined by the difference in the world positions of the features.

In contrast, corresponding features measured by both rigs will necessarily appear to be consistent in their relation to the physical world. By "anchoring" virtual objects to features, instead of defining their location in world coordinates, each rig will see that the virtual object is in the same position relative to the world, even if the coordinates of that position differ. In some embodiments, a virtual object may be anchored to one feature, two features, or more than two features (e.g., three features, five features, or any suitable number of features).

Anchoring in general defines the virtual object's location relative to features. It can be accomplished by defining a virtual object's position to be a weighted mean of several feature positions, and a virtual object's orientation to be a transformation of the span defined by vectors from the mean to each feature. This enables the augmented views of the rigs to be "coherent" even when their respective databases and derived information are unequal. In some cases, it is possible to use more than four points for anchoring. In the case that any of the points are determined to be moving, this enables a redefinition of the anchoring to keep the anchored virtual object stable.

The anchoring approach to augmentation definition has many domains of applicability. For example, as measurements are aggregated and as loop closures are resolved, the estimated world coordinates of features may be adjusted. Virtual objects located relative to these features will retain their relationship to the physical world, while virtual objects located using absolute coordinates will drift. This same method may be applied to anchor a virtual object to features of an object that is physically moving (e.g. a controller).

The same methodology may be applied to include ancillary information pertinent to the SLAM problem. In particular, if "keyframe" images taken by a camera at known locations are recorded with the map, it may be critical for the features to remain aligned with the images after the map updates. This can be accomplished by defining the locations of the images using anchoring.

5. Some Embodiments of Methods, Apparatus, and Systems for SLAM 5.1. SLAM Software System and Hardware Configuration Techniques that utilize special-purpose software and hardware and supporting systems described herein have been designed to solve the SLAM problem, or "SLAM system", to deliver more accurate and reliable solutions to the SLAM problem while reducing demand on computational resources.

The SLAM system may be implemented via various software configurations. According to some embodiments, a SLAM system may be configured to include a SLAM optimization framework implemented in software that enables more accurate solutions than conventional solutions to the SLAM problem while reducing computation cost. For example, a SLAM framework may apply optimizing algorithms to the SLAM problem to provide more accurate estimations of geometric information of the SLAM system in an augmented reality environment and more accurate estimations of geometric information for features in the reconstructed world.

The SLAM system may also be implemented using various hardware configurations. In some embodiments, the hardware system may include sensors configured to provide coordinates of geometric features including a well-defined estimation of uncertainty in measurements. Sensors may include, but are not limited to, any combination of Inertial Measurement Units (IMU), cameras, depth sensors, odometers, GPS receivers, accelerometers, compasses, and/or antennas. The hardware system may contain specialized processors including, but not limited to, FPGAs and/or graphics engines configured to perform SLAM optimizing algorithms in real-time while collecting data from multiple sensors (e.g., in a parallel, dynamic, asynchronous, and/or synchronous manner). The processors may include programmable interfaces between the sensors and the processing unit (e.g., interface between camera and rest of SLAM system) to correct for known invariant measurement biases (e.g., compensation for lens distortion or color correction). The hardware system may be configured to determine its own position and orientation in the world and/or the position and orientation of a user. The user may be a human being or a machine-user such as a robot. The hardware system may be contained in a small, light-weight and portable form factor such that it may be worn on the user or carried by the robot.

In some embodiments, the system may be embedded within a mobile machine configured to autonomously maneuver itself in an environment. SLAM systems may operate alone or in collaboration with other SLAM systems. For example, a swarm of mobile SLAM systems may solve the SLAM problem collaboratively and share data.

5.2. Improving Accuracy of SLAM Algorithms Via Application of Uncertainty Information Solutions to the SLAM problem may be made more accurate using techniques described herein. The SLAM system may include hardware used to provide data about the SLAM system's motion and about its environment, and may include a collection of algorithms (the SLAM framework) implemented in specially-configured software to analyze and filter gathered environmental data such that the location of the SLAM system and/or features in the world may be made more reliable.

A SLAM system may accept data from a variety of sources. This data may include, but is not limited to, differential information that may be determined locally, for example angular velocity (e.g., from an odometer), linear acceleration and angular velocity (e.g., from an inertial measurement unit). Additionally, the SLAM system may provide absolute estimates of position and orientation, which may be effected by building a map of "features" in the environment occupied by the SLAM system. Features may include points, line segments, and/or surfaces described by any suitable means (e.g., Bézier curves or Algebraic Varieties) that may be descriptive of objects in the environment, and may be associated with ancillary information such as images or derived characteristics. The SLAM system can be used in these environments to determine position and/or orientation in relation to the features whose motion is known (e.g., assumed to be stationary).

A SLAM framework may include probabilistic models to align estimations for position and orientation of a SLAM system or features in the world. A probabilistic model may include a number of factors relating to position and rotation. For example, estimations of uncertainty in position and rotation of features in the world may be included. A probabilistic model may apply estimations of uncertainty in position and rotation in ways that reduce error in estimation of position and orientation. In some embodiments, estimations of the uncertainties of geometric data (e.g., of position and orientation) may be incorporated in a regression analysis to determine an estimation of the position, orientation and view of a SLAM system and thereby of the observed feature points in the world. Regression analysis methods may include, but are not limited to, Linear Regression, Geometric Regression and Bayesian Regression, and where optimization of the regression's cost function may be performed algebraically (e.g., Principal Component Analysis) or iteratively (e.g., Gradient Descent or Newton's Method) with iterations that may change the estimated optimization and may also change the cost function itself. Using certain approaches described herein, a solution set converges with a computational complexity scaling that is linear ($O(n)$) with respect to the number (n) of data points, which in some embodiments may enable a parallelization such that the time of execution is constant ($O(1)$) with respect to the number of data points. For example, a Regression method may be applied that optimizes the product of probabilities that chosen measurements are of points in a fitted linear subspace, subject to a weighting that may be determined in advance or during the measurement process.

Data classification algorithms may be applied to the input feature data sample before, during or after the optimizing algorithms are applied to provide a more accurate estimation of position and orientation. In some instances, the input feature data may be sorted into two or more categories. For example, relevant data (e.g., stationary features) to determine position and orientation may be identified and separated from non-relevant data (e.g., moving object in frame). The optimization algorithms may then be applied to the relevant data only or separately. The non-relevant data sample may be further sorted and stored for later use. Non-relevant data may contain spurious feature data, outlier feature data, and/or irrelevant feature data. Data classification may be influenced by the recognition that an object is of a movable or changeable type (e.g., by machine learned identification), a measurement of motion or change of shape while in the field of view (e.g., tracking the object while in motion), a determination of motion or change shape of an object while not observed (e.g., by identifying a change of environment), an apparent discrepancy between the characteristics of features (e.g., differences in proximate images), and/or the determination that a feature is both transient and inconsistent with the motion of the SLAM system (e.g., a feature from a T corner formed by crossed edges with different depths).

In embodiments in which weights are associated with data, these weights may be defined using various methods, which may include but are not limited to, similarity between current and previous observations (e.g., visual similarity), the probability of being measured from a point in the subspace (e.g., a maximum of the probability function for the measurement with respect to points in the subspace), or a determination that the measurement is exceptionally stable (e.g., a feature that is sharp corner rather than a rounded one). Weights may be used to reduce the contribution when a measurement may be spurious (weights <1) or to emphasize the contribution when a measurement may be underrepresented (weights >1). When weights are modified during the fitting process it is recognized that the chosen cost function (e.g., the Reduced Chi-Squared statistic) may penalize a reduction of the measurement information (e.g., the squared sum of weights divided by sum of squared weights) in order to avoid scenarios in which good fitting is achieved by assigning significant weights only to a number of data points approximately equal to the number of degrees of freedom of the fit.

In some embodiments, probability distributions may be used to describe the uncertainty of individual measurements, or a single distribution may be used to describe the correlated uncertainties of a set of measurements. These probability distributions may take the form of Gaussian distributions or of any other suitable distribution—for example any function from the Schwartz Space or of any more general space of functions in which chosen characteristics (e.g., the mean and covariance) may be finite.

The SLAM framework may make use of uncertainties pertaining to the position, orientation or other characteristics of one or more features of objects in the world (e.g., corners or edges of a table). Correlations may describe reductions in combined uncertainties of the possible change (e.g., displacements and rotations) that would not be apparent from individual observation. For example, features that are measured in relation to a viewer may have correlated uncertainties due to their dependence on the estimated viewer position. Knowledge of correlations in measurements may be used by the SLAM framework to improve the accuracy of estimated feature positions, and thereby the accuracy of estimated position and orientation of the SLAM system itself. For example, when reconciling estimated positions in an environment reached by two or more distinct paths, the reconciliation may require adjustments of features along all paths (e.g., Bundle Adjustment) the results of this adjustment may be improved by including the correlations between adjusted features in the optimizing process.

Finally, various statistical methods that compare expected and observed measurement distributions, such as pull distributions, may be used as a way to assess measurement bias and plausibility of estimated uncertainties of the stationary features in the world map or features on a rigid movable object. In this way, the SLAM optimizing algorithms may verify their own efficacy.

In sum, the optimization techniques described herein may perform functions such as estimate the position orientation and uncertainty of the SLAM system itself, characteristics (e.g., position and orientation) and relevant uncertainties of feature points, evaluating optimality and relevance of estimations using weights and data sorting algorithms, and evaluating optimality of estimations by comparing expected and observed distributions.

5.3. SLAM System Resource Management Techniques

The SLAM framework may yield a system whose computational resources may be managed more efficiently. For example, the SLAM framework may enable the separation of aggregating and storing data from feature point re-estimation. The SLAM framework may be applied to all data or to a suitably chosen subset that enforces relevant local constraints.

Re-estimation of the feature point positions (and related parameters) may be performed by linearly solving aggregated relationships between features. While the computational complexity scaling is equal for both steps ($O(n^3)$), the separation of re-estimation from the update of the estimated camera position and orientation allows for infrequent re-estimation performed on hardware that may be independent. Furthermore, the use of a linear solve rather than a full inversion may yield a multiplicative improvement in processing speed.

Data aggregation may be used for certain In some embodiments, the SLAM optimizing algorithms may yield a probability distribution representations of the uncertainty estimations of position and orientation. For position estimations, for example, the Gaussian distribution may represent where a feature point may be. Multiple feature point position estimations may be aggregated by multiplying these Gaussian distributions together. Multiplying Gaussian distributions yields a computationally inexpensive method of aggregating data. In some embodiments, Gaussian distributions representing estimations collected from multiple and/or different kinds of sensors may be quickly combined or fused. Data may be aggregated continuously while feature point re-estimation may occur less frequently. In some embodiments, feature point re-estimation may not be performed for most frames. For example, using the SLAM optimization techniques for feature point re-estimation may be applied selectively (e.g., for 1 out of 10 frames) and may be performed in a semi-offline manner.

A SLAM system may be configured to further reduce demand on computational resources. According to some embodiments, a resource management technique may be applied within the SLAM system to partition the SLAM problem into parts that may be independently and/or sequentially solved. For example, the resource management technique may apply optimizing algorithms to solve for position and orientation of the SLAM system separately from solving for optimal fits of features in the reconstructed world. In some instances, once an optimal position and orientation of the SLAM system is found, these optimal solutions may then be used to update the estimated feature information (e.g., world position and orientation). In some embodiments, the resource management technique may provide the option to either deliver a rapid turn-around of accurate position, orientation and viewing estimates, including uncertainties, or delay delivery to continue to improve these estimates. In this way, the SLAM system may provide real-time estimates of world features, geometry and material properties that are delivered in the same session in which the data is collected. Additionally and/or alternatively, this technique may allow the continuous aggregation of data from one or more SLAM systems to deliver improved estimates.

As an example of further features that reduce demand on computational resources, a resource management technique may manage the frequency of requests to solve the SLAM problem (e.g., perform feature point re-estimation). For example, the resource management technique may reduce the frequency of applying the SLAM optimization techniques to estimate position and orientation so as to reduce computational resource demand. A resource management technique may further reduce demands on computational resources by controlling the frequency of applying optimization techniques to solve for optimal fits for features in the world. In some cases, the frequency of solving for optimal fits for features in the world is less than the frequency with which estimations are provided for the position, orientation and view of the SLAM system.

Using these techniques, the SLAM system may reduce computational demands on resources via separation of aggregation of data and feature point re-estimation, reducing the frequency of requests to perform feature point re-estimation relative to data intake, and selective application of SLAM algorithms to a suitably chosen subset of data.

5.4. SLAM-Enabled De-Rendering Engine

Information used by the techniques disclosed herein to solve the SLAM problem may also facilitate the implementation of a framework to "de-render" a physical environment, where "de-rendering" refers to the inference of information used to enable a rendering of the physical environment with a degree of fidelity that depends on the information produced by the de-rendering. In particular, a de-rendering of an environment may produce information that may include but is not limited to: the surface geometry (often called a "mesh" in the context of rendering); unilluminated surface coloration (often called a "texture"); responses to illumination (often called "material properties") such as specularity; and sources of illumination (such as lights, reflections & refractions). The particular form of the information collected need not conform to the information used by any particular rendering engine.

A determination of this information may involve viewing a surface from more than one angle (e.g., to determine specularity) and may involve viewing a surface under different conditions (e.g., to distinguish shadowing from inherent coloration). Additionally, because of occlusion a single vantage point may not be sufficient to view all surfaces in an environment, so a complete description of an environment may involve combining views from multiple vantage points.

Additional benefits may be derived from using subsets of the information for a complete de-rendering. Given knowledge of the positions of sources of illumination, a virtual object may be rendered with illumination that shows consistency with the physical environment in which it is placed. Given knowledge of the surface geometry, an autonomously moving physical object may avoid collisions with other physical objects. Given knowledge of the texture and geometry of a small region, that small region may be deformed (e.g., extrusion and/or indentation) by obscuring the region with a virtual object that is a rendering of the deformed region.

A complete de-rendering of a physical environment may be used to more fully integrate virtual objects with their physical environment. A virtual object that is reflective may reflect surrounding physical objects. Conversely, reflections on a physical object may be modified to include reflections produced by a virtual object. As such, a renderable description of the physical world may be used to enable virtual objects to appear to influence physical ones, for example by introducing the appearance of deformation or transparency of a physical object. With consideration to the importance of fully integrating virtual objects, the utility of a "differential rendering engine" that may identify and render the changes to images of a physical environment due to the inclusion and integration of virtual objects. By compositing changes to images, the fidelity of the original image may be sustained while also introducing integrating effects such as illumination, reflection and refraction from virtual objects. Furthermore, by compositing changes to images, rather than re-rendering entire images, the computational resources used by the rendering engine may be reduced.

5.5. Mesh Reconstruction

One objective of the de-rendering process is to determine the surface geometry of an environment. A determination of the structure of a physical space has a multitude of uses. In a standard rendering pipeline objects are described by triangulated surface meshes. Given a single frame of data, a depth map relative to the SLAM system may be constructed by any suitable means, such as dense stereo. Because this depth map may describe the surfaces that are visible to a SLAM system the reconstruction from the depth map of a mesh describing an environment may be improved by combining meshes produced from multiple vantage points. Combining meshes involves knowledge of the spatial relationships of the vantage points from which the depth maps were recorded. The SLAM system may be used to determine the spatial relationships between vantage points, and may thereby facilitate the merging of meshes.

The input to the SLAM system may comprise a variety of data, including the mesh itself. Each view of an environment may yield meshes that are distinct (e.g., due to vertex placement) and/or partial (e.g., due to occlusion or field of view), and consequently, alignment is achieved using techniques that are not specific to the particular description of the surface. For example, measures of extrinsic curvature may be used to define features with respect to the mesh. Ancillary information including, but not limited to images of regions of the mesh, may be used to assist or verify alignment. Additionally, the distance-minimizing alignment may be computed between surface meshes where the distance is computed using methods such as the sum of squared distances from vertices in one mesh to closest points in the counterpart mesh. Finally, a canonical description of the mesh may be possible, either in terms of a spatial geometry or in terms of eigenfunctions of a suitably chosen operator (e.g., the Laplacian), where the eigenfunction spectrum represents a topology of the mesh.

Multiple meshes describing the same objects or environment may be merged to yield a single mesh that provides a more accurate description. This process may be facilitated by a description of both meshes in terms of similar spatial coordinates, and that the SLAM system may provide this information. Given two meshes describing the same object in terms of the same coordinate system, a merging of the meshes may be performed by any suitable means. For example, each vertex from one mesh may be included in a second mesh by connecting it to the vertices surrounding the closest point to the vertex on the second mesh, allowing for the possibility that the meshes partially overlap. This merging may be followed by any suitable smoothing process (e.g., by fitting Algebraic Varieties to areas) and by any suitable vertex sparsification (e.g., by reducing vertices in areas of low curvature).

The depth map produced by each view may include small changes in depth between points on a tilted surface, or large changes where one surface partially occludes another. When two or more cameras are used, a dense stereo reconstruction may identify bands of one image that have no counterpart in the other—in which case a potential surface discontinuity may be inferred. Reconstructed surfaces may be identified as potential discontinuities any suitable way. In some embodiments, an evaluation of the vantage point of the SLAM system when the surface was reconstructed may be used as an indication of a potential discontinuity. For example, a vantage point with nearly tangential angle of incidence may indicate a potential surface discontinuity.

Data from the SLAM system may be used to reconstruct a depth map from a frame which may be represented as a mesh with vertex coordinates in physical space using the position estimations enabled by the SLAM technique. The mesh may include qualifying information such as gap status (for example, "surfaces of occlusion" that bound volumes in which no observation has occurred), viewing angles and distances, uncertainties (which may include correlations) and ancillary feature information that may include by is not limited to images or data derived from images.

In regions where features have already been measured, an initial estimate of the surface geometry may be constructed by interpolating between the feature positions when those features are determined to be related. Relationships between features may be established by any suitable means, which includes, but is not limited to, reification (e.g., when the extension of edges align, despite an intermediate occlusion), spatial connectivity (e.g., when two edges meet at a point in space), or structural grouping (e.g., when many points appear to lie in a single surface). When there is an existing estimate of the mesh geometry, either from features or from previous mesh reconstructions, the mesh geometry and the position and orientation of the current view provided by the SLAM system yields an initial estimate of the depth map, including uncertainties. Using these techniques, image correlation associated with a dense stereo reconstruction of a depth map may be expedited by initializing the matching search of the dense stereo reconstruction using an initial guess determined using the estimated depth to the surface with a search range that may be determined from the associated uncertainties in the depth.

In the case of smoothly curving surfaces, visual features (e.g., coloration, corner points and corner edges) may not be available when viewed from some positions and orientations. However, the image edges (e.g., surface tangents from a silhouette) of the object from each view may be used to define an enveloping surface for the volume occupied by the object, meaning that the object's volume is assumed to be within the intersection of the enveloping surfaces. Given multiple enveloping volumes defined with respect to views from known positions and orientations, the boundaries of the intersection of the enveloping surfaces provide an estimate of surface geometry of the object itself. The SLAM system may be used to provide the relative position and orientation of views yielding the enveloping surfaces required for this reconstruction. Additionally, the consistency between an existing mesh and image edges may be measured, so the image edges may be used to facilitate alignment by a suitable embodiment of the SLAM system in which the image edge alignment is included in the objective function for the alignment.

As discussed above, surfaces may be identified as known or possible gaps. When it is determined (e.g., using the viewer position and orientation provided by the SLAM system) that those surfaces are visible to the SLAM system, the associated data (e.g., stereo images) may be identified as potentially informative. Similarly, when a surface has only been viewed from large distances, a view from a smaller distance may be identified as informative. The reconstructed surface meshes and ancillary information may thus be used to improve the efficiency of de-rendering by facilitating the restriction of analysis to previously unmeasured regions or to regions with uncertainties that may be significantly reduced by incorporating the new information. Furthermore, when computational resources are constrained, the triage process based on determinations that specific frames or regions of images are informative may benefit from anticipatory decision making. For example, when a SLAM system is moving towards an object, a frame may be determined to be informative based on proximity. However, analysis of this frame may be deferred, if it is predicted (e.g., by extrapolation of the model of motion) that the SLAM system will continue to move towards an object, and may be even be elided in favor of analyzing a subsequent frame that is closer to the object. Selectively analyzing frames based on a prediction of motion may yield a more informative view. In effect, triage is based on a determination of informative images and/or a determination of available resources for computation and expected time to completion of the computation.

A determination of the structure of a physical space is recognized to have a multitude of uses. A mesh describing physical objects may be used to enable virtual objects to interact with physical objects by incorporating the mesh into a physics engine. In some embodiments, effects such as virtual objects bouncing off of physical objects or being placed correctly in relation to physical objects (e.g., resting on horizontal surfaces, hanging off of vertical surfaces) may be generated. Furthermore, knowledge of occupied physical volumes may be used to support navigation planning and obstacle avoidance in autonomous physical or virtual systems. Finally, a description of unoccupied volumes provides a basis for negotiating occupancy when multiple physical or virtual objects need to plan movement (e.g., routes or flight paths) through a space.

For the purpose of rendering virtual objects, including occlusion and environmental effects (e.g., shadowing), the most efficient solution may be to provide the estimated position and orientation of the SLAM system for every rendered frame, while sharing the description of the surface geometry of the physical world and providing updates as needed. In particular, in the case where the determination of the behaviors of virtual objects by a physics engine is a separate process from the rendering, updates to the estimated surface mesh may be provided irregularly, with precedence given to new information and moving objects. This implementation allows the computation of surface mesh reconstruction and merging to be performed infrequently, with minimal constraints on the time to completion, thereby reducing the latency and computational resources consumed by the SLAM system. In the case of negotiated occupancy, observations from SLAM systems may provide a basis of negotiation and a means of verifying consistency with the negotiated actions. For example, a parking space for an autonomous vehicle may be found in advance relying on unaffiliated SLAM systems (e.g., a SLAM system worn by a pedestrian unaffiliated with the autonomous vehicle) sharing data describing their environment. In effect, the data collected by the unaffiliated SLAM system may establish the existence of a resource (e.g., the parking space). Later, the SLAM system may verify that the parking space is either unoccupied or occupied by the vehicle that had negotiated use of the space.

Moreover, the surface geometry may be used to determine objects that are expected to visible (e.g., that are not occluded) from given and/or known positions and orientations of the SLAM system. In particular, if the configuration of a physical environment has changed when it is was not observed by a SLAM system, the surface mesh provides a means of determining an expected view based on occlusion. Changes to the environment may then be identified as discrepancies between expected views and observed views of the SLAM system.

5.6. Texture Reconstruction

In some embodiments, an image of a physical scene taken from a known position and orientation may have known surface meshes. In these embodiments, a texture for the visible parts of the meshes may be computed by associating to each point on the mesh a corresponding point in the image. The texture computed in this way may be represented, for example, by a texture computed by recording the nonlinear projective transformations from surfaces of the mesh into the texture to guide rendered sampling, or by reconstructing a texture that has been regularly sampled on the surface of the mesh and may involve only linear transformations to render. The SLAM system may facilitate the determination of a texture, by providing an estimated position and orientation for the images and/or by facilitating the definition of a mesh.

The accuracy of the texture may be improved by comparing multiple views of a surface. In some embodiments, a single canonical view may be chosen that provides the most detail from a canonical vantage point (e.g., with the surface perpendicular to the view axis of the camera) with that image replaced when a more informative image is recorded with respect to a suitably chosen objective function. For example, a more informative view may be defined to be closer to the surface center, with a viewing axis that is more nearly orthogonal to the surface, with a suitably chosen objective function defining the relative improvement of centrality, proximity and orthogonality. In other embodiments, information from the views may be combined. Additionally and/or optionally, the multiple views used to combine textures may also revise the associated mesh, which may be achieved by any suitable means. For example, "Texture Tomography" (see FIG. 3) involves a single higher resolution texture fitted to multiple measured textures with regions sampled by pixels varying according to each measurement's projective transformation.

In embodiments in which Texture Tomography is implemented, in each view of a surface, the color intensities of pixels from the texture associated with a mesh of the surface may be approximated in any suitable way. For example, the color intensities may be approximated as the integration of color intensities reaching the pixel from an area on the surface. The area on the surface may be defined by the area of the surface that is illuminated when projecting the pixel back to the surface. As such, views of the surface from different angles represent different grids of integrated areas. A combination of the views may, depending on the specific embodiment, result in a texture resolved to a scale commensurate to the intersections of the integrated areas of the pixels associated with the contributing measurements. Objective functions used to synthesize a single texture from multiple views include but are not limited to, the sum of squared differences of color intensities, with a possible regularizing condition (e.g., Tikhonov Regularization) to emphasize desirable properties (e.g., low noise), and with a possible filtering to emphasize desirable features (e.g., Unsharp Masking). Using these techniques, surface texture may be reconstructed by combining multiple views that do not individually yield a well-resolved image. For example, when all view axes are nearly tangential to the surface, these views may not yield a well-resolved image. The capability to reconstruct textures may facilitate the recognition of objects and environments, using any suitable means, by synthesizing a view from a chosen position and orientation.

In some embodiments, differential rendering may be enabled by providing the rendering engine with a description of textures associated with the physical world, and periodically updating this information as needed. Because the differential rendering yields only changes, accurate textures may be generated when they will be replicated in virtual objects (e.g., in reflections or for deformation). Consequently, the use of differential rendering allows for the computation associated with texture estimation to be performed infrequently when it is determined to be informative, with minimal constraints on time to completion, thereby reducing the latency and computation resources used by the SLAM system.

5.7. Extraction of Material Properties

In some embodiments, material properties such as reflectivity, specularity and/or higher order angle dependencies may be determined by comparing views of a surface from multiple angles of view. The determination of material properties may be facilitated by a SLAM system in any suitable way. For example, the knowledge of the position of the surface relative to the SLAM system may enable a determination of the relative viewing angles.

In some embodiments, a virtual object may introduce additional material properties to physical objects nearby. A virtual object may be associated with a material texture and material properties (e.g., specularity, color, reflection, illumination, shadowing). A material texture estimated without separating material properties, such as reflections, might include a glare spot if the texture is recorded from an angle of view in which glare is present, resulting in a rendering that includes the glare when viewed from angles where it would be absent in the real world. Describing the response of a physical surface to illumination in a way that includes angular dependency may address this issue, and may enable a virtual source of illumination may be more fully integrated with its environment, such as by adding virtual reflections to physical surfaces. By describing the material properties separately from the material texture, the reflection, illumination and shadowing introduced by a virtual object may be rendered for physical objects.

In some embodiments, a determination of material properties and texture for a physical object may be dependent on the particular illumination of the material of the object. For example, apparent material color may depend on the ambient illumination. Shadowing may yield apparent changes in material brightness that may depend on the placement of other objects and light sources. Reflections from light sources may yield saturated regions (or reflected light sources) on a reflective material. In a static scene, material may be described as a collection of angularly-dependent sources of illumination—a description that may encompass reflections and intrinsic coloration. This description may be simplified by determining the relationships between materials, thereby facilitating the removal of reflections and shadows, and of the spurious features they may generate. Furthermore, such a description may facilitate the integration of a virtual object by indicating the correct illumination and the correct effects of its luminance or shadowing on physical objects. As such, a description of a scene that includes descriptions of the luminance of objects may facilitate the description of a physical environment, and may improve the performance of a SLAM system by identifying features (e.g., shadows) that may be dependent on the state of illumination, or on the position and orientation of the SLAM system itself (e.g., reflections). Illuminance information may include identification of point or directional light sources, illumination as a texture attribute, or ambient light. All light source descriptions may include any modifications suitable for rendering, such as directional modulation of color and intensity.

In addition to producing spurious textural information, reflective materials may also confound dense stereo depth estimation when the matching converges the depths defined by the reflections rather than the depth of the surface itself. In some scenarios, an incorrect surface geometry estimation due to reflections may prevent the deduction of reflectivity as a viewing-angle dependent property of the surface material. This situation may be addressed by a variety of methods. For example, this situation may be alleviated by limiting the dense stereo search to expected depths. Alternatively, a mirror similarity testing technique may be used, which may involve a comparison of a reflected reconstruction to a mirrored rendering of known, low-frequency suppression, thereby reducing the intensity of blurred reflections. Alternatively, spatial consistency testing may be used, which may yield information such as signaling that a reflection is describing a volume that is known to be distinct from the observed reflection.

5.8. Determination of Object Motion and Deformation

There are numerous benefits of applying the techniques described herein and the SLAM system to the problem of relating tracked features to a de-rendered description of the world. Features may include points, line segments, Bézier curves, and/or surfaces.

In some embodiments, the classification of objects as moveable or deformable may improve the performance of SLAM systems. Relations between features and de-rendered information may involve identifying moveable rigid or deformable objects via segmentation, identifying contextual information, identifying observational information and/or solving temporal discrepancies in observations of the same environment. Contextual information may also be used, for example by recognizing an object individually or by classification, and thereby inferring its properties, such as movability (e.g., the movability of a door may be determined by classification and/or by its various observed positions.). An inference of movability of an object may be used to resolve discrepancies between views of a physical space. For example, if the space contains objects that are stationary while in view but are moved while out of view the form of the space may be observed to have changed. These changes may be reconciled by identifying the objects that have moved, and if possible, matching them. Similarly, an object may deform while not in view, which is reconciled by identifying the object as deformable, and if possible describing the deformation. Other temporal changes may include changes in illumination. Some or all of these changes may occur during viewing, in which case the same reconciliation by identification of mutability may be executed. Reconciliation by identification of mutability may be achieved using differential techniques that may be inapplicable for analysis of the discrete differences between subsequent views of an object. The SLAM system may be applied to identify corresponding features of an object that has moved, deformed or otherwise changed, based on the inferred object transformation. An object identified as a movable object may then be identified as a trackable object. Moveable objects may be tracked in relation to a stationary background. It is recognized that this object tracking information may have utility when the motion of the objects is of interest. It is further recognized that by tracking the motion of moveable physical objects, information may be provided to enable an interaction between physical and virtual objects (e.g., FIG. 11).

In addition to features, the environment may contain objects amenable to meaningful classification and utilization by the SLAM system. This classification may be performed using various techniques, which may entail communications with systems external to the SLAM system (e.g., interfaces to queryable classification systems). The results of the classification may be salient to the SLAM problem (e.g., a landmark), and sharing this information in the context of the feature descriptors of an environment may have utility to a user of the SLAM system. For example, a user may be located relative to a target object in the environment.

The environment may contain non-stationary objects of interest. The motion of these objects may be estimated using, but not limited to, techniques involving position and orientation fitting (e.g., for rigid objects), inverse kinematics (e.g., for jointed objects), and machine learning (e.g., when estimation involves recognition and utilization of heuristic indicators, as is needed for partially occluded or fabric-covered objects).

5.9. Locale Recognition and Reconciliation

Distinct measurements of a region's feature data may be identified and combined, thereby combining maps, or improving the accuracy of a single map. Maps may be combined on the basis of identical feature sets, which may be provided by a multitude of SLAM systems.

In the case where two independent maps are determined to overlap in some region, features in that region may be identified, thereby determining a common coordinate system for the maps and enabling the construction of a single combined map. In the case where movement from one region to a second region is achieved along two or more distinct paths the estimated positions of the second region may differ. In the case where the estimated positions of the second region differs, a determination must be made that seemingly distinct features correspond to the same physical object. Reconciliation of these differences (e.g., "Loop Closure") may enable an improved estimate of the positions of features along the paths. In the case where along each path the features have correlated uncertainties including correlations with features in the first and second regions, the estimated positions may be performed by identifying the most probable configuration of the combined states (consisting of at least a full "loop" comprised of features from the first regions, the paths and the identified features in the second region), with respect to the correlated probabilities.

The problem of identifying features may be solved using one or a combination of techniques, such as texture or mesh similarity determinations, unlabeled graph isomorphism finders applied to a selection of relations between features, or labeled graph isomorphism finders when a suitable labeling of elements of the graph is possible (e.g., labeling graph edges by the corresponding distances). In particular, identifications may be relevant only when they are determined to be unique, so approximate graph matching methods applicable to cases where only one isomorphism is expected may be applied to this problem. In particular, techniques may provide both a candidate identification of features and a quality of said identification with an algorithm complexity scaling equal to or better than $O(n^3)$ when an identification between n possible features is considered.

Systems providing a collection of estimated feature positions may benefit from a determination of the correspondence between features of independent maps. (For example, GPS used in conjunction with estimated positions of stationary point sources of radiation.) Furthermore, systems providing a collection of estimated feature positions with correlations between feature uncertainties may benefit from the determination that distinct measured feature sets are in fact identical (e.g., when multiple paths from one region are all determined to arrive at the same second region). In particular, in some embodiments, the SLAM system described may provide estimated feature positions and correlated uncertainties between those features, and would therefore benefit from both the identification of features in independent maps, and identification of features within a single map.

5.10. Collaborative Mapping Techniques

Multiple SLAM systems may move through the same environment, and may occupy the same environment at the same time. In the situation where multiple devices move through the same environment, they may share information, such as features in the environment, thereby improving the estimations made by the recipient of this information. In the case where multiple SLAM systems occupy the same environment simultaneously, sharing information may enable a faster and more accurate mapping of the environment. Furthermore, sharing information of moving objects may improve each SLAM system's situational awareness. Finally, the inventors have recognized that it may be beneficial for each SLAM system to estimate and share the position and orientation of other SLAM systems. In particular, a SLAM system may be able to rely on shared information to address situations where its own sensors do not provide sufficiently accurate estimations of its own position, orientation and view (e.g., FIG. 7).

If virtual objects have been placed in an environment whose position and orientation are subsequently significantly adjusted through reconciliation (e.g., due to map merging or loop closure) the apparent placement of those virtual objects may be altered. If the placement of virtual objects is defined in relation to their surrounding features, then a reconciliation of features will imply a corresponding adjustment of the positions and orientations of the virtual objects. In particular, when multiple users in a physical environment are viewing virtual objects, because the virtual objects are located in relation to features in the environment, it may not be necessary that the SLAM systems of the users have synchronized replicas of their shared map of features in order to agree on the position of those virtual objects in relation to their physical surroundings. Furthermore, changes to the environment that are described in a more recently updated replica may be identified as changes (e.g., by classifying an object as movable) and may be ignored when determining the position and orientation of the SLAM system.

When data aggregation for shared information (e.g., features, meshes and textures) is local and additive, in accordance with some embodiments, updates may be both commutative and associative. Local additive data may significantly simplify data merging in a variety of ways. Locality of data allows the update to be applied to individual elements without producing an inconsistent state of the database as a whole. Additivity of data, in accordance with some embodiments, means that new information relative to a previous state is simply computed by subtracting the previous state, and is merged via addition—a process which is both commutative and associative. The commutation and associativity of merging enables data contributed by multiple sources to be merged independently before updating a common database, thereby enabling the frequency of changes to a common database to be independent of the number of contributing SLAM systems. Finally, because addition does not allow for the deduction of the added terms from the result, histories of activity of SLAM systems may be reduced. According to some embodiments, histories of activity may be reduced to regions occupied by adding data accumulated over a period of time before sharing. In these embodiments, data from multiple SLAM systems may be similarly combined to further obscure specific activity, thereby providing privacy or anonymity that may be desired by users of a SLAM system while still enabling those users to contribute to a shared database.

By limiting specifications (e.g., of virtual objects or negotiated movements) to be in relation to surrounding features, a shared database may employ the technique of "eventual coherency". Replicas of a database, in accordance with some embodiments, databases may be considered "consistent" when they contain identical information regarding common elements of the environment. In contrast, replicas of a database, in accordance with some embodiments, databases may be considered "coherent" when the replicas yield outcomes of one or more specified evaluations whose difference in results is less than some suitably defined tolerance. According to some embodiments, a suitable tolerance may be in the range 1 cm-1 m (e.g., drones in an open field or room such as those in FIGS. 6-8). In other embodiments, a suitable tolerance may be in the range 1 mm-1 cm (e.g., two users viewing the same moving object such as the ping pong game in FIG. 10). In the specific case of a SLAM system, "coherency" may be evaluated with respect to the location of the SLAM system relative to its surroundings. Because coherency of the local database of the world description used by a SLAM system is evaluated relative to the surroundings, it is possible for two SLAM systems to have different assessments of their absolute coordinates. For example, if only one of two SLAM systems has updated its local database to include a displacement derived from a loop closure the two systems will disagree regarding their absolute position and orientation, but will agree on their position and rotation relative to their surroundings.

The use of an eventually coherent database model for SLAM systems may support coherent relations between virtual and real objects. When coherent relations are supported, the replicas may not need to contain identical descriptions of their surroundings environment in order to provide usable measurements. This facilitates piecewise updating in which only some parts of a replica are modified, and enables a SLAM system to immediately use the data it has collected, without requiring that the data has been shared with another SLAM system. Nevertheless, it may be expected that "eventually" (i.e., in the case where eventual coherency is applied), the relative differences in data stored among databases evaluated at a given time may be reconciled. This reconciliation occurs as the novel data accumulated in each database is merged into a shared database, and the novel data from the shared database is merged in to local partial replicas (e.g., local databases on each drone and shared global database, see FIG. 4). In effect, if none of the SLAM systems accumulated new information, the process of differential merging would result in all databases being "consistent" as defined above. In recognition of the expectation that SLAM systems constantly accumulate new information, the local and shared database replicas are described as "eventually coherent," since they are "coherent" with synchronizing updates yielding changes towards "consistency".

In sum, collaborative mapping may be enhanced by appropriately matching data gathered by individual SLAM systems. Feature sets may be analyzed to identify identical feature points within the sets and may be fused based on the identical feature points. Matched feature sets may yield shared maps which may then be provided back to individual SLAM systems to extend their view of the world. Finally, a shared database may employ the technique of eventual coherency when measurements are identified in relation to surrounding features.

5.11. SLAM System Peripherals: Enabling Interaction and Body Pose Description

Moveable devices may be enabled to interact with virtual objects (e.g., a physical pen may be enabled to draw on a virtual whiteboard). Means of interaction may include, but are not limited to: discrete or continuous changes of state (e.g., pressure sensing or button pressing), interaction by proximity (e.g., pushing), interaction by gesture (e.g., encircling), and/or may include feedback (e.g., haptic responses or indicator lights). A "controller" refers to any moveable device for which interaction is enabled, which may include but is not limited to, ad-hoc objects (e.g., a pen), appendages (e.g., hands), special purpose objects (e.g., stylus 960 shown in FIG. 9a), or objects associated with independent or integrated systems for tracking the position and/or orientation of controllers that have been configured to share data with the SLAM system.

In conventional systems, controllers are moveable devices whose position and/or orientation may be known relative to a tracking station, while the position and orientation of the tracking station may be unknown but may be assumed to be stationary. These stationary tracking systems may limit the mobility and capability of the user to manipulate virtual objects or environments. In some embodiments, the SLAM system may be implemented as a mobile tracking station capable of tracking mobile controllers while moving simultaneously with the user as the user explores the environment. For example, the SLAM system may be housed in a head-mounted device (HMD) worn by the user, and may include sensors capable of determining the positions and/or orientation of mobile controllers relative to the SLAM system. In these embodiments, the SLAM system's determination of its own position and orientation in the world thereby also determines the positions and/or orientations of the controllers in the world, while the user is free to move about the environment.

In some embodiments, a user may wear trackable devices on various points of the body. For example, a glove may be worn on a user's hand to enable the hand and fingers to interact with virtual objects. In other embodiments, a user may wear trackable devices on the head, chest, arms, and legs or any other part of the body. Trackable device embodiments may include any type of sensor or transmitter. In some embodiments, trackable devices may comprise one antenna or an antenna array. Trackable devices may be located as radiation sources with frequencies of radiation chosen based on a degree of transparency associated with the particular part of the human body being tracked. Position and/or orientation of the trackable devices may be determined using any suitable means, including, but not limited to: triangulation, amplitude configuration restrictions, Doppler phase interferometry and/or polarization plane intersections. The trackable devices may in addition provide independent measurements that aid in reconstructing the position and orientation (e.g., linear acceleration and angular velocity from an IMU mounted on the trackable device). Such a system enabling the determination of the pose of the human body relative to a mobile tracking station enables a determination of the pose of a human body in the physical world when the location of the mobile tracking station is determined using any suitable means, including but not limited to, cooperation with a SLAM system. In some embodiments, a SLAM system is integrated into the mobile tracking station (e.g., HMD). Descriptions of body poses may be used for a variety of purposes, including, but not limited to, enabling a user's body to interact with virtual objects, adhering virtual objects to the user's body, replacing some or all of the user's body with a virtual representation, and enabling a representation of the user's body to be rendered virtually in other locations.

The analysis performed by the SLAM system to determine its own location may also be applied to determine the position and orientation of moveable devices (e.g., controllers) relative to the SLAM system. In some embodiments, this enables the use of a controller (e.g., the stylus shown in FIGS. 9c and 9b) whose state may be determined from passive sensing (e.g., images) used by the SLAM system. In some embodiments, a determination of the controller's state may be made through the observation of patterns of indicator lights on the controller, and from the estimation of the position and orientation of those lights in relation to the SLAM system. In other embodiments, a determination of the controller's state may be made via ultrasonic or electromagnetic wave transmission.

Examples of SLAM peripheral devices were described. Peripheral devices may include wearable trackable devices and/or moveable devices and may facilitate interactions between the SLAM system and virtual and physical objects.

5.12. FIGS. 1-11

The following descriptions of the figures provide exemplary implementations of the SLAM system. Such a system may employ sensors and other sources to obtain data about the external environment and data about the location and orientation of a trackable unit. The embodiments illustrated in the figures are exemplary and not limiting of the invention.

5.12.1. FIG. 1: SLAM System Overview

FIGS. 1a-1d provide an example of an augmented reality system comprising sensors, processors, local databases, and shared databases. The augmented reality system 100 illustrated in FIG. 1a includes devices 110, 112 and 114. These devices may include any object configured to take in and use data from the observable world to track its own position and orientation within the world and/or perform an augmented reality operation. In some embodiments, devices 110, 112 and 114 may be head-mounted devices that provide users with a display of an augmented reality environment and track the users' heads' position and orientation in the world. Users may include human beings or machine users. In other embodiments, devices 110, 112, and 114 may be moving bodies configured to reconstruct the observable world and/or measure their own locations in the world. Moving bodies may include drones. Other embodiments of augmented reality system 100 may include any number of devices beyond the three shown in FIG. 1a. These devices are communicatively coupled to a Global Map Database 120 located on server 102. Server 102 may be part of a network-based system. For example, the network-based system may include a cloud server with access to additional analysis engines and/or additional information. Global Map Database 120 may store any information related to data taken from the observable world as well as additional information needed to reconstruct an augmented reality environment. As described in FIG. 1b, these devices record and send data to Global Map Database 120 via device updater 122, 124, and 126, respectively. Device updaters 122, 124 and 126 are configured to synchronize information stored in the databases on the devices.

Figure 1B:
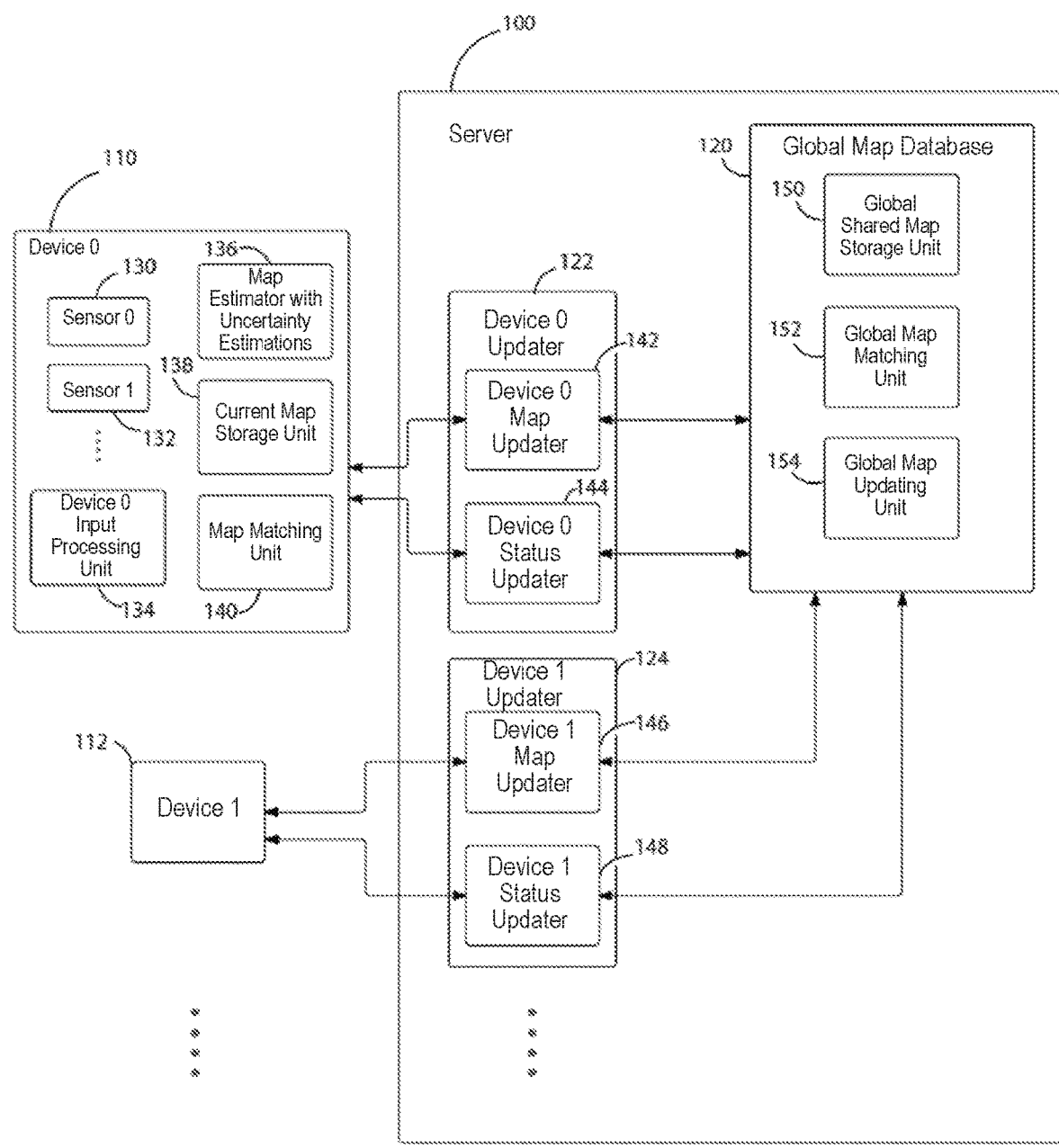
FIG. 1b is a block diagram of an exemplary embodiment of multiple-device tracking system using local and global map databases.

As shown in FIG. 1b, Device 0 contains sensors, processors and storage databases on-board. Sensor 130 may include an IMU (Inertial Measurement Unit), odometer, compass, and/or GPS (Global Positioning System) receiver. In the embodiment illustrated in FIG. 1b, sensor 130 is an IMU and sensor 132 is a camera. Processing unit 134 takes input from the sensors and calculates position, orientation and viewing estimates and uncertainty estimations. Map estimator 136 reconstructs a map of the observable world pertaining to data collected from the sensors and stores a map in the current map storage unit 138. Device 0 sends its local map, status and feature estimations to the global map database 120 via Device 0 updater 142 and Device 0 status updater 144. The global map updating unit 154 uses the local data to update the current global map after which the new updated global map is merged into the global shared map storage unit 150. Local maps from multiple devices are matched together in the global map matching unit 152. The global map is then sent to each device via the respective device updaters to update and synchronize each device's local maps.

Figure 1C:
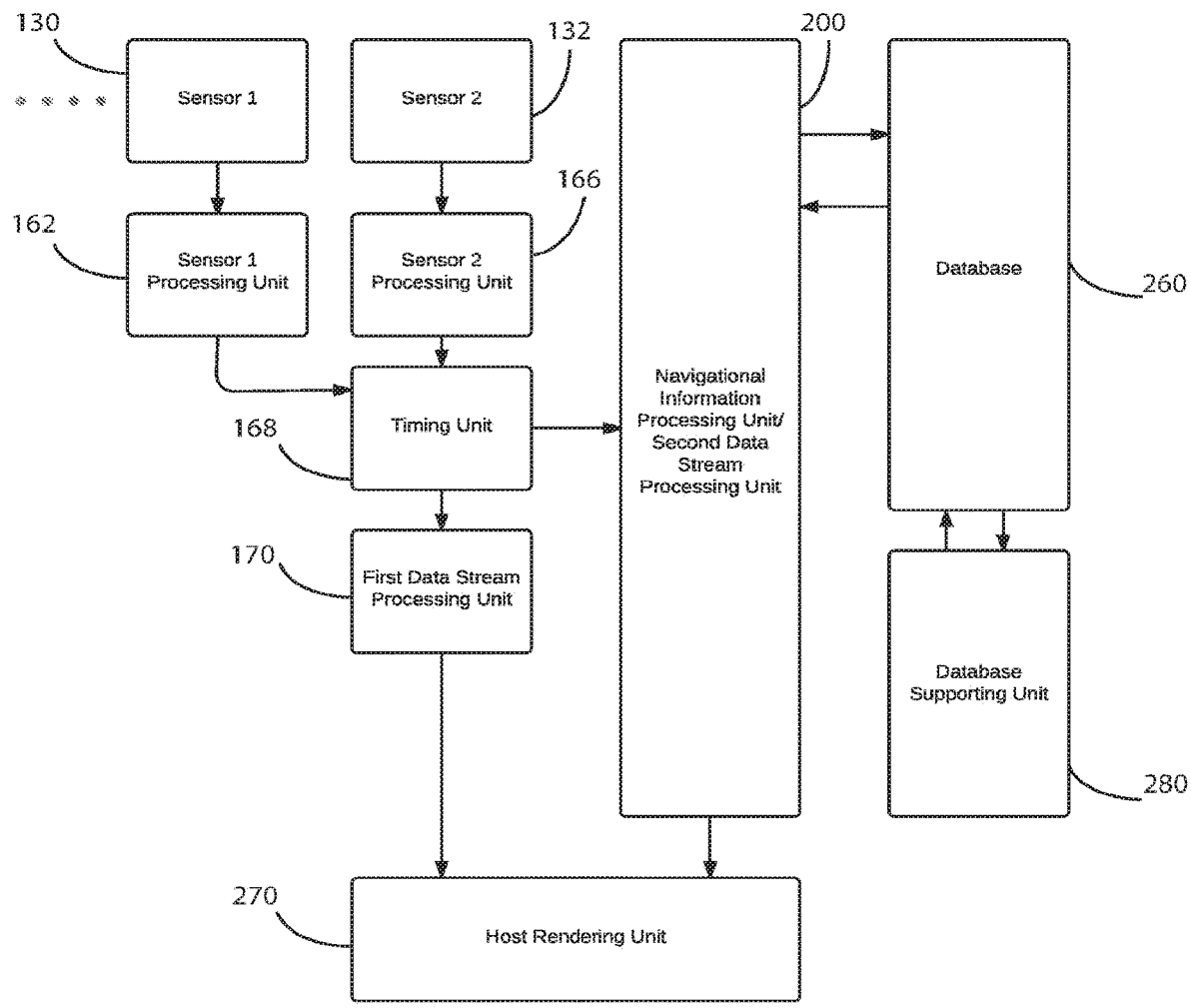
FIG. 1c is a block diagram of an exemplary embodiment of image data processing system using a multitude of input sensors and outputting a processed image to a host unit.

FIG. 1c illustrates an additional view of FIG. 1a-1b. Data streaming from sensor 130 and sensor 132 are processed in parallel, leading to a faster delivery of usable output images. Data streaming from sensor 130 (e.g., IMU) and sensor 132 (e.g., camera) is processed at sensor processing unit 162 and processing unit 166 to calculate feature parameters of Device 0 from FIG. 1b. A timing unit 168 ensures synchronization of data from the sensors. Data from the sensors is then sent through the first data stream processing unit 170 which creates a single data stream that is output directly to host rendering unit 270. The host rendering unit 270 may include any processor configured to output data to a device, such as a display. While the first data stream unit 170 operates to output images to host rendering unit 270, a second data stream is sent to the navigational information processing unit 200 for further improvement of feature parameter estimations and world map construction. In this way, usable output data is sent to the host rendering unit in real-time while estimations are updated and improved off-line.

Figure 1D:
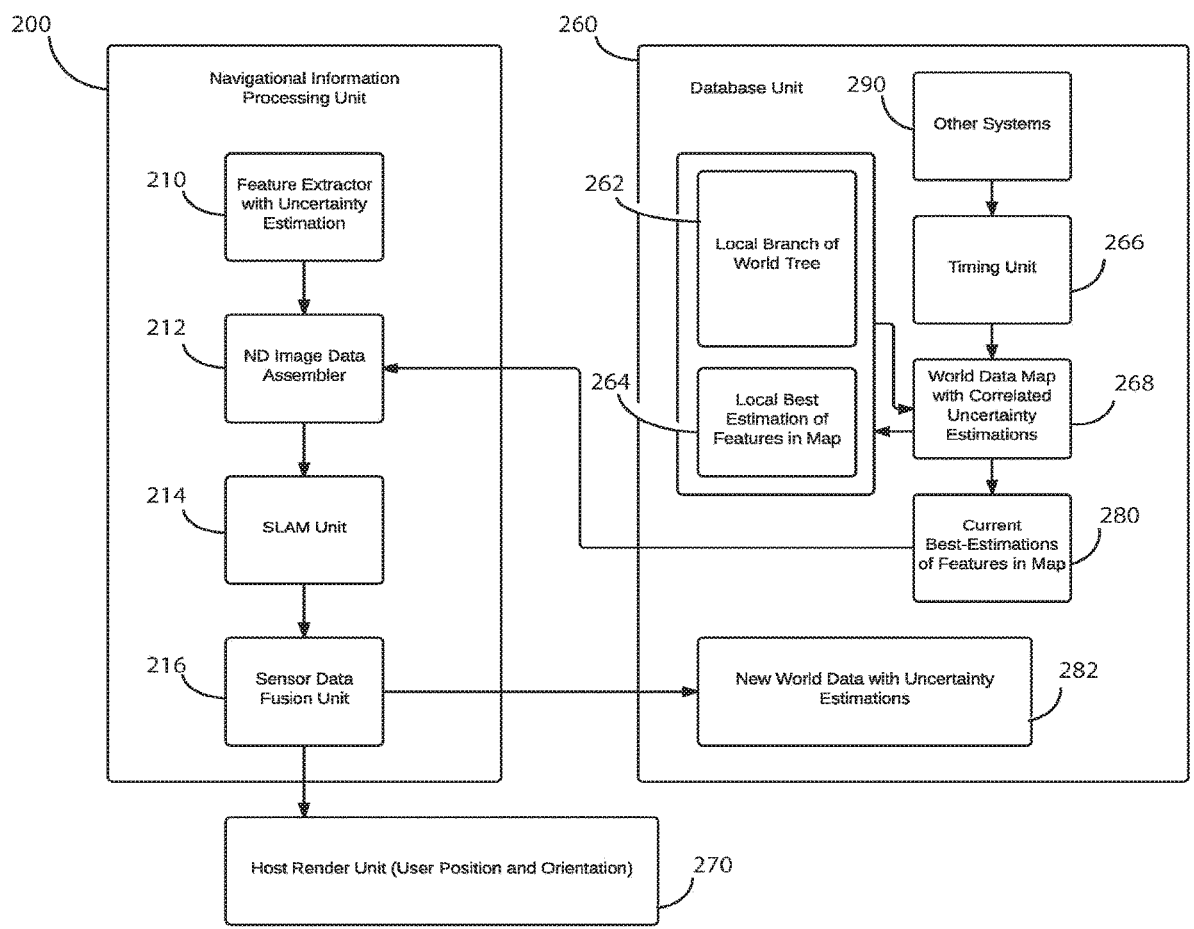
FIG. 1d is a block diagram of an exemplary embodiment of an image data processing system using a navigational information processing unit with uncertainty estimation and a map updating system.

FIG. 1*d* further illustrates an exemplary embodiment of the navigational information processing engine 200. The engine 200 includes a feature extractor 210 where features are identified and extracted, including points, edges, curves and surfaces. These features and image data are sent to the ND image data assembler 212 to create an n-dimensional reconstruction of the current world map. Data assembler 212 also receives updates from stored estimations of features in the map via database 260. At SLAM unit 214, image data position, orientation and viewing may be calculated via the SLAM framework as needed.

Database 260 contains stored estimations of feature parameters and stored world maps. Local databases 262 and 264 store the best estimations of features in the map based on newly aggregated data combined with the estimations of the world map 268. Maps stored in the local databases also update the world map 268. Unit 280 contains the current best-estimations of features in the stored map which are fed back into the ND image data assembler 212 to deliver best estimations without the need for an additional SLAM computation.

The SLAM optimizing techniques used by and/or incorporated in SLAM unit 214 enable data fusion from different types of sensors, such as data gathered from sensor 130 (IMU) and sensor 132 (camera) (FIG. 1*b*). In other embodiments, GPS receivers, antennas, odometers, accelerometers, depth sensors and/or lasers may comprise an assortment of sensors whose data may be fused together. Newly fused data from the assortment of sensors is sent from sensor data fusion unit 216 to the new world data unit 282 to update the maps stored in database 260. Sensor data fusion unit 216 also outputs fused image data to the host rendering unit 270.

Figure 2:
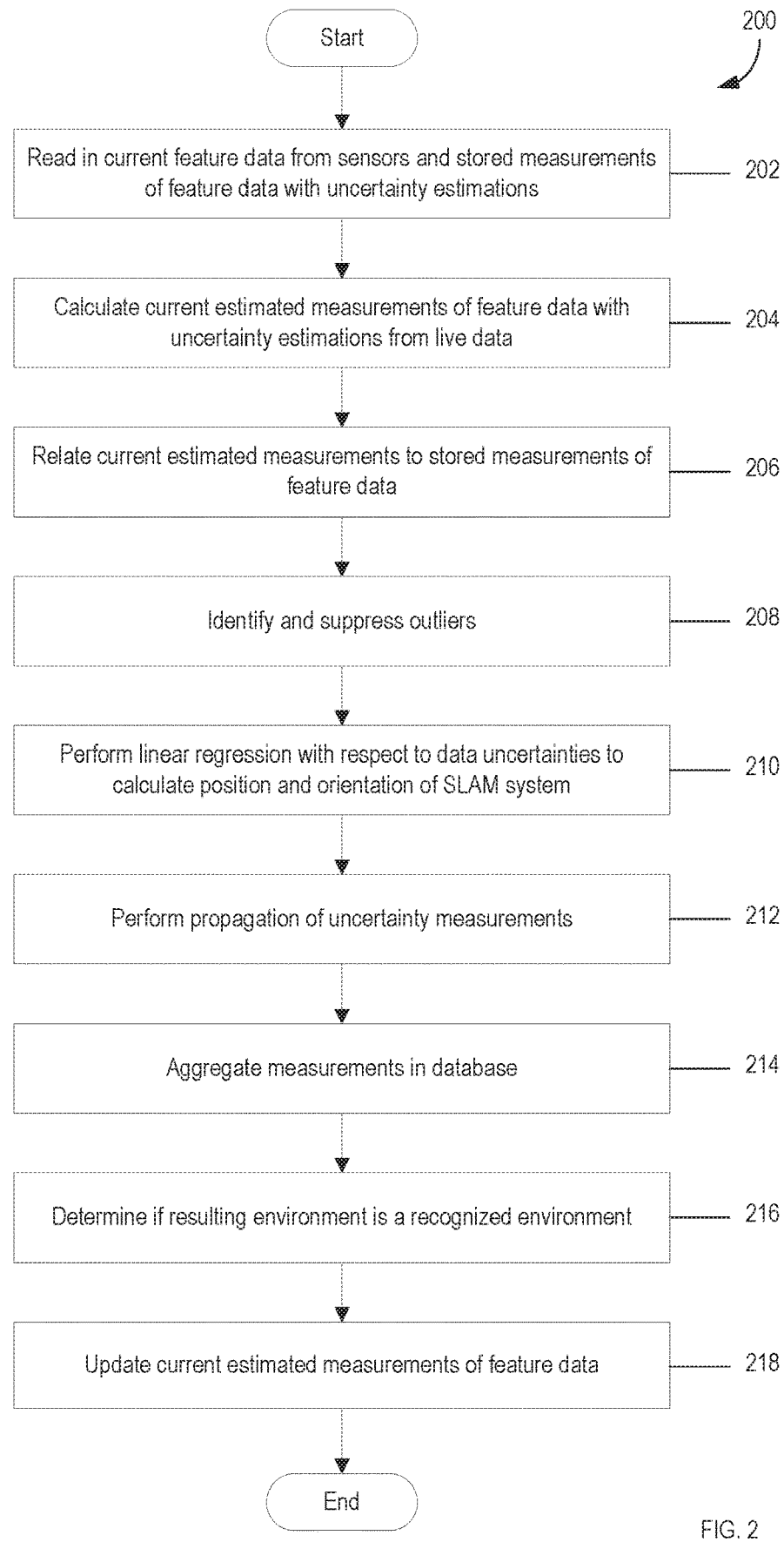
FIG. 2 is a flowchart illustrating a method, in accordance with some embodiments, of performing feature and SLAM system measurement updates using the SLAM framework.

5.12.2. FIG. 2: SLAM Algorithm

FIG. 2 diagrams an exemplary method 200 of performing feature and user measurement updates using the SLAM framework. An exemplary embodiment is described here to further illustrate the concept.

Method 200 begins with step 202, geometric data describing position and orientation of a user of the system and of features in the environment is gathered. For example, a user (see user 900 FIG. 9) wears a head-mounted display (HMD) (see HMD 940 FIG. 9*c*) containing a SLAM system and is facing a physical desktop (see table 502 FIG. 5). The SLAM system collects live geometric data of the desktop from the IMU (sensor 130) and cameras (sensor 132) while stored data about the desktop is read in from the database (database 120). As described in FIG. 1*b*, an IMU within a SLAM system captures acceleration, velocity and position information about the user while the cameras collect position data of features in the world.

Figure 5:
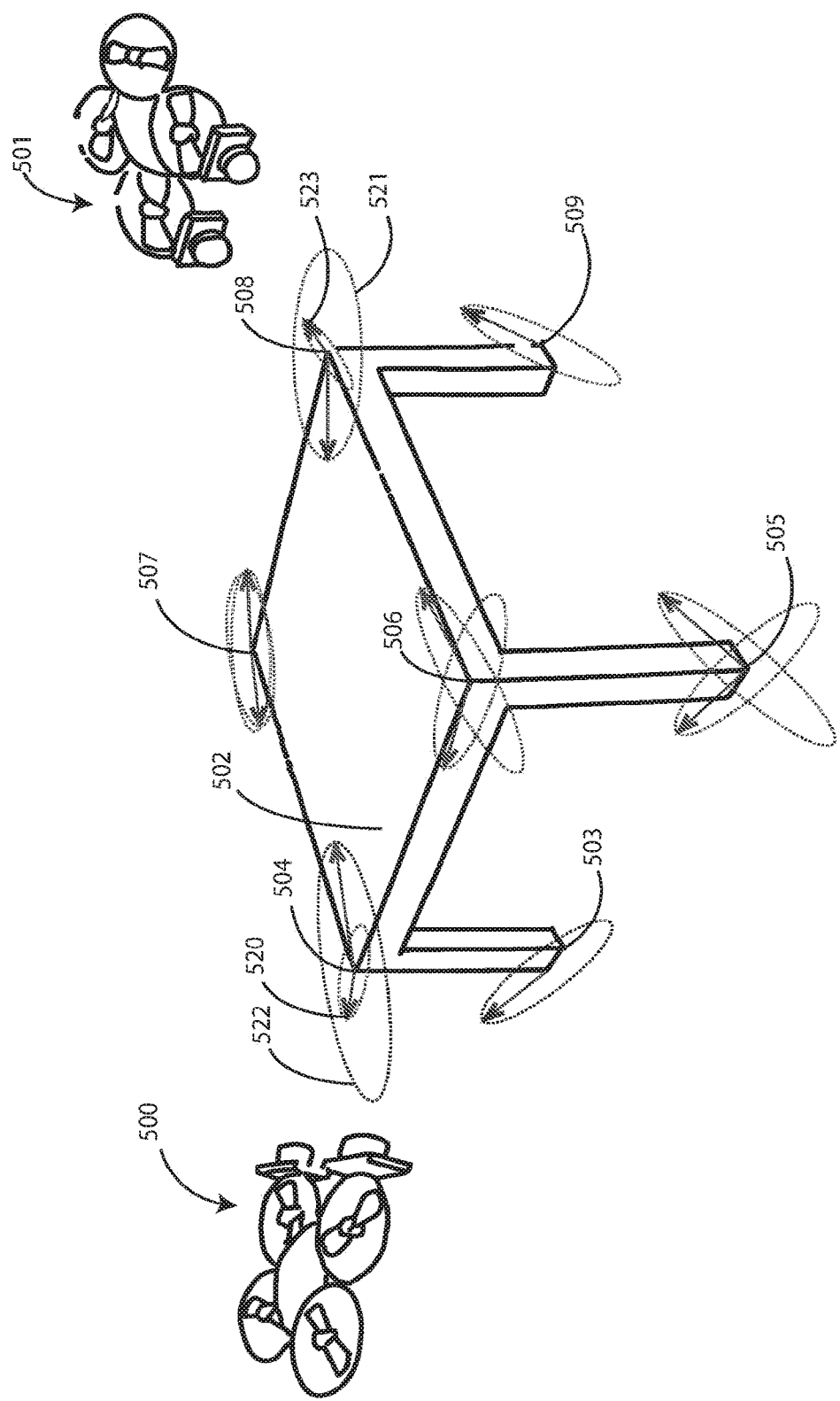
FIG. 5 is a conceptual illustration of an exemplary embodiment of a collaborative mapping system that provides localization of environmental features with uncertainty estimations.

Method 200 proceeds to step 204, current estimated measurements of feature data with uncertainty estimations are calculated from live data. Data from camera (sensor 132) is used to compute position and orientation of features of the desktop in front of the user. This computation may be performed using methods such as Harris Corner Detection, Canny Edge detection, Cross-correlation of known features with images, region finding by color clustering, and boundary finding by gradient aggregation. Geometric data from the desktop is combined with geometric data of the user to estimate position and orientation of the user relative to the desktop. The uncertainty in position and orientation of feature data is also extracted from the live data. For example, uncertainty measurements may be estimated from the specifications of error in the IMU and the camera. This quantity may be characterized by a multi-dimensional Gaussian distribution often indicated by an ellipsoidal 1-sigma surface (e.g., ellipsoid 521 in FIG. 5). The resulting estimations of position and orientation of the user and of various points on the desktop are represented by a Gaussian distribution of where the user might be, for example. In some situations other distributions may be used to characterize the known state of the SLAM system or features in the environment. For example, distant features whose depth cannot be resolved may be more usefully described using a distribution for which the covariance is infinite along the axis of depth. Similarly, linear edges, circular edges, planar surfaces and spherical surfaces may be described using covariance values that are infinite along the axes of symmetry. Even in the case of points associated with a pixel in each image, a Gaussian may be an unsuitable approximation for the finitely supported distribution defined by the intersection of the volumes defined by projecting the pixel regions into space. As shown in FIG. 5, a drone 500 sees corner 504 of a table 502, and calculates position and orientation data of corner 504 including uncertainty information 520.

Method 200 proceeds to step 206, where current estimated measurements are related to stored measurements of feature and user position and orientation. For example, a transform may be applied to match the current estimated position and orientation of the desktop to previously stored measurements. This transform may be estimated using Kalman Filter extrapolation incorporating IMU data, Visual Odometry, and matching based on visual similarity. As shown in FIG. 5, a drone 500 sees corner 506 of a table 502, and relates current measurements of the corner position and orientation with a previous measurement of the corner position and orientation.

Method 200 proceeds to step 208, where outliers are identified and suppressed. Outliers may be identified and suppressed using any suitable technique. For example, the RANSAC method may be used and/or matching equality technique may be used. Another technique involves evaluating the probability that a fit produced by a data point of the current estimated fits and assigning a weight determined by that probability.

Method 200 proceeds to step 210, where the SLAM system performs a linear geometric regression with respect to data uncertainties to calculate a best fit for the position and orientation of user and the feature points in the world. For example, a geometric regression analysis is applied to the position and orientation data and determines a best fit. The regression analysis incorporates the uncertainty estimations in calculating for the best fit. In some embodiments the geometric regression may be solved for a best fit of the position and orientation measurements using modifications of the true uncertainties such that an optimal alignment is found algebraically. From this initial fit, the linear geometric regression is estimated as the uncertainties are interpolated to their true values.

Method 200 proceeds to step 212, where the SLAM system performs a linear propagation of estimated uncertainty measurements to describe the new measurements of features in coordinates relative to the view from the SLAM system to measurements in the world coordinates. This is accomplished by applying a linear transformation to the new measurements (e.g., the means are both displaced and rotated, while the uncertainties are only rotated). Because this transformation is based on the view of the SLAM system estimated using the new measurements, a variation of any single measurement would result in a variation of the estimated view, and thereby a variation of all measurements when expressed in world coordinates. Consequently, the propagation of uncertainty also introduces correlations between all new measurements.

Method 200 proceeds to step 214, where the SLAM system aggregates measurements into a database (database 120). Data is aggregated in real-time simultaneously while live measurements are collected. As described above, multiple feature point position estimations may be aggregated by multiplying the probability distributions (e.g., Gaussians) together. For example, as shown in FIG. 5, feature 504 may be viewed by the HMD more than once. Position estimates, represented by Gaussian distributions, of feature 504 taken over time may be aggregated by multiplying together each subsequent Gaussian distribution of the estimated position. Finally, data aggregation may be performed on separate hardware than hardware configured to collect data.

Method 200 proceeds to step 216, where the resulting environment is evaluated to determine if it is a recognized environment. This step is expected whenever a SLAM system begins operation. During operation an assessment of environmental recognition may be initiated based on the result of any suitable evaluation or combination of evaluation, including but not limited to an assessment of the probability of spatial overlap with a previously measured environment, or recognition of "landmark" objects. In the case where recognition is possible, an identification between features in the previous and current environments may be made using any suitable means, including, but not limited to, the sub-graph isomorphism technique described above. In the case of a successful identification of features, the SLAM system may have followed a looping path, in which case a loop closure evaluation may be initiated in step 218.

Method 200 proceeds to step 218, where the positions and orientations of features are re-estimated, incorporating data from new measurements. A complete re-estimation may require a linear solve of the descriptions of measured relationships between features, which has a computation complexity of $O(n^3)$. However, it may not be necessary to perform the re-estimation every time new data is received. Furthermore, it may not be required to perform a linear solve on the entire system simultaneously. Instead, re-estimation can be limited to relevant areas, with results made available to a parallelized linear solver for the complete system. In the case of partial linear solving, adjustments associated with loop closure will only be derived when the support of the linear solve includes features related by correlations that close the entire loop.

Figure 3:
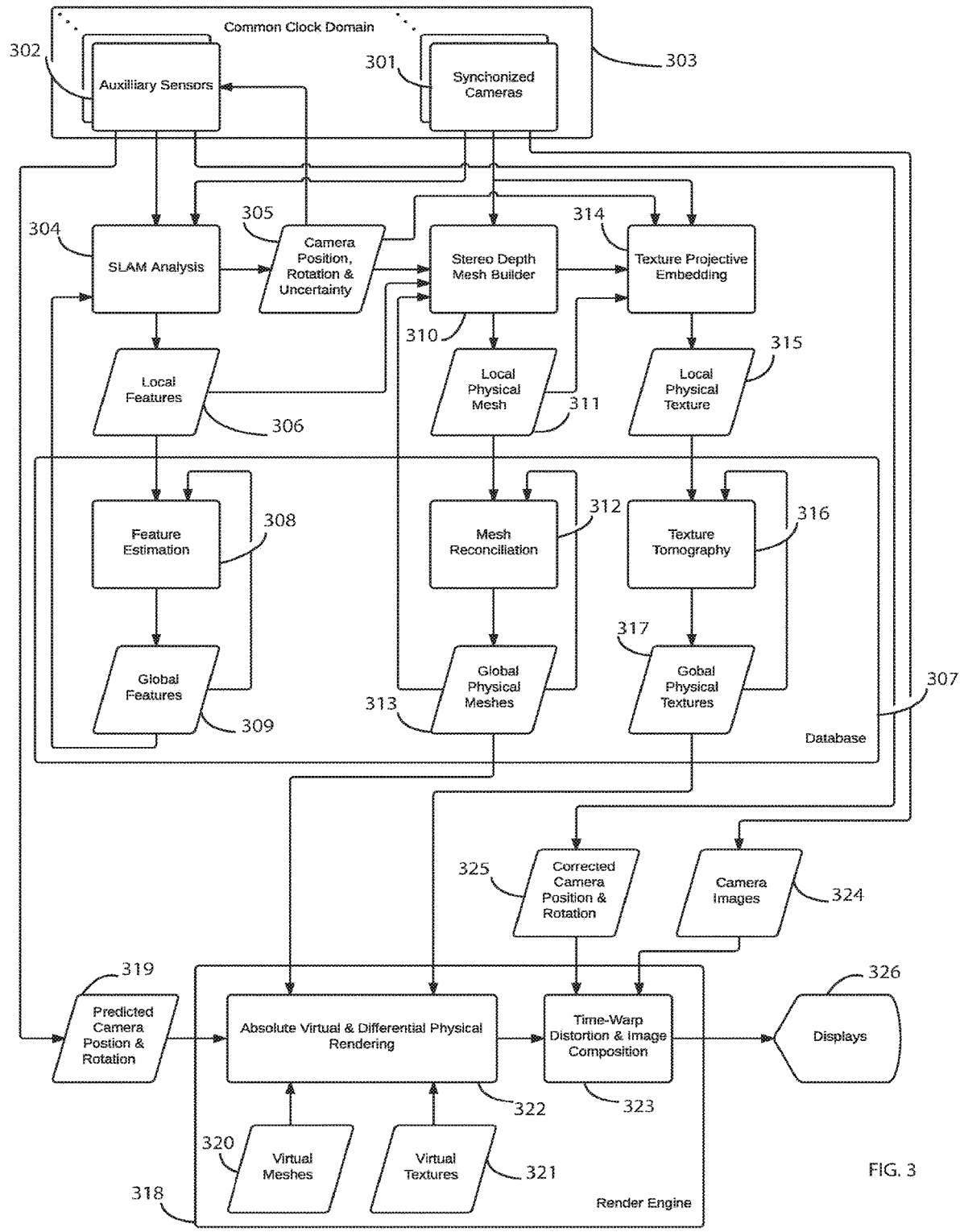
FIG. 3 is a block diagram of a SLAM system, in accordance with some embodiments, including a SLAM update system, database, rendering and de-rendering engines.

5.12.3. FIG. 3: SLAM System Image Rendering

FIG. 3 illustrates the an exemplary embodiment of the dependencies of the SLAM and de-rendering analysis and rendering stages. In this illustration, each process (rectangle) produces data (parallelograms) which may be buffered. In this illustration arrows indicate dependencies on sources of data, but do not imply causation. The multiple arrows emerging from the Synchronized Cameras (301) and Auxiliary Sensors (302) indicate data that may describe distinct measurements, while the branching arrow emerging from the Synchronized Cameras (301) indicates that the same data (and dependent data) is used for each operation.

Image data is provided by an array of Synchronized Cameras (301) that record images simultaneously from known relative positions. Additional data is provided by Auxiliary Sensors (302) which may include any combination of IMU, Odometer, Compass, or even a less accurate positioning system such as a GPS (Global Positioning System) receiver. The Synchronized Cameras and Auxiliary Sensors share a Common Clock Domain (303) so that the relative timing of measurements is known.

The SLAM analysis (304) may involve camera data, and may also incorporate data from Auxiliary Sensors (302) to improve the accuracy and efficiency of the analysis. One result of the SLAM Analysis (304) is an estimation of the Camera Position, Rotation and Uncertainty (305), which is used to correct the position and rotation estimated by integrating data from the Auxiliary Sensors 302. The second result of the SLAM Analysis (304) are measurements of Local Features (306) that describe the estimated absolute positions of features observed in a single frame of images from the Synchronized Cameras (301). The Local Features (306) are merged with previous measurements in a Database (307). Feature Estimation (308) performs a computationally expensive analysis of the aggregated measurements yielding improved estimations of Global Features (309), which are then used by the SLAM Analysis (304) in subsequent computations.

The De-Rendering process begins with a Stereo Depth Mesh Builder (310) that compares images to derive a Local Physical Mesh (311) describing the depth of visible objects. This process may be made more accurate and efficient by including information describing the Local Features (306). Every frame yields a new mesh describing the visible physical world, Mesh Reconciliation (312) combines these meshes, yielding a collection of Global Physical Meshes (313) which includes descriptions of the surfaces of unobserved volumes of physical space. The unobserved volume surfaces may be projected into the images using the estimated Position and Rotation to determine regions of novel information.

Every visible surface in a Local Physical Mesh (311) corresponds to a region of one or more of the Synchronized Images (301). This correspondence is computed in the Texture Projective Embedding (314), which defines a Local Physical Texture (315) in which the mesh embedding may include projective transformations. Because of the projective transformations, the texture pixels may be significantly distorted with respect to the mesh surfaces. Projective textures from multiple views are combined in the Texture Tomography (316) process, yielding Global Physical Textures (317) in which the distortions have been removed by combining distinct views.

Stationary virtual objects are displayed by a Render Engine (318) from the same perspective as the world is viewed. Since the images of the world are displayed with the minimum possible latency, this may be achieved by rendering using a Predicted Position and Rotation (319), based on the estimated time to complete and display the rendering and composition. Using this prediction, the Virtual Meshes (320) and Virtual Textures (321) are rendered (as well as deformations of physical objects), including effects from physical occlusion, shadowing, illumination and reflection. The effects of virtual shadowing, illumination and reflection may be described in terms of differential changes to a rendering of the visible Global Physical Meshes (313) and Global Physical Textures (317). This rendering process is indicated by the Absolute Virtual and Differential Physical Rendering (322) which yields a result that can be composited with images of the physical world. Since the rendering introduces a delay, the Time-Warp Render Distortion & Image Composition (323) may receive Camera Images (324) and a corresponding Corrected Camera Position & Rotation (325) recorded after the rendering began. The difference between the Predicted Camera Position and Rotation (319) and the Corrected Camera Position & Rotation (325) may be accounted for by distorting either the physical or rendered images before composition. The composition itself may be performed by computing the addition of the absolute and differential rendering of the virtual objects, by through the use of a variably transparent display that combines the rendered image with the physical light field. The final result presented on one or more Displays (326) will have the minimum possible perceived disparity between physical and visual motion: which is the difference between the Corrected Camera Position & Rotation (325) and the viewer's physical state at the time of viewing.

An exemplary embodiment of the de-rendering and differential rendering is the application of the SLAM system to the visualization of home furnishings in a potential buyer's house. Suppose that a shopper is interested in purchasing a vase from a retailer who has provided a virtual model of a light blue chromed vase. Wearing a headset including an embodiment of the SLAM system (for example, the HMD 940 shown in FIG. 9c), the shopper looks around their living room considering where to place a vase. While they are looking around the living room the SLAM system is de-rendering the environment. The SLAM system identifies direct light sources, such as interior lights, indirect light sources such as surfaces of the wall and ceiling close to the interior lights, and effective ambient illumination during the Texture Projective Embedding analysis (314). The SLAM system also derives (310) and records (311) the visible geometric structure local geometric structure of the environment, described as a mesh conforming to the visible areas walls, floor and ceiling, and to viewed sides of the two chairs and a coffee table—areas that are not viewed consist of the backside and bottoms of the furniture, and areas of the floor beneath the furniture. In relation to the geometric mesh, the SLAM system derives (314) records (315) material information including the coloration of the wood floor, the wallpaper, the ceiling, the fabric and wood of the chairs and the gray of the metal coffee table. Additionally the SLAM system compares the surface coloration from the multiple views (316) afforded by the shopper's movement around the living room to both derive a higher resolution texture and to determine the mixture of specular and diffuse reflection from the buffed surface of the metal coffee table.

After looking around their living room, the shopper decides to try placing the vase in the center of the coffee table. Because the physical environment has been de-rendered (313, 317), the vase can be rendered (322) as it would appear when situated in a virtual model of the living room. In particular, the direct light sources are reflected in its chromed surface, as are the table surface, chairs and walls. Furthermore, because the geometry and material of the table surface is known, a full rendering of the room would include both shadows cast by the vase on the table surface, and a reflection of the vase in the surface. Both of these are described in a differential rendering by their modification to the visible scene. The rendering of the vase is performed from a position and orientation (319) of the cameras, physically located on the shopper's HMD as hardware included in the SLAM system, predicted for the time when the rendering will be visible to the shopper. When the rendering is complete, a more accurate prediction of the position and orientation (325) of the SLAM system cameras when viewing the image is made available. The most recent images of the world and the rendering of vase are then distorted (323) to align with the more accurate prediction for the position and orientation of the SLAM system worn by the shopper. The images are then combined (323), with the vase obscuring the image of the table behind it, and the shadows and reflections blending with the image of the table beneath. The resulting image seen by the shopper via the display on their HMD (326) is an image of the physical world, aligned with the shopper's current view, including recent changes, such as the shopper's friend and their reflection on the table surface (neither of which were in the de-rendering of the room), as well as the virtual image of the vase, its shadows on the table surface and its reflection.

Figure 4:
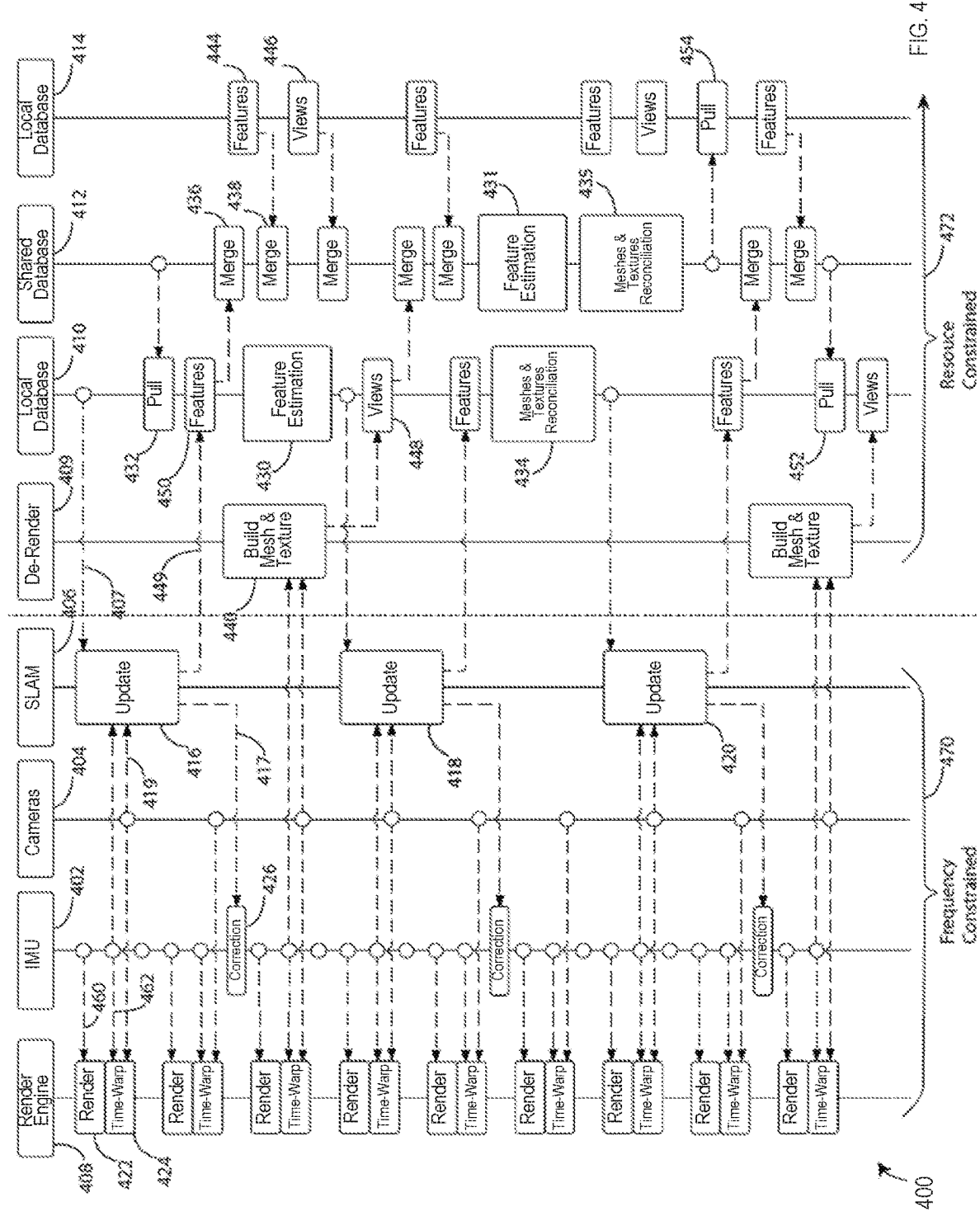
FIG. 4 is an illustrative diagram of an exemplary embodiment of a framework of solving a SLAM problem that may manage the frequency of measurement updates.

5.12.4. FIG. 4: SLAM System Resource Management Technique

FIG. 4 illustrates an exemplary embodiment of a resource management technique configured to deliver accurate results in real-time while reducing computational resources. While each executed block uses the indicated input data, the creation of that data does not guarantee the execution of the dependent block—consequently the execution can be comprised of many independent cycles of execution, with flexible ordering of operations. The resource management technique 400 includes components of analysis that may be performed independently of each other, thereby enabling the management of computation on the basis of resources or expected improvement in performance.

In the embodiment illustrated in FIG. 4, IMU 402 is operable to measure the acceleration, velocity, position and orientation of a non-stationary object. In other embodiments, IMU 402 may represent any kind of sensor, such as an odometer or GPS, designed to measure aspects of the position, orientation and motion of a non-stationary object. New measurements calculated by IMU 402 are taken with a high frequency (e.g., 1 kHz) between measurements. This enables a fast delivery of position and orientation information. However, IMU 402 accumulates error in measurement over time. In order to improve the accuracy of the determined position and orientation of the non-stationary object, the data collected from IMU 402 and the camera unit 404 is processed by SLAM update unit 416. SLAM update unit 416 performs a process (e.g., a computationally expensive process) that produces estimations of position, orientation and uncertainties in these measurements. The time required for the processing performed by the SLAM update unit may exceed the time between IMU updates, camera updates, or rendered frame. For measurements needed in real-time, the IMU 402 is chosen to deliver position and orientation measurements, which are corrected 426 at particular times (e.g., periodically) using the results from the SLAM update unit 416. While the SLAM update unit 416 is calculating the position and orientation measurements, data is provided by the Cameras 404 and IMU 402 to the Render Engine 408. When the accuracy of the measurements from the IMU 402 decreases below a critical threshold or if a certain time limit is reached, the resource management system will choose to initiate a measurement of position and orientation by the SLAM update unit 416. In some embodiments, the SLAM update unit 416 may be chosen to calculate the estimations of position and orientation for 1 out of 3 frames, thus reducing demands on resources. In other embodiments, SLAM updates may be performed in 1 out of 10 frames. In this way, the decision to choose which measurement unit to use to calculate an estimation of position and orientation of a moving body is based on an evaluation of the current quality of data and an evaluation of the level of demand on computational resources. In contrast to other SLAM solutions (e.g., the Extended Kalman Filter), the computation required to estimate the position and orientation of the SLAM system performed by the SLAM Update unit 416 is distinct from the Feature Estimation 430 computation used to update estimates of feature positions and orientations. The decoupling of the SLAM processes from the Render Engine 408, Cameras 404 and IMU 402 enables the output of usable images to a display without requiring that the SLAM update unit 416 be executed for every frame, thereby avoiding the computational cost and associated latency associated with the SLAM update unit 416.

As shown in FIG. 4, data 460 collected from IMU 402 and cameras 404 is updated at SLAM update unit 416 and aggregated into the local database 410 as an additive process 450. This new data is then merged 436 without updates to estimations of feature parameters to the shared database 412, further reducing demand on resources.

The de-rendering engine 409 is also configured to manage resources. For example, a frame of data is passed into the Build Mesh and Texture unit 440 and is used to generate a mesh and texture of the physical world. A mesh and/or texture generated from this first frame of data may be used to represent subsequent frames of data. This mesh and texture data is stored in the local database 410 which is periodically merged 436 into the shared database 412. Instead of generating a new mesh for every frame, known feature parameters and material properties may be pulled 432 from the mesh and texture data stored in the databases, thereby reducing demand on computational resources. Estimations stored in the Local Database 410 and Shared Database 412 are updated using the Meshes and Textures Reconciliation units 434 and 435 respectively, based on an evaluation of the current level of data accuracy and available resources.

Within the Render unit 422, additional methods are used to improve accuracy of viewing measurements and thereby improve the user experience. For example, predictive positioning may involve rendering at a future, predicted location (e.g., position and orientation) of a moving body, rather than at a current location (e.g., position and orientation). Using predictive positioning may remove latency in perceived motion of a stationary object in the output image. In some cases, the rendering time may equal the perceived latency of motion. If latency or perceived motion is zero, then stationary virtual objects are not perceived to move relative to physical objects. Likewise, no perceived latency will appear between the physical environment and motion in the field of view. To further improve accuracy of viewing measurements, a time distortion process is applied via Time-Warp unit 424 after the rendering process to display apparent motion. If the predicted position is accurate, then the rendering process will start from the predicted position and a composite image will be created using the final rendered image and a current frame of data collected at the final actual position. If the prediction is not accurate, then the Time-Warp process may be applied to improve the viewing estimate. Other compensation techniques may also improve the user experience including phase adjustment, whereby the phase between incoming camera images and the rendering cycle is adjusted, enabling the use of the most up to date images of the physical world. The phase adjustment technique enables the decoupling of the camera data from the rendering process, further improving management of computational resources.

Returning to the exemplary embodiment discussed above, in which a shopper introduces a virtual vase into a physical room, FIG. 4 is an embodiment of one possible resolution of the computational resource management for 9 consecutive frames. The frequency of execution of the Render Engine (408) is determined by applications and hardware that are not controlled by the SLAM system. In the case of the shopper, the frequency of the execution of the Render Engine (408) is 120 frames rendered per second. The shopper's display (326) is an opaque screen that displays a composition of images of the living room with the virtual vase. The Cameras (404) record images of the living room at some integer multiple of the render frequency with a relative phase chosen such that the images are recorded with as little delay to viewing as possible. In this case, the stereo images of the living room are also recorded with a frequency of 120 frames per second, with a phase chosen so that the recording occurs after the rendering (422) has begun providing images (324) and just before Time-Warp compositing (424, 323) begins. Because image recording may be synchronized with rendering and compositing, the Render Engine (408) can request phase adjustments of the SLAM system, while the SLAM system can make no requests of the Render Engine (408). The IMU (402) component of the SLAM system is updated 1000 times per second, thereby providing a prediction (460, 319) for the shopper's viewpoint when the rendering starts, and a more certain prediction (462, 325) for the Time Warp and Composition (424, 323). The IMU (402) and the Cameras (404) are aligned to a common clock, so that an estimation of the position and orientation of the SLAM system's cameras when a living room image was recorded is associated with a time in the IMU's history and thereby used to apply periodic corrections (426) to the IMU's estimation of position and orientation.

Because the IMU estimations accumulate error, estimations are periodically made of the absolute position and orientation with a SLAM (406) computation. In the embodiment being considered, a frame of the living room displayed to the shopper is also analyzed by the SLAM system. This analysis first associates features (419, 306) in the current images, such as corners and edges of the coffee table and one chair (see FIG. 5), with previous views (407) of the same features. This information is then used to estimate the position and orientation (417, 305) only of the SLAM system cameras. Meanwhile, the IMU extrapolation has been used to render a second frame of the living room, and has accumulated additional error. At this point, the position and orientation (417, 305) from the SLAM Update (416) is used to improve (426, 302) the estimation of the position and orientation of the SLAM system's cameras, after which the corrected estimation is used to render a third frame. Because of the periodic corrections, the error in the estimated position and orientation of the SLAM system cameras remains imperceptible to the shopper. This low error will be sustained by periodically performing just the computations necessary to estimate the position and orientation of the SLAM system every 3 frames, at Updates (418) and (420).

In addition to correcting the estimation of the position and orientation of the SLAM system cameras, the SLAM Update (416) produces new measurements of the feature (e.g., corners of the coffee table) positions (449) with associated uncertainties, as well as new features (449). A feature estimation (430) combining these measurements with previous measurements requires computing a linear solve involving data from all features that were simultaneously visible with the features being updated. However, the process (450) of updating the measurement information involves only addition with or insertion of new data with existing data, and can therefore be performed rapidly without requiring a lock on the database of estimated features. Consequently, the data produced by every SLAM update is used to update the measurement information. Furthermore, because a Feature Estimate (430) yields estimated relative positions, the updating and addition of features (450) can include removing features from the local database (410) that are determined to be likely to remain out of sight of the viewer—thereby reducing the dimensionality of the database and of the linear solve. In this particular case, just before the SLAM Update (416) completes, the shopper's SLAM system pulls (432) data relevant to the living room from a shared database describing their home to their SLAM system's local database by identifying changes to the remote database since the last pull and adding those changes to the local database, at the same time features from the kitchen where the user was previously are dropped from the local database (410). After this process completes, measured features (449) from the SLAM Update (416) are added to the local database (410), and the changes are then merged (436) in to a shared database by the same process as the pull (432) was merged. With the new information from the pull (432) and from the frame (450), the SLAM system determines that a re-estimation of features would reduce the uncertainties of features presently in view and thus the uncertainty of the estimation position and orientation of the SLAM system cameras. In this instance, resources are available to perform the computationally expensive linear solve required for the re-estimation, so the re-estimation (430) is performed in conjunction with other ongoing operations.

The computations required for the mesh and texture de-rendering require an estimation of the position and orientation of the SLAM system cameras. However, since the IMU integration provides this at any time, the computation to build meshes and textures (440) can be initiated independently from the SLAM Updates. In this scenario, two frames after the SLAM Update (416) the SLAM system determines that it can allocate resources to build the mesh and texture (440) associated with a frame. The table and chair are still in view, and have been previously measured, but the leg of one chair that was previously obscured by the table is now in view, so the mesh and texture reconstruction focus on this region of the images. By aligning corresponding regions, beginning with identified features consisting of the edges of the leg, depth estimates are constructed, and adjacent estimates are connected to form a mesh. The edges of the leg identify surfaces of occlusion—the volume behind the leg has not been observed and is bounded by surfaces terminating at the edges of the leg. The images from each camera in the vicinity of the leg yield a texture in which the mesh describing the leg is embedded by projective transformations. Additionally, the SLAM system determines that this vantage point is closer to the chair back, and therefore also re-measures the mesh and texture in that region of the images. The results of this reconstruction are stored as a view (448) in the local database (410) and also merged in to the shared database (412). Reconciliation of meshes (434, 312) and textures from multiple views requires merging all meshes and then sparsifying the description, after which a tomographic solve (434, 316) is performed on the textures to unprojected to the surface space to achieve a best estimate texture with a resolution that exceeds the individual resolutions. These processes are computationally expensive and are therefore deferred until after a subsequent SLAM Update (418).

At the same time as the shopper is looking around the living room the shopper's friend has been observing the kitchen, and their data, which includes views into the living room, has also been merged (438) in to the shared database (412). In addition to the local database updates, the shared database also updates the feature estimates (431) and the de-rendering (435), yielding results that expedite the local updates and are shared when the shopper pulls (452). Likewise, the shopper's results are shared with the shopper's friend when friend pulls (454).

The process of the shopper and the shopper's friend merging into the shared database (412) of the home and pulling (432, 452, 454) from the shared database continues throughout the interaction described above. So, when the shopper decides to place the virtual vase on the table, they are performing a differential rendering (322, 422) using a description of the living room combining measurements from their viewpoints (436) and from their friend's (438).

5.12.5. FIG. 5: Collaborative Mapping Example 1

FIG. 5 illustrates a scenario in which the estimation of geometry is improved when multiple SLAM systems share data. In this particular embodiment a SLAM system is mounted on the front of a drone (500) and a second SLAM systems is mounted on the front of another drone (501). In this embodiment a table (502) is viewed by both drones. Each drone estimates the positions of features that are visible to it: the left drone (500) estimates the positions of features 503-508, while the right drone estimates the positions of features 504-509.

The uncertainty distributions of estimated feature positions are illustrated by ellipses showing the 1-sigma surfaces of the distributions. The arrow drawn in each ellipse points towards the SLAM system responsible for the estimation. For example, ellipses 520-521 represent uncertainty distributions of estimated feature positions as seen by drone 500 and ellipses 522-523 represent uncertainty distributions as seen by drone 501. Features that are closer to the cameras of a SLAM system will have smaller uncertainties, while more distant features will have larger uncertainties.

The positions of features 504-508 are estimated by both the drone 500 and the drone 501. When multiple measurements are available, they can be combined (for example by multiplying the individual probability distributions) yielding improved estimates of positions, with smaller uncertainties. In particular, for points 505 and 506 each measurement is well defined along an axis where the other is uncertain.

Figure 6:
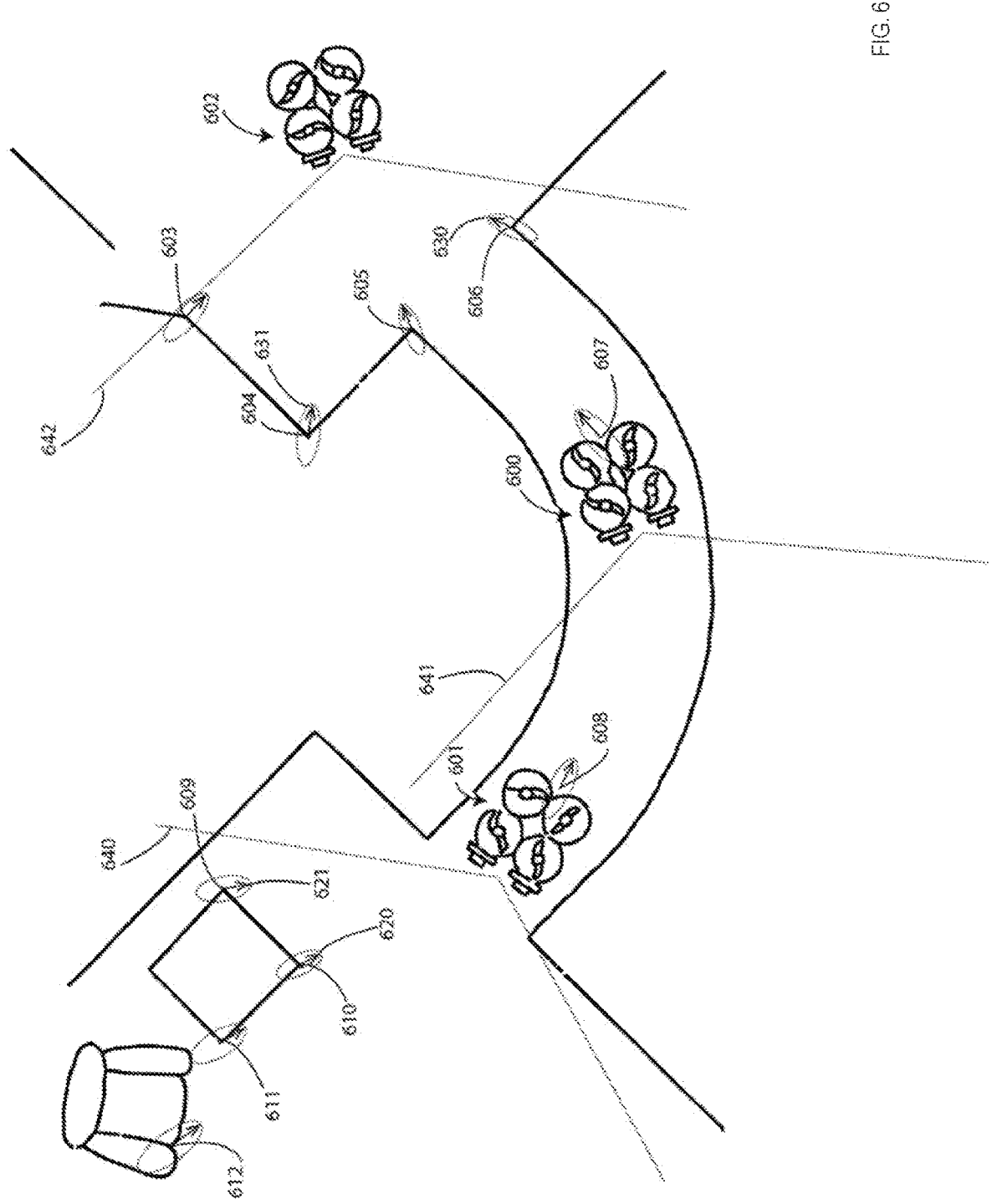
FIG. 6 is a conceptual illustration of an exemplary embodiment of a collaborative mapping system that allow multiple devices to build a shared map of a shared environment.

5.12.6. FIG. 6: Collaborative Mapping Example 2

FIG. 6 illustrates a scenario in which SLAM systems share measurements of the positions other SLAM systems. In this embodiment the SLAM system mounted on the drone in the curving hallway (600) observes no features with respect to which it can determine its own position. Likewise, the drone viewing the upper room (601) will have accumulated a significant integrated uncertainty while moving through the featureless hallway. The consequence of this would be a significant uncertainty in the distances between features (603-606) in the lower room, and features (609-612) in the upper room.

This situation can be improved by chaining together mutual observations of drones (600-602). The drone (602) in the lower room is able to measure stationary features (603-606) and also the position and orientation (607) of the drone in the hallway (600). At the same time, the drone in the hallway (600) is able to measure the position and orientation (608) of the drone in the upper room (601) relative to its own position. By sharing this information the uncertainty in the positions of features in the upper room (609-612) relative to positions in the lower room can be reduced by sharing the observations of relative positions and orientations of SLAM systems. Since each frame is an independent measurement the uncertainties in distances between features in the upper and lower rooms can be rapidly reduced—whereas a single drone would be used to repeatedly traverse the hallway in order to obtain each new independent measurement.

Figure 7:
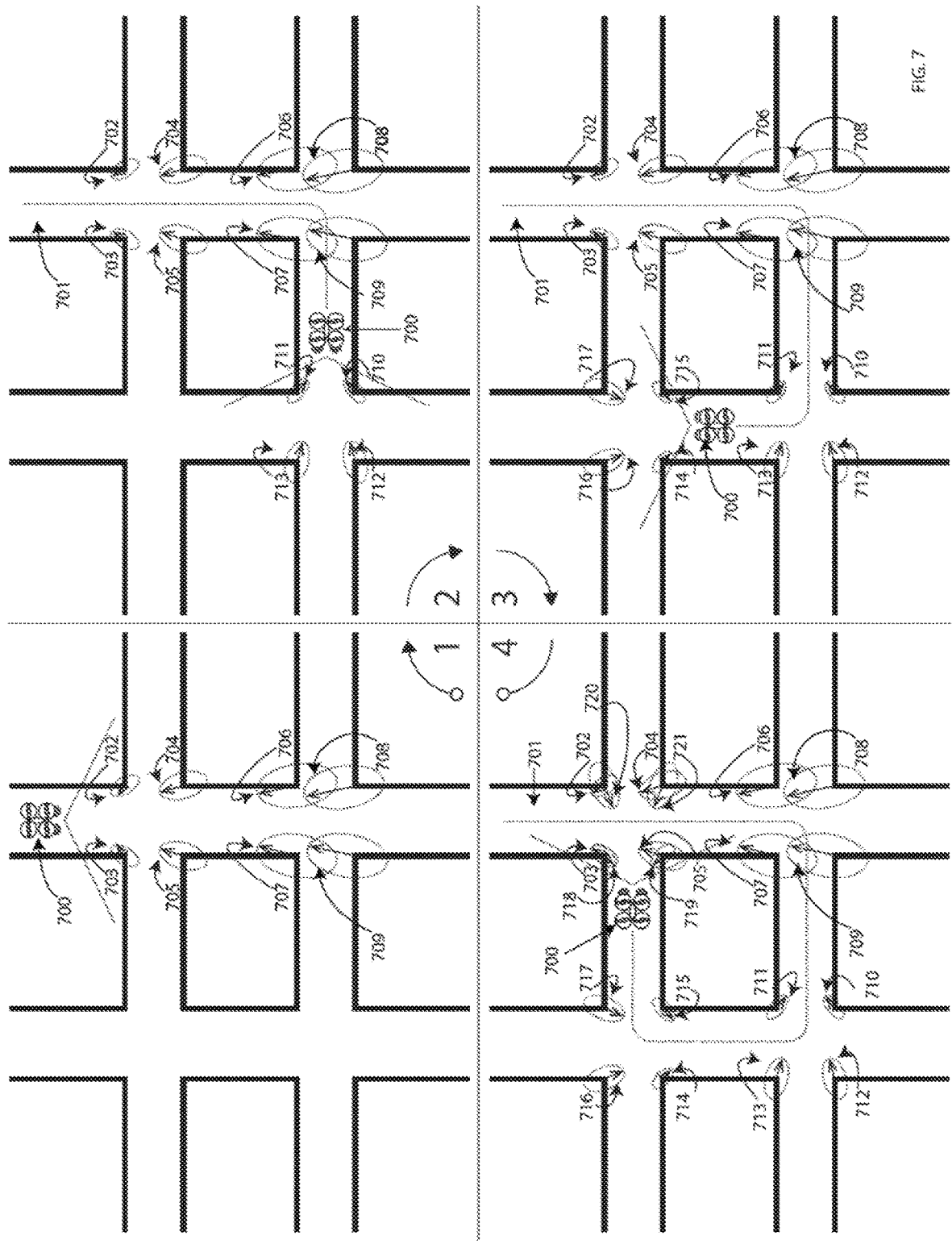
FIG. 7 is a conceptual illustration of an exemplary embodiment of a collaborative mapping system using a single tracking device that provides a development of a map of external environment using uncertainty estimations.

5.12.7. FIG. 7: Collaborative Mapping Example 3

FIG. 7 shows illustrations of four moments in which an embodiment of a single SLAM system mounted on a drone (700) moves through a grid of opaque blocks (for example, blocks in a city) along a path (701) that eventually crosses itself. The numbers at the center of the illustration indicate the chronological order of the moments, beginning with the moment labeled 1 and concluding with the moment labeled 4.

In the first moment the drone (700) enters the scene and records estimated positions of visible features (702-709). In the second moment the SLAM system has passed one corner of the block and move around a second corner, adding additional features (710-713) to its map while losing sight of previous features (702-709). In the third moment the SLAM system has passed around a second corner of the city block, again adding features (714-717). Finally in the fourth moment some of the features recorded in the first moment (702-705) are again visible, and are measured a second time (718-721).

All of the measurements from each moment are correlated. An identification of corresponding independent measurements (a task that has been named "Loop Closure") enables improved estimates of the features measured in both frame 1 (702-705) and again in frame 4 (718-721). In addition, the correlations to measurements from frames 2 and 3 means that the positions of those measurements can also be corrected (a task that has been named "Bundle Adjustment").

Figure 8:
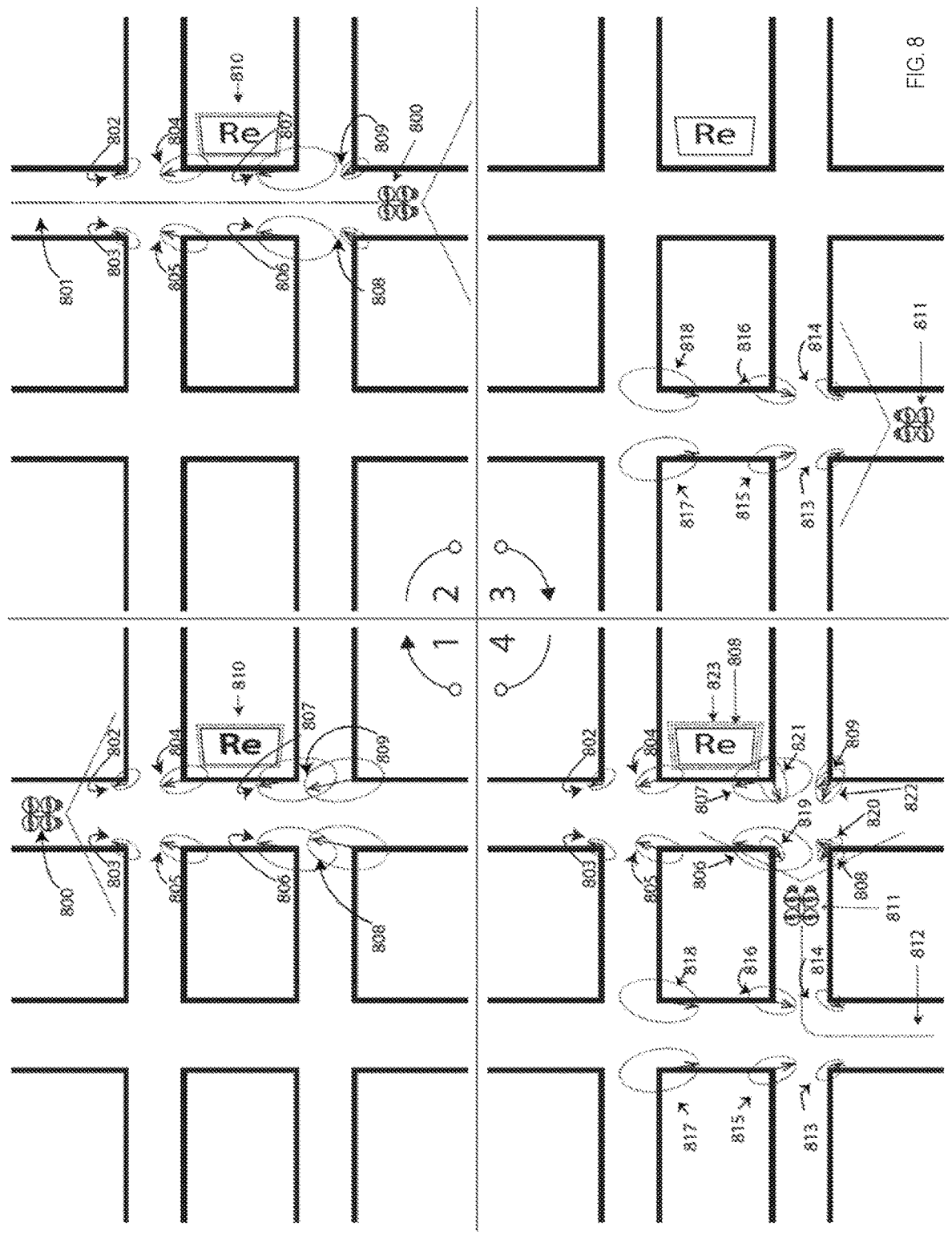
FIG. 8 is a conceptual illustration of an exemplary embodiment of a collaborative mapping system using multiple tracking devices that provides a shared development of a map of external environment using uncertainty estimations.

5.12.8. FIG. 8: Collaborative Mapping Example 4

FIG. 8 shows illustrations of two sequences of two moments each. In the first sequence, comprising moments 1 and 2, a SLAM system mounted on a drone (800) moves through a grid of opaque blocks along a path (801). In the second sequence, comprising moments 3 and 4, a different SLAM system mounted on a drone (811) moves through the same grid of opaque blocks, on a path whose views intersect those of the path of the first drone (800) for the first time in moment 4.

In the first moment the first drone (800) enters the scene and records positions of visible features (802-809), including a recognizable landmark (810). In the second moment the first drone (800) exits the scene, but the features and landmark measured by the drone remain in a shared database.

In the third moment (and arbitrary amount of time after the second moment) the second drone (811) enters the scene and measures additional features (813-818). Because neither the features (802-809) nor the landmark (810) that were measured by the first drone have been seen by the second drone, the relationship between the features is initially unknown. In the fourth moment the second drone (811) turns a corner making visible features (806-809) and a landmark (810) that were previously measured by the first drone. An identification of the points and the landmark makes it possible to extend the second drones map by introducing features (803-805) that were measured by the first drone, but have not yet been seen by the second drone. Because the drones may have established distinct coordinate systems, the inclusion of the first drone's mapped features into the mapped feature set of the second drone may involve a reconciliation of both drones' coordinate systems.

Figure 9A:
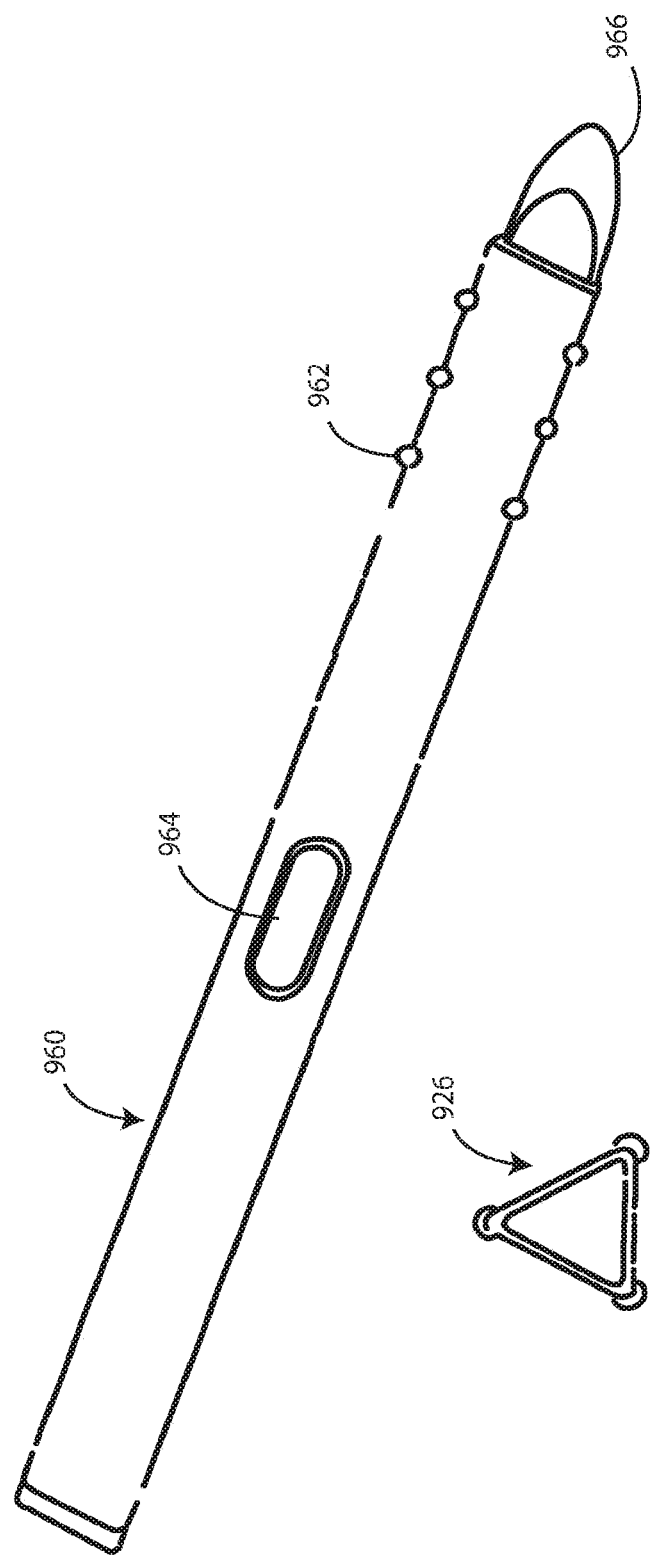
FIG. 9a is a conceptual illustration of an exemplary embodiment of a physical device configured to facilitate user interactions within an augmented reality environment.
Figure 9B:
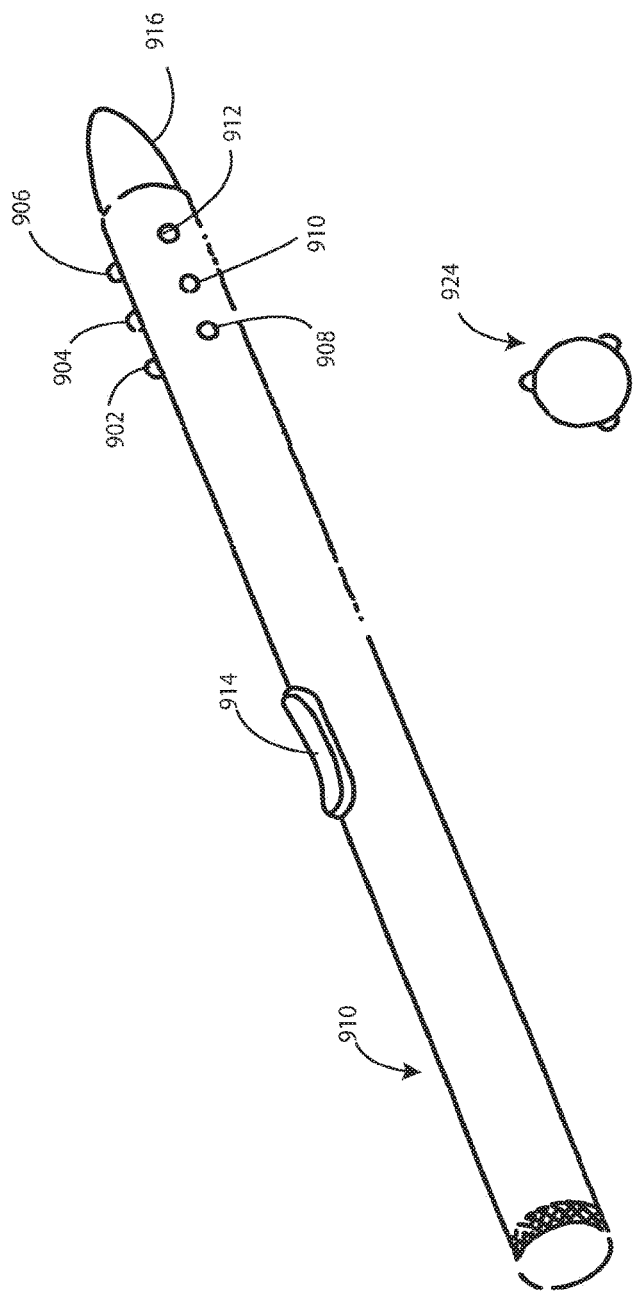
FIG. 9b is a conceptual illustration of an exemplary embodiment of a physical device configured to facilitate user interactions within an augmented reality environment.

5.12.9. FIG. 9a-9c: SLAM System Peripherals Example 1

FIG. 9a-9c illustrates an exemplary embodiment of a user interacting with an augmented reality environment 950. User 900 is a human being wearing a SLAM system embedded within the head-mounted display (HMD) 940. The SLAM system in HMD 940 comprises the components discussed above. User 900 is using stylus 910 to explore a physical object. Stylus 910 is a light-weight roughly cylindrical object with a diameter that is comfortable to hold (e.g., top view 924). In the embodiment illustrated, the physical object is a printed circuit board (PCB) 920 with part 922. The user points the tip of stylus 910 toward part 922 and clicks stylus button 914 to indicate that the user intends to interact with the augmented reality environment. In FIG. 9c, the user chooses to explore part 922. In other embodiments, the user may shake, squeeze, activate conductive portions of, speak to or physically interact with the stylus in any suitable way to deliver feedback to the stylus. In this way, the user is able to engage and disengage interactions with virtual and physical objects in the augmented reality environment. The user may also physically contact the stylus point 916 to the physical part to indicate feedback. Stylus point 916 may contain any suitable sensor to indicate contact, including, but not limited to, a pressure sensor or conductive sensor. By registering contact with physical object the stylus makes it possible to determine the shape of objects even when they are ambiguous to passive sensing. For example, highly reflective objects, transparent objects, and minimally illuminated objects with only curving surfaces, or any object in the case that the SLAM system does not attempt a full geometric reconstruction.

As further illustrated in FIG. 9b, stylus 910 contains LEDs 902-912 which send the stylus' position and orientation information to the SLAM system in HMD 940. The SLAM system contains a passive tracking system capable of distinguishing red, blue and green colors. In other embodiments, the stylus may emit any kind of signal (e.g., radio antenna, sound, laser) that allows the SLAM system to derive geometric information about the stylus and estimates of uncertainty. In FIG. 9b, the LEDs have a round diameter form factor 924. In FIG. 9a, the LEDs have a triangular diameter form factor 926.

In FIG. 9b, at least 3 LEDs (e.g., 908, 910 and 912) are visible from a wide range of viewing angles (the LEDs may be obscured in views aligned with the shaft of the stylus, and may be obscured by hands or other objects) such that the color and relative arrangement of points seen from any viewing angle is unique. In the embodiment illustrated, 3 columns of LEDs with the columns oriented along the axis of the stylus, and equally spaced around its diameter, such that from any angle at least 2 columns will be visible. In FIG. 9a, stylus top view 926 shows a triangular body shape for stylus 960 which allows further distinction between the columns of LEDs. The arrangement of lights in any 2 columns define 6 coplanar points. The coloration of the lights in the columns would be RGB, GBR, BRG, which are patterns defining a direction, each of which is distinct, thereby enabling the visible points of light to be associated with positions of the LED on the stylus. The activation state and the pressure state could be communicated by illuminating additional LEDs. In other embodiments, the stylus may provide tactile feedback for the user when the stylus intersects a virtual object. For example, the stylus may contain a small weight whose motion in the stylus can be driven according to a specified waveform. Additionally, the stylus may include IMU to enable motion interpolation when the stylus is not visible (e.g., occluded by a hand or outside of the field of view). Alternatively and/or additionally, the stylus may include a beacon (e.g., a radio signal) that could be tracked even when the stylus is occluded by a hand.

Once the SLAM system has determined the position and orientation of the stylus in relation to the part of interest, in this case part 922, the HMD 940 generates, within augmented reality environment 950, a virtual screen 930 above PCB 920 that includes virtually displayed information 932 about part 912. This information may include, but is not limited to, part identification, price and part documentation. The user can interact with the virtual display to open menus and access further information from the virtual display using the stylus.

5.12.10. FIG. 10: Collaborative Mapping Example 5

FIG. 10 illustrates an exemplary embodiment of users collaboratively interacting with an augmented reality environment 1000. User 1002 and user 1004 are playing a game of virtual ping pong with each other. In other embodiments, there may be any number of users participating. Each user is wearing an HMD 1020 and 1022 containing SLAM systems and is holding a stylus 10 and 1010, respectively, which function as ping pong paddles in the augmented reality environment 1000. Each HMD tracks both styluses, both users and the geometric features of the ping pong table (e.g., edge of table 1030 and 1032, edge of net 1036). The SLAM systems collaborate with each other to generate a shared map of the world, as described in the figures above. This enables a virtual ball 1016 to be added to the shared augmented reality environment such that both users can see it moving relative to themselves in the way a user would expect in a physical game of ping pong. For example, in the scene illustrated, virtual ball 1016 has been served by user 1002 toward user 1004, has hit the ping pong table at point 1038, and continues toward user 1004. User 1002 observes the virtual ball traveling away from him whereas user 1004 observes the ball traveling toward her.

Figure 11A:
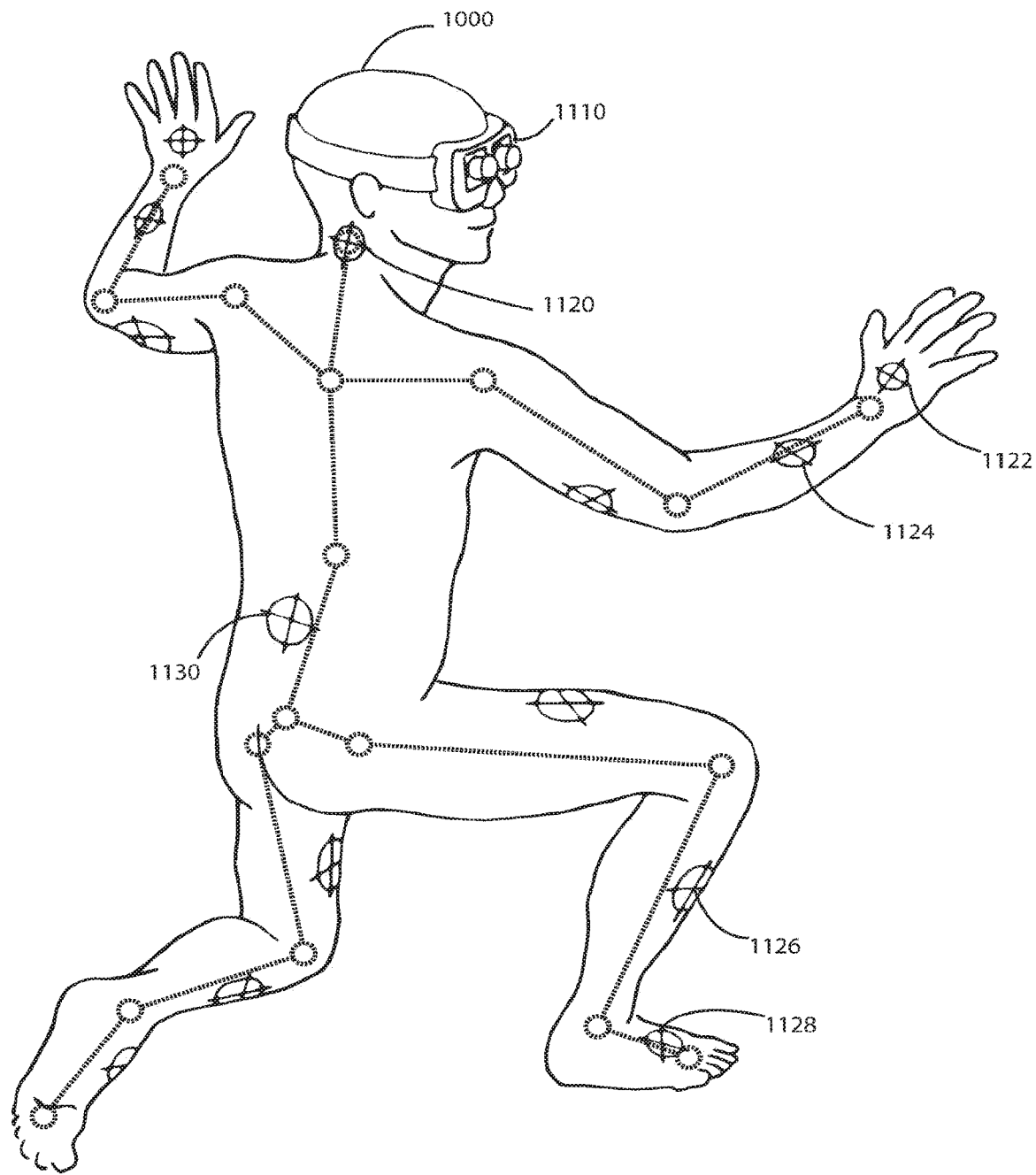
FIG. 11a is a conceptual illustration of an exemplary embodiment of a body tracking system configured to facilitate user interactions within an augmented reality system.
Figure 11B:
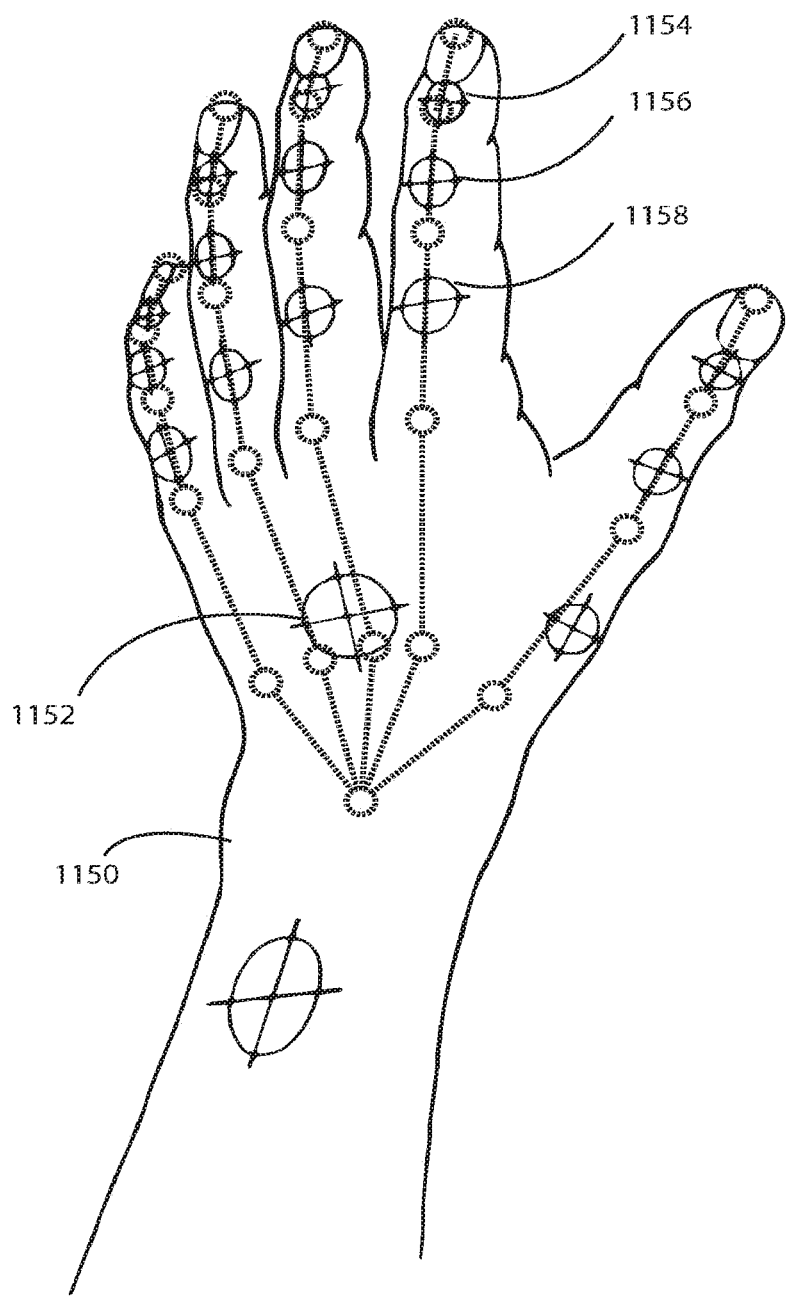
FIG. 11b is a conceptual illustration of an exemplary embodiment of a hand tracking system configured to facilitate user interactions within an augmented reality system.

5.12.11. FIG. 11*a*-11*b*: SLAM System Peripherals Examples 2-3

FIG. 11*a*-11*b* illustrates exemplary embodiments of body and hand tracking using a SLAM system. User 1100 is wearing an HMD 1110 containing a SLAM system. HMD 1110 tracks wearable body sensors 1120-1130 to analyze position and orientation of body parts. Body sensors 1120-1130 may be worn anywhere on the body and may contain passive or active components. In some embodiments, body sensors 1120-1130 may contain, but are not limited to, antennas, LEDs, colored elements, and oscillators. FIG. 11*b* illustrates an exemplary embodiment of a hand tracking system comprising hand sensors 1152, 1154, 1156 and 1158. HMD 1110 tracks the hand sensors to calculate position and orientation of the individual fingers. The user can then interact with an augmented reality environment using their body parts and fingers, creating an immersive, life-like experience.

FURTHER DESCRIPTION OF SOME EMBODIMENTS

Some embodiments of the methods and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

A computer may include one or more processors for performing actions in accordance with instructions and one or more memory devices for storing instructions and data. In some embodiments, the computer executes one or more of the methods described herein. Some versions of the software may implement only some embodiments of the methods described herein.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A mapping method comprising:
   obtaining, based on image data provided by a camera of a mobile device, first feature data comprising first estimated coordinates of locations of a plurality of features in a first coordinate space of a first map of an environment;
   obtaining virtual object data representing a virtual object;
   obtaining anchoring data defining a spatial relationship between the virtual object and one or more particular features included in the plurality of features;
   estimating a location of the virtual object in the first map based on at least (1) the spatial relationship and (2) the first estimated coordinates of the locations of the one or more particular features in the first map;
   performing at least one of (1) estimating a location of the mobile device in the first map relative to the estimated location of the virtual object in the first map, and/or (2) displaying the virtual object on a display device associated with a first user at the estimated location of the virtual object in the first map;
   obtaining second feature data comprising second estimated coordinates of the locations of the one or more particular features in the first coordinate space of the first map of the environment, wherein there is a displacement between the first and second estimated coordinates of at least one of the particular features; and
   re-estimating the location of the virtual object in the first map based on at least (1) the spatial relationship and (2) the second estimated coordinates of the locations of the one or more particular features,
   wherein a displacement between the re-estimated location of the virtual object and the previously estimated location of the virtual object depends on respective displacements between the first and second estimated coordinates of the one or more particular features.

2. The method of claim 1, further comprising:
   obtaining third feature data comprising third estimated coordinates of locations of the one or more particular features a second coordinate space of a second map of the environment; and estimating a location of the virtual object in the second map based on at least (1) the spatial relationship and (2) the third estimated coordinates of the locations of the one or more particular features in the second map, wherein coordinates of the estimated location of the virtual object in the first map differ from coordinates of the estimated location of the virtual object in the second map.

3. The method of claim 2, further comprising:
displaying the virtual object on a display device associated with a second user at the estimated location of the virtual object in the second map.

4. The method of claim 3, wherein a difference between the coordinates of the location of the virtual object in the first map and the coordinates of the location of the virtual object in the second map depends on (1) the spatial relationship and (2) respective differences between the first and third estimated coordinates of the one or more particular features.

5. The method of claim 4, wherein:
the one or more particular features include a first particular feature,
a first distance separates the coordinates of the estimated location of the virtual object in the first map from the first estimated coordinates of the location of the first particular feature in the first map,
a second distance separates the coordinates of the estimated location of the virtual object in the second map from the third estimated coordinates of the location of the first particular feature in the second map, and
a difference between the first distance and the second distance is less than a pre-defined threshold.

6. A method for mapping an environment of a first mobile device and a second mobile device, the method comprising:
obtaining, based on image data provided by a camera of the first mobile device, first feature data comprising first estimated coordinates of a plurality of features in a coordinate space of a first map of the environment;
obtaining first uncertainty data representing (1) for each of the plurality of features, a first distribution of individual uncertainty of the first estimated coordinates of the respective feature, and (2) for each pair of the plurality of features, a first distribution of correlated uncertainty of the first estimated coordinates of the respective pair of plurality of features;
obtaining, based on image data provided by a camera of the second mobile device, second feature data comprising second estimated coordinates of the plurality of features in a coordinate space of a second map of the environment;
obtaining second uncertainty data representing (1) for each of the plurality of features, a second distribution of individual uncertainty of the second estimated coordinates of the respective feature, and (2) for each pair of the plurality of features, a second distribution of correlated uncertainty of the second estimated coordinates of the respective pair of plurality of features;
obtaining reconciliation transformation data describing a transformation from the coordinate space of the second map to the coordinate space of the first map;
using the reconciliation transformation data, transforming the second estimated coordinates of the plurality of features and the second uncertainty data from the coordinate space of the second map to the coordinate space of the first map, thereby generating transformed second estimated coordinates and transformed second uncertainty data;
performing, by a processing device remote from the first mobile device and/or the second mobile device, a first act, the processing device hosting a database storing data describing the environment, the first act including:
aggregating a portion of the first feature data and a portion of the transformed second feature data to generate a first portion of third feature data,
and aggregating the first uncertainty data and the transformed second uncertainty data to generate third uncertainty data representing (1) for each of the plurality of features, a third distribution of individual uncertainty of the third estimated coordinates of the respective feature, and (2) for each pair of the plurality of features, a third distribution of correlated uncertainty of the third estimated coordinates of the respective pair of plurality of features, and performing, by the processing device, a second act, comprising:
estimating a second portion of the third feature data comprising third estimated coordinates of the plurality of features in the coordinate space of the first map of the environment, wherein the third estimated coordinates of the plurality of features are estimated based at least on the first portion of the third feature data and the third uncertainty data.

7. The method of claim 6, further comprising repeatedly performing the first act and the second act, wherein the second act is performed asynchronously with respect to the first act.

8. The method of claim 7, wherein the first act is performed in response to obtaining new measurements of the plurality of features.

9. The method of claim 7, wherein the second act is performed in response to detecting a loop closure event.

10. The method of claim 6, wherein aggregating the portions of the first feature data and the second transformed second feature data to generate the first portion of the third feature data comprises adding the portions of the first feature data and the transformed second feature data to generate the first portion of the third feature data.

11. The method of claim 6, wherein aggregating the first and second uncertainty data to generate the third uncertainty data comprises adding and inverting portions of the first and second uncertainty data to generate the third uncertainty data.

12. The method of claim 11, wherein the first, second, and third uncertainty data comprise inverses of the individual uncertainties of the respective first, second, and third estimated coordinates of the plurality of features.

13. The method of claim 12, wherein the first, second, and third uncertainty data further comprise inverses of the correlated uncertainties of the respective pairs of first, second, and third estimated coordinates of the plurality of features.

14. The method of claim 6, wherein estimating the third coordinates of the plurality of features in the coordinate space of the first map of the environment comprises:
inverting the first portion of the third uncertainty data; and
multiplying the first portion of the third feature data by the inverted first portion of the third uncertainty data, yielding the third feature coordinates.

* * * * *